(12) United States Patent
Bhushan et al.

(10) Patent No.: US 11,410,403 B1
(45) Date of Patent: *Aug. 9, 2022

(54) PRECISE SCALING OF VIRTUAL OBJECTS IN AN EXTENDED REALITY ENVIRONMENT

(71) Applicant: SPLUNK INC., San Francisco, CA (US)

(72) Inventors: Devin Bhushan, San Jose, CA (US); Jesse Chor, Saratoga, CA (US); Glen Wong, Santa Clara, CA (US)

(73) Assignee: SPLUNK INC., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/163,148

(22) Filed: Jan. 29, 2021

Related U.S. Application Data

(63) Continuation of application No. 16/051,340, filed on Jul. 31, 2018, now Pat. No. 10,909,772.

(51) Int. Cl.
| | |
|---|---|
| G09G 5/00 | (2006.01) |
| G06T 19/20 | (2011.01) |
| G06F 3/01 | (2006.01) |
| G06T 3/00 | (2006.01) |
| G06F 3/04845 | (2022.01) |
| G06F 3/0346 | (2013.01) |

(52) U.S. Cl.
CPC .............. G06T 19/20 (2013.01); G06F 3/017 (2013.01); G06F 3/0346 (2013.01); G06F 3/04845 (2013.01); G06T 3/0006 (2013.01); G06F 2203/04808 (2013.01)

(58) Field of Classification Search
CPC ... G06F 3/04845; G06F 3/0481; G06T 3/006; G01T 1/1647; G01T 1/1611
USPC ........................................................ 345/648
See application file for complete search history.

(56) References Cited

U.S. PATENT DOCUMENTS

| | | | |
|---|---|---|---|
| 8,400,477 | B1 | 3/2013 | Young et al. |
| 8,412,696 | B2 | 4/2013 | Zhang et al. |
| 8,589,375 | B2 | 11/2013 | Zhang et al. |
| 8,589,403 | B2 | 11/2013 | Marquardt et al. |
| 8,589,432 | B2 | 11/2013 | Zhang et al. |
| 8,738,587 | B1 | 5/2014 | Bitincka et al. |
| 8,738,629 | B1 | 5/2014 | Bitincka et al. |

(Continued)

OTHER PUBLICATIONS

Non-Final Office Action received for U.S. Appl. No. 16/907,017, dated Aug. 13, 2021, 26 pages.

(Continued)

*Primary Examiner* — Gordon G Liu
(74) *Attorney, Agent, or Firm* — Artegis Law Group, LLP

(57) ABSTRACT

A mobile device is fitted with a camera and an extended reality (XR) software application program executing on a processor within an XR system. Via the XR software application program, various techniques are performed for manipulating virtual objects in an XR environment. In a first technique, the XR software application program facilitates the movement of a virtual object from a first location to a second location. In a second technique, the XR software application program facilitates the rotation of a virtual object. In a third technique, the XR software application program facilitates the scaling of a virtual object along one or more axes.

20 Claims, 43 Drawing Sheets

(56) References Cited

U.S. PATENT DOCUMENTS

| | | |
|---|---|---|
| 8,788,525 B2 | 7/2014 | Neels et al. |
| 8,788,526 B2 | 7/2014 | Neels et al. |
| 8,826,434 B2 | 9/2014 | Merza |
| 8,862,925 B2 | 10/2014 | DeMarco |
| 8,983,994 B2 | 3/2015 | Neels et al. |
| 9,128,980 B2 | 9/2015 | Neels et al. |
| 9,128,985 B2 | 9/2015 | Marquardt et al. |
| 9,130,971 B2 | 9/2015 | Vasan et al. |
| 9,173,801 B2 | 11/2015 | Merza |
| 9,185,007 B2 | 11/2015 | Fletcher et al. |
| 9,215,240 B2 | 12/2015 | Merza et al. |
| 9,248,068 B2 | 2/2016 | Merza |
| 9,324,188 B1 | 4/2016 | Fram et al. |
| 9,426,045 B2 | 8/2016 | Fletcher et al. |
| 9,426,172 B2 | 8/2016 | Merza |
| 9,432,396 B2 | 8/2016 | Merza |
| 9,514,189 B2 | 12/2016 | Bitincka et al. |
| 9,589,012 B2 | 3/2017 | Neels et al. |
| 9,838,292 B2 | 12/2017 | Polychronis |
| 10,049,160 B2 | 8/2018 | Bitincka et al. |
| 10,692,299 B2 | 6/2020 | Bhushan et al. |
| 10,909,772 B2 * | 2/2021 | Bhushan .................. G06F 3/011 |
| 2006/0256110 A1 | 11/2006 | Okuno et al. |
| 2010/0162181 A1 | 6/2010 | Shiplacoff et al. |
| 2010/0188503 A1 | 7/2010 | Tsai et al. |
| 2011/0216002 A1 | 9/2011 | Weising et al. |
| 2011/0216060 A1 | 9/2011 | Weising et al. |
| 2012/0075424 A1 | 3/2012 | Kawamoto et al. |
| 2012/0249741 A1 | 10/2012 | Maciocci et al. |
| 2013/0016122 A1 * | 1/2013 | Bhatt ...................... G06T 11/00 345/620 |
| 2013/0038555 A1 | 2/2013 | Maeda et al. |
| 2013/0257907 A1 | 10/2013 | Matsui |
| 2013/0318236 A1 | 11/2013 | Coates et al. |
| 2014/0101578 A1 | 4/2014 | Kwak et al. |
| 2014/0108979 A1 | 4/2014 | Davidson et al. |
| 2014/0236890 A1 | 8/2014 | Vasan et al. |
| 2014/0320404 A1 | 10/2014 | Kasahara |
| 2014/0324862 A1 | 10/2014 | Bingham et al. |
| 2014/0347390 A1 | 11/2014 | Poulos et al. |
| 2014/0368535 A1 | 12/2014 | Salter et al. |
| 2015/0019537 A1 | 1/2015 | Neels et al. |
| 2015/0035823 A1 | 2/2015 | Arsan et al. |
| 2015/0077435 A1 | 3/2015 | Koga |
| 2015/0082253 A1 | 3/2015 | Derose et al. |
| 2015/0135093 A1 | 5/2015 | Zhou et al. |
| 2016/0004750 A1 | 1/2016 | Marquardt et al. |
| 2016/0026253 A1 | 1/2016 | Bradski et al. |
| 2016/0196692 A1 | 7/2016 | Kjallstrom et al. |
| 2017/0031502 A1 | 2/2017 | Rosenberg et al. |
| 2017/0060230 A1 | 3/2017 | Faaborg et al. |
| 2017/0123750 A1 | 5/2017 | Todasco |
| 2017/0228942 A1 | 8/2017 | Arsan et al. |
| 2018/0025531 A1 | 1/2018 | Terahata |
| 2018/0045963 A1 | 2/2018 | Hoover et al. |
| 2018/0059777 A1 * | 3/2018 | Kobayashi ............ G06F 3/0486 |
| 2018/0210628 A1 | 7/2018 | Mcphee et al. |
| 2018/0253900 A1 | 9/2018 | Finding et al. |
| 2018/0284969 A1 * | 10/2018 | Welker .................. G06F 3/0304 |
| 2018/0321776 A1 | 11/2018 | Averyanov et al. |
| 2018/0350145 A1 | 12/2018 | Byl et al. |
| 2019/0034076 A1 * | 1/2019 | Vinayak ................ G06T 19/006 |
| 2019/0065027 A1 | 2/2019 | Hauenstein et al. |
| 2021/0042992 A1 | 2/2021 | Newman et al. |

OTHER PUBLICATIONS

Chen, Z. Recognition and interpretation of multi-touch gesture interaction, Aug. 2017, [Online], [Retrieved on Jul. 29, 2019]. Retrieved from the Internet <URL: https://tel.archives-ouvertes.fr/tel-01578068/document> (Year: 2017).

Marzo et al., "Combining multi-touch input and device movement for 3D manipulations in mobile augmented reality environments." Proceedings of the 2nd ACM symposium on Spatial user interaction. ACM, 2014, 5 pages.

Shoemake, K., ARCBALL: A User Interface for Specifying Three-Dimensional Orientation Using a Mouse. Graphics interface {vol. 92, pp. 151-156). (1992).

Technical Information—Specifications, Signal.org, at https://signal.org/docs/, hllps://web.archive.org/,web/20180629224149/hllps://signal.org/docs/, Retrieved on Feb. 3, 2020, 2 pages.

WebSocket and WAMP in Python for Twisted and asyncio, Crossbario, at https://github.com/crossbario/autobahn-python, https://web.archive.org/web/20180611021641 /hllps://github.com/crossbario/autobahn-python, Retrieved on Feb. 3, 2020, 4 pages.

The problems and some security implications of websockets- Cross-site WebSockets Scripting {XSWS), Subudeepak, https://gist.github.com/subudeepak/9897212, Retrieved on Feb. 3, 2020, 7 pages.

Chen, Z. Recognition and interpretation of multi-touch gesture interaction, Aug. 2017, Retrieved from the Internet <URL: hllps://tel.archives-ouvertes. fr/tel-01578068/document> {Year: 2017), 131 pages.

The problems and some security implications of websockets- Cross-site WebSockets Scripting {XSWS), Subudeepak, hllps://gisl.github.com/subudeepak/9897212, Retrieved on Feb. 3, 2020, 7 pages.

Final Office Action received for U.S. Appl. No. 16/907,017 dated May 6, 2021, 27 pages.

Notice of Allowance received for U.S. Appl. No. 16/051,340 dated Sep. 22, 2020, 9 pages.

Non Final Office Action received for U.S. Appl. No. 16/907,017 dated Feb. 25, 2021, 17 pages.

Notice of Allowance received for U.S. Appl. No. 16/907,017 dated Nov. 29, 2021, 6 pages.

Non Final Office Action received for U.S. Appl. No. 16/051,340 dated Aug. 2, 2019, 40 pages.

Final Office Action received for U.S. Appl. No. 16/051,340 dated Nov. 6, 2019, 47 pages.

Advisory Action received for U.S. Appl. No. 16/051,340 dated Jan. 14, 2020, 2 pages.

Non Final Office Action received for U.S. Appl. No. 16/051,335, dated Sep. 17, 2019, 23 pages.

Non Final Office Action received for U.S. Appl. No. 16/051,340 dated May 6, 2020, 59 pages.

Notice of Allowance received for U.S. Appl. No. 16/051,335, dated Feb. 12, 2020, 6 pages.

Advisory Action received for U.S. Appl. No. 16/907,017 dated Jul. 13, 2021, 3 pages.

Non Final Office Action received for U.S. Appl. No. 16/907,017 dated Aug. 17, 2021, 26 pages.

Notice of Allowance received for U.S. Appl. No. 16/907,017 dated May 3, 2022, 11 pages.

* cited by examiner

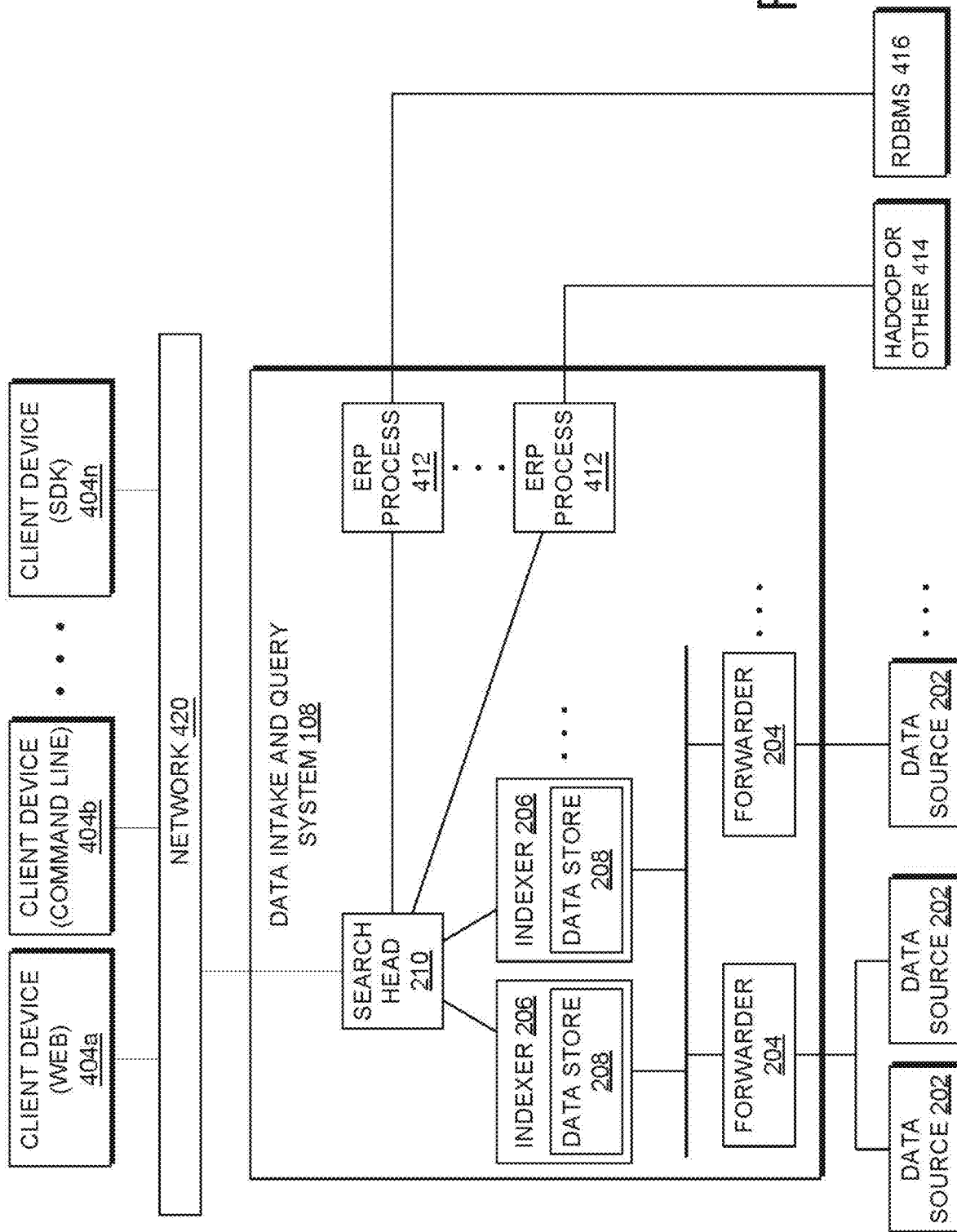

| Time 535 | Host 536 | Source 537 | Source Type 538 | Event 539 |
|---|---|---|---|---|
| 10/10/2000 1:55 p.m. | www1 | access.log | access_combined | 127.0.0.1 - frank [10/Oct/2000:13:55:36 -0700] "GET /apache.gif HTTP/1.0" 200 2326 0.0947 |
| 10/10/2000 1:56 p.m. | www2 | access.log | access_combined | 127.0.0.1 - bob [10/Oct/2010:13:56:36 -0700] "GET /mickey_mouse.gif HTTP/1.0" 200 2980 0.0899 |
| 10/10/2000 1:57 p.m. | www2 | access.log | access_combined | 127.0.0.1 - carlos [10/Oct/2010:13:57:36 -0700] "GET /donald_duck.gif HTTP/1.0" 200 2900 0.0857 |
| 10/10/2000 1:58 p.m. | www2 | error.log | apache_error | [Sunday Oct 10 1:59:33 2010] [error] [client 127.10.1.1.015] File does not exist: /home/reba/public_html/images/daffy_duck.gif |

| Data Summary | | | |
|---|---|---|---| 
| Hosts (5) | Sources (8) | Sourcetypes (3) | |
| filter | | | |
| Host ◇ | | Count ◇ | Last Update ◇ |
| mailsv | ⋅ıl ∨ | 9,829 | 4/29/14 1:32:47.000 PM |
| vendor_sales | ⋅ıl ∨ | 30,244 | 4/29/14 1:32:46.000 PM |
| www1 | ⋅ıl ∨ | 24,221 | 4/29/14 1:32:44.000 PM |
| www2 | ⋅ıl ∨ | 22,595 | 4/29/14 1:32:47.000 PM |
| www3 | ⋅ıl ∨ | 22,975 | 4/29/14 1:32:45.000 PM |

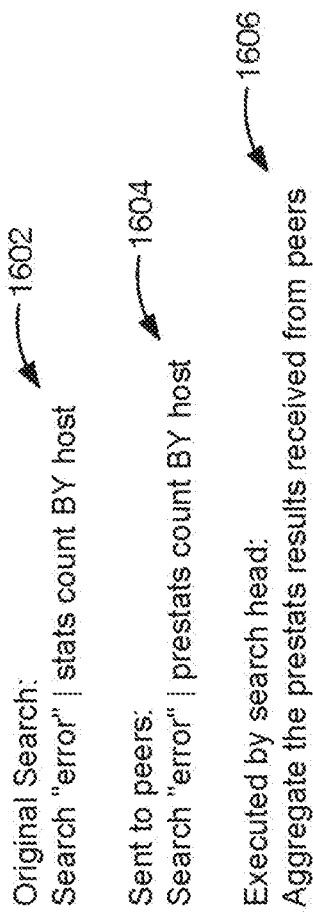

FIG. 17B

PRECISE SCALING OF VIRTUAL OBJECTS IN AN EXTENDED REALITY ENVIRONMENT

CROSS REFERENCE TO RELATED APPLICATIONS

This application is a continuation of the co-pending U.S. patent application titled, "PRECISE SCALING OF VIRTUAL OBJECTS IN AN EXTENDED REALITY ENVIRONMENT," filed on Jul. 31, 2018 and having Ser. No. 16/051,340. The subject matter of this related application is hereby incorporated by reference.

BACKGROUND

Field of the Embodiments

The present invention relates generally to extended reality systems and, more specifically, to precise scaling of virtual objects in an extended reality environment.

Description of the Related Art

Extended reality (XR) systems, such as virtual reality (VR) systems and augmented reality (AR) systems, are increasingly being implemented in human-machine interfaces (HMIs) for interacting with various types of software applications. In a VR system, virtual computer-generated objects are projected onto a virtual, computer-generated environment. Similarly, in an AR system, virtual computer-generated objects are projected onto a real-world environment. In some AR systems, a user wears a special transparent device, such as AR glasses, through which the user views physical objects in the real world. A processor associated with the transparent device renders one or more virtual objects and projects the rendered virtual objects onto a surface of the AR device. To the user, these virtual objects appear as objects in the physical real-world environment.

In other XR systems, a user holds a mobile device, such as a smartphone or tablet computer or wears an XR headset. A camera associated with the mobile device or XR headset captures an image of the physical real-world environment. A processor associated with the mobile device or XR headset then renders one or more virtual objects and overlays the rendered virtual objects onto a display screen of the mobile device or XR headset. To the user, these virtual objects appear as objects in the image of the physical real-world environment. The transparent AR devices, mobile devices, and XR headsets described above are collectively referred to herein as XR devices.

In some applications within XR environments, a user may want to manipulate a virtual object by, for example, changing the location, rotation, and/or size of the virtual object. Typically, in such applications, the user manipulates the virtual object via a touchscreen associated with the XR device. For example, the user may touch the image of the virtual object on the touchscreen with a finger, drag the finger to move the image of the virtual object to a desired location, and then remove the finger to fix the image of the virtual object in the new location. Similarly, the user may place two fingers on the touchscreen to establish a rotation axis along an imaginary line that passes through the center point between the touch points of the two fingers. The user may move the two fingers in a clockwise or counterclockwise direction to rotate the virtual object in a clockwise or counterclockwise direction, respectively. Also, the user may place two fingers on the touchscreen and then move the two fingers closer to one another to reduce the size of the virtual object along the scaling axis. Similarly, the user may move the two fingers farther apart from one another to increase the size of the virtual object.

One drawback of the above approach for manipulating virtual objects is that the user may have difficulty when attempting to select an exact position at which to position a virtual object. For example, while moving a virtual object on a touchscreen device, a user's finger(s) typically cover multiple touch input locations on the touchscreen, making the selection of a specific location on the touchscreen difficult. In addition, due to friction between the user's finger(s) and the touchscreen, movements of the finger(s) on the touchscreen may be jerky and imprecise, preventing the user from moving virtual objects to specific locations on the touchscreen. Further, the spatial resolution of many touchscreen devices is low, relative to the physical real-world environment. For example, when an XR environment is displayed on a touchscreen device, a distance of a few pixels on the touchscreen may represent a distance of several inches or feet in the XR environment.

The drawbacks noted above lead to imprecision when manipulating virtual objects in an XR environment. As a result, user interactions within the XR environment may cause a virtual object to be moved to an undesired location. Similarly, a virtual object may be rotated by an undesired angle or about an undesired axis, or the virtual object may be scaled to an undesired size. These and other shortcomings may lead to difficulty when a user attempts to move, rotate, and/or scale a virtual object with precision within an XR environment.

Based on the foregoing, what is needed in the art are more effective techniques for manipulating virtual objects in an XR environment.

SUMMARY

A mobile device is fitted with a camera and an extended reality (XR) software application program executing on a processor within an XR system. Via the XR software application program, various techniques are performed for manipulating virtual objects in an XR environment. In a first technique, the XR software application program facilitates the movement of a virtual object from a first location to a second location. In a second technique, the XR software application program facilitates the rotation of a virtual object. In a third technique, the XR software application program facilitates the scaling of a virtual object along one or more axes.

Various embodiments of the present application set forth a computer-implemented method for scaling a virtual object within an XR environment. The method includes receiving, via a client device, first user input associated with a first location and second user input associated with a second location. The method further includes determining that a reference line defined between the first location and the second location is within a first threshold angle of a first axis of a virtual object. The method further includes scaling the virtual object along the first axis based on the first user input and the second user input.

Other embodiments of the present invention include, without limitation, a computer-readable medium including instructions for performing one or more aspects of the disclosed techniques, as well as a computing device for performing one or more aspects of the disclosed techniques.

One advantage of the disclosed techniques is that virtual objects are manipulated with greater precision relative to prior techniques. For example, the disclosed techniques may lead to improved precision when placing, rotating, and/or scaling virtual objects in an XR environment. As a result, the quality of user interactions with the XR environment is improved relative to prior approaches.

BRIEF DESCRIPTION OF THE DRAWINGS

So that the manner in which the above recited features of the invention can be understood in detail, a more particular description of the invention may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

The present disclosure is illustrated by way of example, and not limitation, in the figures of the accompanying drawings, in which like reference numerals indicate similar elements and in which:

FIG. 4 is a block diagram of an example data intake and query system that performs searches across external data systems, in accordance with example embodiments;

FIG. 5C provides a visual representation of the manner in which a pipelined search language or query operates, in accordance with example embodiments;

FIG. 7C illustrates an example of creating and using an inverted index, in accordance with example embodiments;

FIG. 8B is an interface diagram of an example user interface for a data summary dialog that enables a user to select various data sources, in accordance with example embodiments;

FIGS. 9-15 are interface diagrams of example report generation user interfaces, in accordance with example embodiments;

FIG. 16 is an example search query received from a client and executed by search peers, in accordance with example embodiments;

FIG. 17B is an interface diagram of an example user interface of an incident review dashboard, in accordance with example embodiments;

DETAILED DESCRIPTION

Figure 1:
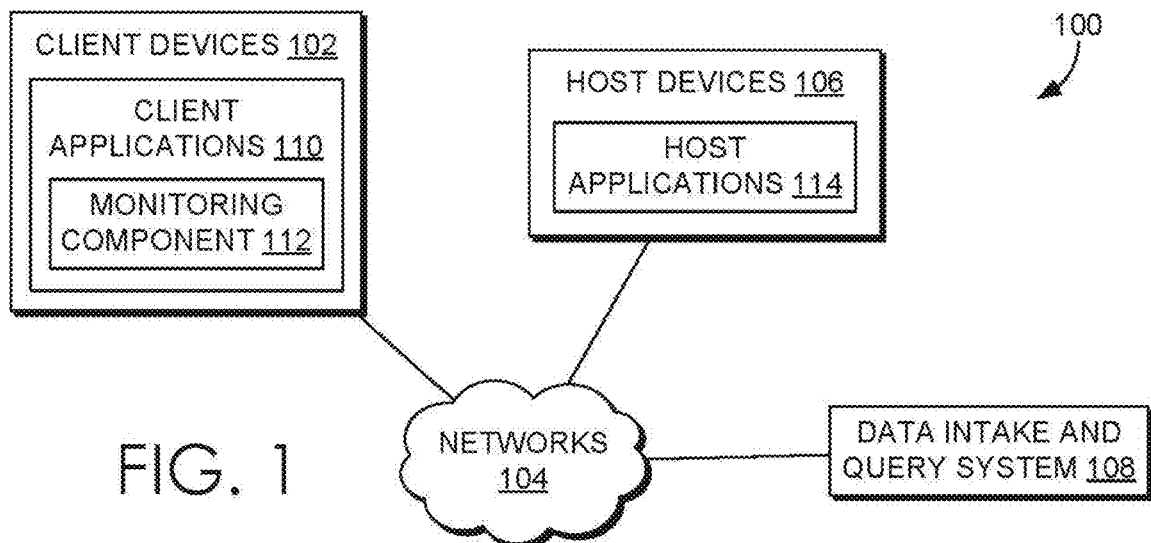
FIG. 1 is a block diagram of an example networked computer environment, in accordance with example embodiments.

Embodiments are described herein according to the following outline:
   1.0. General Overview
   2.0. Operating Environment
      2.1. Host Devices
      2.2. Client Devices
      2.3. Client Device Applications
      2.4. Data Server System
      2.5 Cloud-Based System Overview 2.6 Searching Externally-Archived Data
   2.6.1. ERP Process Features
2.7. Data Ingestion
   2.7.1. Input
   2.7.2. Parsing
   2.7.3. Indexing
2.8. Query Processing
2.9. Pipelined Search Language
2.10. Field Extraction
2.11. Example Search Screen
2.12. Data Modeling
2.13. Acceleration Techniques
   2.13.1. Aggregation Technique
   2.13.2. Keyword Index
   2.13.3. High Performance Analytics Store
      2.13.3.1 Extracting Event Data Using Posting Values
   2.13.4. Accelerating Report Generation
2.14. Security Features
2.15. Data Center Monitoring
3.0. Manipulation of Virtual Objects in an Extended Reality Environment
1.0. General Overview Modern data centers and other computing environments can comprise anywhere from a few host computer systems to thousands of systems configured to process data, service requests from remote clients, and perform numerous other computational tasks. During operation, various components within these computing environments often generate significant volumes of machine data. Machine data is any data produced by a machine or component in an information technology (IT) environment and that reflects activity in the IT environment. For example, machine data can be raw machine data that is generated by various components in IT environments, such as servers, sensors, routers, mobile devices, Internet of Things (IoT) devices, etc. Machine data can include system logs, network packet data, sensor data, application program data, error logs, stack traces, system performance data, etc. In general, machine data can also include performance data, diagnostic information, and many other types of data that can be analyzed to diagnose performance problems, monitor user interactions, and to derive other insights.

A number of tools are available to analyze machine data. In order to reduce the size of the potentially vast amount of machine data that may be generated, many of these tools typically pre-process the data based on anticipated data-analysis needs. For example, pre-specified data items may be extracted from the machine data and stored in a database to facilitate efficient retrieval and analysis of those data items at search time. However, the rest of the machine data typically is not saved and is discarded during pre-processing. As storage capacity becomes progressively cheaper and more plentiful, there are fewer incentives to discard these portions of machine data and many reasons to retain more of the data.

This plentiful storage capacity is presently making it feasible to store massive quantities of minimally processed machine data for later retrieval and analysis. In general, storing minimally processed machine data and performing analysis operations at search time can provide greater flexibility because it enables an analyst to search all of the machine data, instead of searching only a pre-specified set of data items. This may enable an analyst to investigate different aspects of the machine data that previously were unavailable for analysis.

However, analyzing and searching massive quantities of machine data presents a number of challenges. For example, a data center, servers, or network appliances may generate many different types and formats of machine data (e.g., system logs, network packet data (e.g., wire data, etc.), sensor data, application program data, error logs, stack traces, system performance data, operating system data, virtualization data, etc.) from thousands of different components, which can collectively be very time-consuming to analyze. In another example, mobile devices may generate large amounts of information relating to data accesses, application performance, operating system performance, network performance, etc. There can be millions of mobile devices that report these types of information.

These challenges can be addressed by using an event-based data intake and query system, such as the SPLUNK® ENTERPRISE system developed by Splunk Inc. of San Francisco, Calif. The SPLUNK® ENTERPRISE system is the leading platform for providing real-time operational intelligence that enables organizations to collect, index, and search machine data from various websites, applications, servers, networks, and mobile devices that power their businesses. The data intake and query system is particularly useful for analyzing data which is commonly found in system log files, network data, and other data input sources. Although many of the techniques described herein are explained with reference to a data intake and query system similar to the SPLUNK® ENTERPRISE system, these techniques are also applicable to other types of data systems.

In the data intake and query system, machine data are collected and stored as "events". An event comprises a portion of machine data and is associated with a specific point in time. The portion of machine data may reflect activity in an IT environment and may be produced by a component of that IT environment, where the events may be searched to provide insight into the IT environment, thereby improving the performance of components in the IT environment. Events may be derived from "time series data," where the time series data comprises a sequence of data points (e.g., performance measurements from a computer system, etc.) that are associated with successive points in time. In general, each event has a portion of machine data that is associated with a timestamp that is derived from the portion of machine data in the event. A timestamp of an event may be determined through interpolation between temporally proximate events having known timestamps or may be determined based on other configurable rules for associating timestamps with events.

In some instances, machine data can have a predefined format, where data items with specific data formats are stored at predefined locations in the data. For example, the machine data may include data associated with fields in a database table. In other instances, machine data may not have a predefined format (e.g., may not be at fixed, predefined locations), but may have repeatable (e.g., non-random) patterns. This means that some machine data can comprise various data items of different data types that may be stored at different locations within the data. For example, when the data source is an operating system log, an event can include one or more lines from the operating system log containing machine data that includes different types of performance and diagnostic information associated with a specific point in time (e.g., a timestamp).

Examples of components which may generate machine data from which events can be derived include, but are not limited to, web servers, application servers, databases, firewalls, routers, operating systems, and software applications that execute on computer systems, mobile devices, sensors, Internet of Things (IoT) devices, etc. The machine data generated by such data sources can include, for example and without limitation, server log files, activity log files, configuration files, messages, network packet data, performance measurements, sensor measurements, etc.

The data intake and query system uses a flexible schema to specify how to extract information from events. A flexible schema may be developed and redefined as needed. Note that a flexible schema may be applied to events "on the fly," when it is needed (e.g., at search time, index time, ingestion time, etc.). When the schema is not applied to events until search time, the schema may be referred to as a "late-binding schema."

During operation, the data intake and query system receives machine data from any type and number of sources (e.g., one or more system logs, streams of network packet data, sensor data, application program data, error logs, stack traces, system performance data, etc.). The system parses the machine data to produce events each having a portion of machine data associated with a timestamp. The system stores the events in a data store. The system enables users to run queries against the stored events to, for example, retrieve events that meet criteria specified in a query, such as criteria indicating certain keywords or having specific values in defined fields. As used herein, the term "field" refers to a location in the machine data of an event containing one or more values for a specific data item. A field may be referenced by a field name associated with the field. As will be described in more detail herein, a field is defined by an extraction rule (e.g., a regular expression) that derives one or more values or a sub-portion of text from the portion of machine data in each event to produce a value for the field for that event. The set of values produced are semantically-related (such as IP address), even though the machine data in each event may be in different formats (e.g., semantically-related values may be in different positions in the events derived from different sources).

As described above, the system stores the events in a data store. The events stored in the data store are field-searchable, where field-searchable herein refers to the ability to search the machine data (e.g., the raw machine data) of an event based on a field specified in search criteria. For example, a search having criteria that specifies a field name "UserID" may cause the system to field-search the machine data of events to identify events that have the field name "UserID." In another example, a search having criteria that specifies a field name "UserID" with a corresponding field value "12345" may cause the system to field-search the machine data of events to identify events having that field-value pair (e.g., field name "UserID" with a corresponding field value of "12345"). Events are field-searchable using one or more configuration files associated with the events. Each configuration file includes one or more field names, where each field name is associated with a corresponding extraction rule and a set of events to which that extraction rule applies. The set of events to which an extraction rule applies may be identified by metadata associated with the set of events. For example, an extraction rule may apply to a set of events that are each associated with a particular host, source, or source type. When events are to be searched based on a particular field name specified in a search, the system uses one or more configuration files to determine whether there is an extraction rule for that particular field name that applies to each event that falls within the criteria of the search. If so, the event is considered as part of the search results (and additional processing may be performed on that event based on criteria specified in the search). If not, the next event is similarly analyzed, and so on.

As noted above, the data intake and query system utilizes a late-binding schema while performing queries on events. One aspect of a late-binding schema is applying extraction rules to events to extract values for specific fields during search time. More specifically, the extraction rule for a field can include one or more instructions that specify how to extract a value for the field from an event. An extraction rule can generally include any type of instruction for extracting values from events. In some cases, an extraction rule comprises a regular expression, where a sequence of characters form a search pattern. An extraction rule comprising a regular expression is referred to herein as a regex rule. The system applies a regex rule to an event to extract values for a field associated with the regex rule, where the values are extracted by searching the event for the sequence of characters defined in the regex rule.

In the data intake and query system, a field extractor may be configured to automatically generate extraction rules for certain fields in the events when the events are being created, indexed, or stored, or possibly at a later time. Alternatively, a user may manually define extraction rules for fields using a variety of techniques. In contrast to a conventional schema for a database system, a late-binding schema is not defined at data ingestion time. Instead, the late-binding schema can be developed on an ongoing basis until the time a query is actually executed. This means that extraction rules for the fields specified in a query may be provided in the query itself, or may be located during execution of the query. Hence, as a user learns more about the data in the events, the user can continue to refine the late-binding schema by adding new fields, deleting fields, or modifying the field extraction rules for use the next time the schema is used by the system. Because the data intake and query system maintains the underlying machine data and uses a late-binding schema for searching the machine data, it enables a user to continue investigating and learn valuable insights about the machine data.

In some embodiments, a common field name may be used to reference two or more fields containing equivalent and/or similar data items, even though the fields may be associated with different types of events that possibly have different data formats and different extraction rules. By enabling a common field name to be used to identify equivalent and/or similar fields from different types of events generated by disparate data sources, the system facilitates use of a "common information model" (CIM) across the disparate data sources (further discussed with respect to FIG. 7A).

2.0. Operating Environment

FIG. 1 is a block diagram of an example networked computer environment 100, in accordance with example embodiments. Those skilled in the art would understand that FIG. 1 represents one example of a networked computer system and other embodiments may use different arrangements.

The networked computer system 100 comprises one or more computing devices. These one or more computing devices comprise any combination of hardware and software configured to implement the various logical components described herein. For example, the one or more computing devices may include one or more memories that store instructions for implementing the various components described herein, one or more hardware processors configured to execute the instructions stored in the one or more memories, and various data repositories in the one or more memories for storing data structures utilized and manipulated by the various components.

In some embodiments, one or more client devices 102 are coupled to one or more host devices 106 and a data intake and query system 108 via one or more networks 104. Networks 104 broadly represent one or more LANs, WANs, cellular networks (e.g., LTE, HSPA, 3G, and other cellular technologies), and/or networks using any of wired, wireless, terrestrial microwave, or satellite links, and may include the public Internet.

2.1. Host Devices

In the illustrated embodiment, a system 100 includes one or more host devices 106. Host devices 106 may broadly include any number of computers, virtual machine instances, and/or data centers that are configured to host or execute one or more instances of host applications 114. In general, a host device 106 may be involved, directly or indirectly, in processing requests received from client devices 102. Each host device 106 may comprise, for example, one or more of a network device, a web server, an application server, a database server, etc. A collection of host devices 106 may be configured to implement a network-based service. For example, a provider of a network-based service may configure one or more host devices 106 and host applications 114 (e.g., one or more web servers, application servers, database servers, etc.) to collectively implement the network-based application.

In general, client devices 102 communicate with one or more host applications 114 to exchange information. The communication between a client device 102 and a host application 114 may, for example, be based on the Hypertext Transfer Protocol (HTTP) or any other network protocol. Content delivered from the host application 114 to a client device 102 may include, for example, HTML, documents, media content, etc. The communication between a client device 102 and host application 114 may include sending various requests and receiving data packets. For example, in general, a client device 102 or application running on a client device may initiate communication with a host application 114 by making a request for a specific resource (e.g., based on an HTTP request), and the application server may respond with the requested content stored in one or more response packets.

In the illustrated embodiment, one or more of host applications 114 may generate various types of performance data during operation, including event logs, network data, sensor data, and other types of machine data. For example, a host application 114 comprising a web server may generate one or more web server logs in which details of interactions between the web server and any number of client devices 102 is recorded. As another example, a host device 106 comprising a router may generate one or more router logs that record information related to network traffic managed by the router. As yet another example, a host application 114 comprising a database server may generate one or more logs that record information related to requests sent from other host applications 114 (e.g., web servers or application servers) for data managed by the database server.

2.2. Client Devices

Client devices 102 of FIG. 1 represent any computing device capable of interacting with one or more host devices 106 via a network 104. Examples of client devices 102 may include, without limitation, smartphones, tablet computers, handheld computers, wearable devices, laptop computers, desktop computers, servers, portable media players, gaming devices, and so forth. In general, a client device 102 can provide access to different content, for instance, content provided by one or more host devices 106, etc. Each client device 102 may comprise one or more client applications 110, described in more detail in a separate section hereinafter.

2.3. Client Device Applications

In some embodiments, each client device 102 may host or execute one or more client applications 110 that are capable of interacting with one or more host devices 106 via one or more networks 104. For instance, a client application 110 may be or comprise a web browser that a user may use to navigate to one or more websites or other resources provided by one or more host devices 106. As another example, a client application 110 may comprise a mobile application or "app." For example, an operator of a network-based service hosted by one or more host devices 106 may make available one or more mobile apps that enable users of client devices 102 to access various resources of the network-based service. As yet another example, client applications 110 may include background processes that perform various operations without direct interaction from a user. A client application 110 may include a "plug-in" or "extension" to another application, such as a web browser plug-in or extension.

In some embodiments, a client application 110 may include a monitoring component 112. At a high level, the monitoring component 112 comprises a software component or other logic that facilitates generating performance data related to a client device's operating state, including monitoring network traffic sent and received from the client device and collecting other device and/or application-specific information. Monitoring component 112 may be an integrated component of a client application 110, a plug-in, an extension, or any other type of add-on component. Monitoring component 112 may also be a stand-alone process.

In some embodiments, a monitoring component 112 may be created when a client application 110 is developed, for example, by an application developer using a software development kit (SDK). The SDK may include custom monitoring code that can be incorporated into the code implementing a client application 110. When the code is converted to an executable application, the custom code implementing the monitoring functionality can become part of the application itself.

In some embodiments, an SDK or other code for implementing the monitoring functionality may be offered by a provider of a data intake and query system, such as a system 108. In such cases, the provider of the system 108 can implement the custom code so that performance data generated by the monitoring functionality is sent to the system 108 to facilitate analysis of the performance data by a developer of the client application or other users.

In some embodiments, the custom monitoring code may be incorporated into the code of a client application 110 in a number of different ways, such as the insertion of one or more lines in the client application code that call or otherwise invoke the monitoring component 112. As such, a developer of a client application 110 can add one or more lines of code into the client application 110 to trigger the monitoring component 112 at desired points during execution of the application. Code that triggers the monitoring component may be referred to as a monitor trigger. For instance, a monitor trigger may be included at or near the beginning of the executable code of the client application 110 such that the monitoring component 112 is initiated or triggered as the application is launched, or included at other points in the code that correspond to various actions of the client application, such as sending a network request or displaying a particular interface.

In some embodiments, the monitoring component 112 may monitor one or more aspects of network traffic sent and/or received by a client application 110. For example, the monitoring component 112 may be configured to monitor data packets transmitted to and/or from one or more host applications 114. Incoming and/or outgoing data packets can be read or examined to identify network data contained within the packets, for example, and other aspects of data packets can be analyzed to determine a number of network performance statistics. Monitoring network traffic may enable information to be gathered particular to the network performance associated with a client application 110 or set of applications.

In some embodiments, network performance data refers to any type of data that indicates information about the network and/or network performance. Network performance data may include, for instance, a URL requested, a connection type (e.g., HTTP, HTTPS, etc.), a connection start time, a connection end time, an HTTP status code, request length, response length, request headers, response headers, connection status (e.g., completion, response time(s), failure, etc.), and the like. Upon obtaining network performance data indicating performance of the network, the network performance data can be transmitted to a data intake and query system 108 for analysis.

Upon developing a client application 110 that incorporates a monitoring component 112, the client application 110 can be distributed to client devices 102. Applications generally can be distributed to client devices 102 in any manner, or they can be pre-loaded. In some cases, the application may be distributed to a client device 102 via an application marketplace or other application distribution system. For instance, an application marketplace or other application distribution system might distribute the application to a client device based on a request from the client device to download the application.

Examples of functionality that enables monitoring performance of a client device are described in U.S. patent application Ser. No. 14/524,748, entitled "UTILIZING PACKET HEADERS TO MONITOR NETWORK TRAFFIC IN ASSOCIATION WITH A CLIENT DEVICE", filed on 27 Oct. 2014, and which is hereby incorporated by reference in its entirety for all purposes.

In some embodiments, the monitoring component 112 may also monitor and collect performance data related to one or more aspects of the operational state of a client application 110 and/or client device 102. For example, a monitoring component 112 may be configured to collect device performance information by monitoring one or more client device operations, or by making calls to an operating system and/or one or more other applications executing on a client device 102 for performance information. Device performance information may include, for instance, a current wireless signal strength of the device, a current connection type and network carrier, current memory performance information, a geographic location of the device, a device orientation, and any other information related to the operational state of the client device.

In some embodiments, the monitoring component 112 may also monitor and collect other device profile information including, for example, a type of client device, a manufacturer and model of the device, versions of various software applications installed on the device, and so forth.

In general, a monitoring component 112 may be configured to generate performance data in response to a monitor trigger in the code of a client application 110 or other triggering application event, as described above, and to store the performance data in one or more data records. Each data record, for example, may include a collection of field-value pairs, each field-value pair storing a particular item of performance data in association with a field for the item. For example, a data record generated by a monitoring component 112 may include a "networkLatency" field (not shown in FIG. 1) in which a value is stored. This field indicates a network latency measurement associated with one or more network requests. The data record may include a "state" field to store a value indicating a state of a network connection, and so forth for any number of aspects of collected performance data.

2.4. Data Server System

Figure 2:
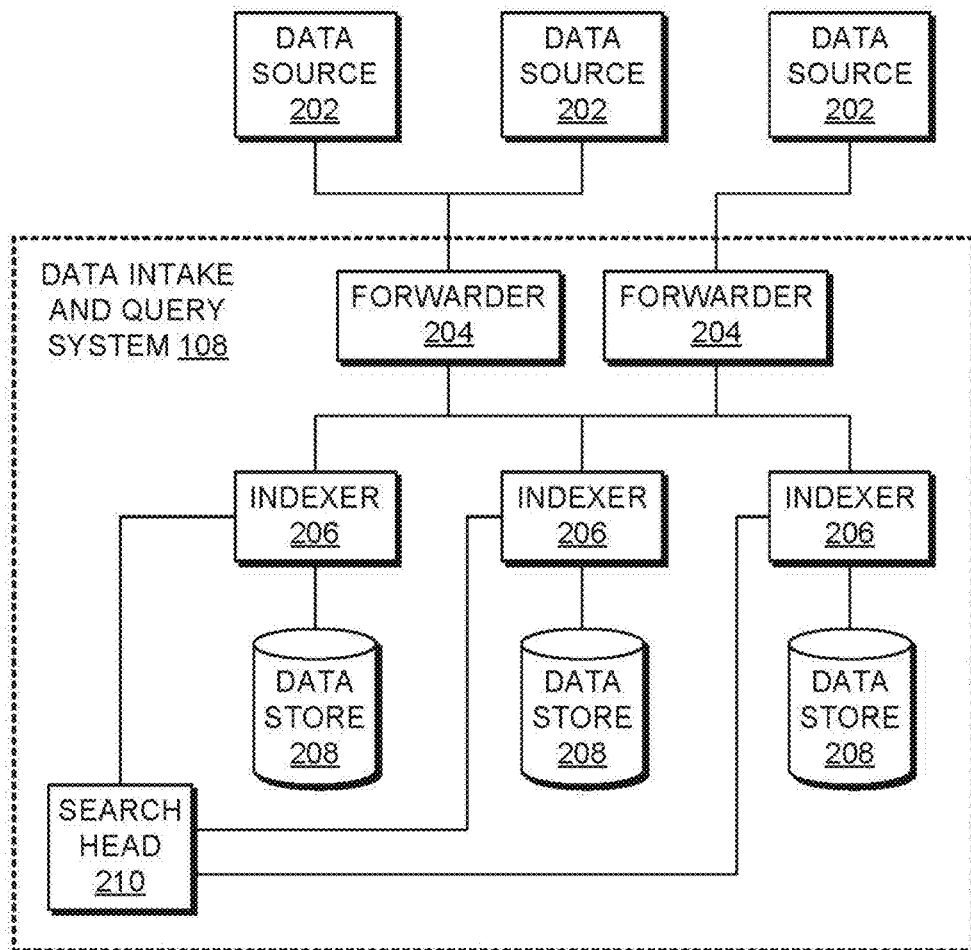
FIG. 2 is a block diagram of an example data intake and query system, in accordance with example embodiments.

FIG. 2 is a block diagram of an example data intake and query system 108, in accordance with example embodiments. System 108 includes one or more forwarders 204 that receive data from a variety of input data sources 202, and one or more indexers 206 that process and store the data in one or more data stores 208. These forwarders 204 and indexers 208 can comprise separate computer systems, or may alternatively comprise separate processes executing on one or more computer systems.

Each data source 202 broadly represents a distinct source of data that can be consumed by system 108. Examples of data sources 202 include, without limitation, data files, directories of files, data sent over a network, event logs, registries, etc.

During operation, the forwarders 204 identify which indexers 206 receive data collected from a data source 202 and forward the data to the appropriate indexers. Forwarders 204 can also perform operations on the data before forwarding, including removing extraneous data, detecting timestamps in the data, parsing data, indexing data, routing data based on criteria relating to the data being routed, and/or performing other data transformations.

In some embodiments, a forwarder 204 may comprise a service accessible to client devices 102 and host devices 106 via a network 104. For example, one type of forwarder 204 may be capable of consuming vast amounts of real-time data from a potentially large number of client devices 102 and/or host devices 106. The forwarder 204 may, for example, comprise a computing device which implements multiple data pipelines or "queues" to handle forwarding of network data to indexers 206. A forwarder 204 may also perform many of the functions that are performed by an indexer. For example, a forwarder 204 may perform keyword extractions on raw data or parse raw data to create events. A forwarder 204 may generate time stamps for events. Additionally or alternatively, a forwarder 204 may perform routing of events to indexers 206. Data store 208 may contain events derived from machine data from a variety of sources all pertaining to the same component in an IT environment, and this data may be produced by the machine in question or by other components in the IT environment.

2.5. Cloud-Based System Overview

The example data intake and query system 108 described in reference to FIG. 2 comprises several system components, including one or more forwarders, indexers, and search heads. In some environments, a user of a data intake and query system 108 may install and configure, on computing devices owned and operated by the user, one or more software applications that implement some or all of these system components. For example, a user may install a software application on server computers owned by the user and configure each server to operate as one or more of a forwarder, an indexer, a search head, etc. This arrangement generally may be referred to as an "on-premises" solution. That is, the system 108 is installed and operates on computing devices directly controlled by the user of the system. Some users may prefer an on-premises solution because it may provide a greater level of control over the configuration of certain aspects of the system (e.g., security, privacy, standards, controls, etc.). However, other users may instead prefer an arrangement in which the user is not directly responsible for providing and managing the computing devices upon which various components of system 108 operate.

In one embodiment, to provide an alternative to an entirely on-premises environment for system 108, one or more of the components of a data intake and query system instead may be provided as a cloud-based service. In this context, a cloud-based service refers to a service hosted by one more computing resources that are accessible to end users over a network, for example, by using a web browser or other application on a client device to interface with the remote computing resources. For example, a service provider may provide a cloud-based data intake and query system by managing computing resources configured to implement various aspects of the system (e.g., forwarders, indexers, search heads, etc.) and by providing access to the system to end users via a network. Typically, a user may pay a subscription or other fee to use such a service. Each subscribing user of the cloud-based service may be provided with an account that enables the user to configure a customized cloud-based system based on the user's preferences.

Figure 3:
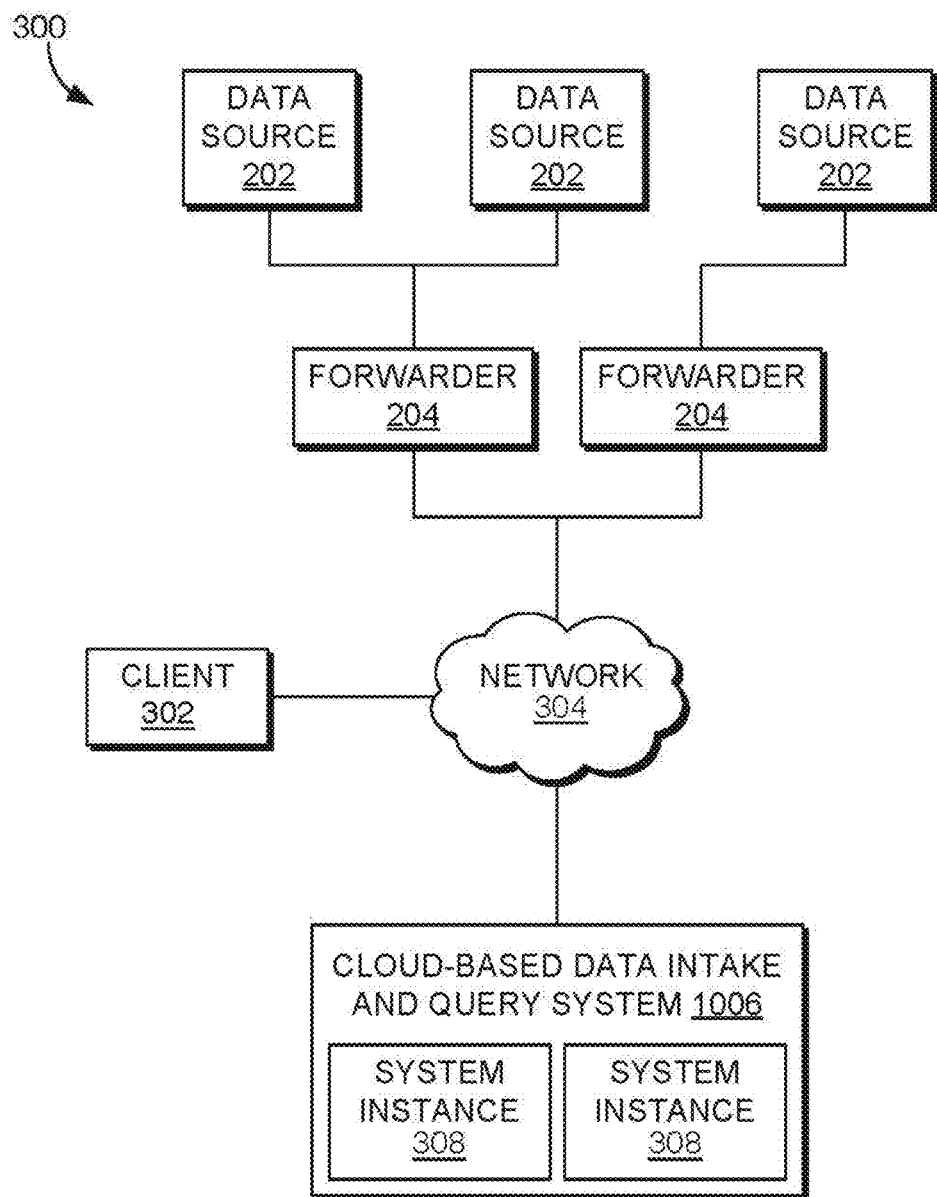
FIG. 3 is a block diagram of an example cloud-based data intake and query system, in accordance with example embodiments.

FIG. 3 illustrates a block diagram of an example cloud-based data intake and query system. Similar to the system of FIG. 2, the networked computer system 300 includes input data sources 202 and forwarders 204. These input data sources and forwarders may be in a subscriber's private computing environment. Alternatively, they might be directly managed by the service provider as part of the cloud service. In the example system 300, one or more forwarders 204 and client devices 302 are coupled to a cloud-based data intake and query system 306 via one or more networks 304. Network 304 broadly represents one or more LANs, WANs, cellular networks, intranetworks, internetworks, etc., using any of wired, wireless, terrestrial microwave, satellite links, etc., and may include the public Internet, and is used by client devices 302 and forwarders 204 to access the system 306. Similar to the system of 38, each of the forwarders 204 may be configured to receive data from an input source and to forward the data to other components of the system 306 for further processing.

In some embodiments, a cloud-based data intake and query system 306 may comprise a plurality of system instances 308. In general, each system instance 308 may include one or more computing resources managed by a provider of the cloud-based system 306 made available to a particular subscriber. The computing resources comprising a system instance 308 may, for example, include one or more servers or other devices configured to implement one or more forwarders, indexers, search heads, and other components of a data intake and query system, similar to system 108. As indicated above, a subscriber may use a web browser or other application of a client device 302 to access a web portal or other interface that enables the subscriber to configure an instance 308.

Providing a data intake and query system as described in reference to system 108 as a cloud-based service presents a number of challenges. Each of the components of a system 108 (e.g., forwarders, indexers, and search heads) may at times refer to various configuration files stored locally at each component. These configuration files typically may involve some level of user configuration to accommodate particular types of data a user desires to analyze and to account for other user preferences. However, in a cloud-based service context, users typically may not have direct access to the underlying computing resources implementing the various system components (e.g., the computing resources comprising each system instance 308) and may desire to make such configurations indirectly, for example, using one or more web-based interfaces. Thus, the techniques and systems described herein for providing user interfaces that enable a user to configure source type definitions are applicable to both on-premises and cloud-based service contexts, or some combination thereof (e.g., a hybrid system where both an on-premises environment, such as SPLUNK® ENTERPRISE, and a cloud-based environment, such as SPLUNK CLOUD™, are centrally visible).

2.6. Searching Externally-Archived Data

FIG. 4 shows a block diagram of an example of a data intake and query system 108 that provides transparent search facilities for data systems that are external to the data intake and query system. Such facilities are available in the Splunk® Analytics for Hadoop® system provided by Splunk Inc. of San Francisco, Calif. Splunk® Analytics for Hadoop® represents an analytics platform that enables business and IT teams to rapidly explore, analyze, and visualize data in Hadoop® and NoSQL data stores.

The search head 210 of the data intake and query system receives search requests from one or more client devices 404 over network connections 420. As discussed above, the data intake and query system 108 may reside in an enterprise location, in the cloud, etc. FIG. 4 illustrates that multiple client devices 404a, 404b, . . . , 404n may communicate with the data intake and query system 108. The client devices 404 may communicate with the data intake and query system using a variety of connections. For example, one client device in FIG. 4 is illustrated as communicating over an Internet (Web) protocol, another client device is illustrated as communicating via a command line interface, and another client device is illustrated as communicating via a software developer kit (SDK).

The search head 210 analyzes the received search request to identify request parameters. If a search request received from one of the client devices 404 references an index maintained by the data intake and query system, then the search head 210 connects to one or more indexers 206 of the data intake and query system for the index referenced in the request parameters. That is, if the request parameters of the search request reference an index, then the search head accesses the data in the index via the indexer. The data intake and query system 108 may include one or more indexers 206, depending on system access resources and requirements. As described further below, the indexers 206 retrieve data from their respective local data stores 208 as specified in the search request. The indexers and their respective data stores can comprise one or more storage devices and typically reside on the same system, though they may be connected via a local network connection.

If the request parameters of the received search request reference an external data collection, which is not accessible to the indexers 206 or under the management of the data intake and query system, then the search head 210 can access the external data collection through an External Result Provider (ERP) process 410. An external data collection may be referred to as a "virtual index" (plural, "virtual indices"). An ERP process provides an interface through which the search head 210 may access virtual indices.

Thus, a search reference to an index of the system relates to a locally stored and managed data collection. In contrast, a search reference to a virtual index relates to an externally stored and managed data collection, which the search head may access through one or more ERP processes 410, 412. FIG. 4 shows two ERP processes 410, 412 that connect to respective remote (external) virtual indices, which are indicated as a Hadoop or another system 414 (e.g., Amazon S3, Amazon EMR, other Hadoop® Compatible File Systems (HCFS), etc.) and a relational database management system (RDBMS) 416. Other virtual indices may include other file organizations and protocols, such as Structured Query Language (SQL) and the like. The ellipses between the ERP processes 410, 412 indicate optional additional ERP processes of the data intake and query system 108. An ERP process may be a computer process that is initiated or spawned by the search head 210 and is executed by the search data intake and query system 108. Alternatively or additionally, an ERP process may be a process spawned by the search head 210 on the same or different host system as the search head 210 resides.

The search head 210 may spawn a single ERP process in response to multiple virtual indices referenced in a search request, or the search head may spawn different ERP processes for different virtual indices. Generally, virtual indices that share common data configurations or protocols may share ERP processes. For example, all search query references to a Hadoop file system may be processed by the same ERP process, if the ERP process is suitably configured. Likewise, all search query references to a SQL database may be processed by the same ERP process. In addition, the search head may provide a common ERP process for common external data source types (e.g., a common vendor may utilize a common ERP process, even if the vendor includes different data storage system types, such as Hadoop and SQL). Common indexing schemes also may be handled by common ERP processes, such as flat text files or Weblog files.

The search head 210 determines the number of ERP processes to be initiated via the use of configuration parameters that are included in a search request message. Generally, there is a one-to-many relationship between an external results provider "family" and ERP processes. There is also a one-to-many relationship between an ERP process and corresponding virtual indices that are referred to in a search request. For example, using RDBMS, assume two independent instances of such a system by one vendor, such as one RDBMS for production and another RDBMS used for development. In such a situation, it is likely preferable (but optional) to use two ERP processes to maintain the independent operation as between production and development data. Both of the ERPs, however, will belong to the same family, because the two RDBMS system types are from the same vendor.

The ERP processes 410, 412 receive a search request from the search head 210. The search head may optimize the received search request for execution at the respective external virtual index. Alternatively, the ERP process may receive a search request as a result of analysis performed by the search head or by a different system process. The ERP processes 410, 412 can communicate with the search head 210 via conventional input/output routines (e.g., standard in/standard out, etc.). In this way, the ERP process receives the search request from a client device such that the search request may be efficiently executed at the corresponding external virtual index.

The ERP processes 410, 412 may be implemented as a process of the data intake and query system. Each ERP process may be provided by the data intake and query system, or may be provided by process or application providers who are independent of the data intake and query system. Each respective ERP process may include an interface application installed at a computer of the external result provider that ensures proper communication between the search support system and the external result provider. The ERP processes 410, 412 generate appropriate search requests in the protocol and syntax of the respective virtual indices 414, 416, each of which corresponds to the search request received by the search head 210. Upon receiving search results from their corresponding virtual indices, the respective ERP process passes the result to the search head 210, which may return or display the results or a processed set of results based on the returned results to the respective client device.

Client devices 404 may communicate with the data intake and query system 108 through a network interface 420, e.g., one or more LANs, WANs, cellular networks, intranetworks, and/or internetworks using any of wired, wireless, terrestrial microwave, satellite links, etc., and may include the public Internet.

The analytics platform utilizing the External Result Provider process described in more detail in U.S. Pat. No. 8,738,629, entitled "External Result Provided Process For RetriEving Data Stored Using A Different Configuration Or Protocol", issued on 27 May 2014, U.S. Pat. No. 8,738,587, entitled "PROCESSING A SYSTEM SEARCH REQUEST BY RETRIEVING RESULTS FROM BOTH A NATIVE INDEX AND A VIRTUAL INDEX", issued on 25 Jul. 2013, U.S. patent application Ser. No. 14/266,832, entitled "PROCESSING A SYSTEM SEARCH REQUEST ACROSS DISPARATE DATA COLLECTION SYSTEMS", filed on 1 May 2014, and U.S. Pat. No. 9,514,189, entitled "PROCESSING A SYSTEM SEARCH REQUEST INCLUDING EXTERNAL DATA SOURCES", issued on 6 Dec. 2016, each of which is hereby incorporated by reference in its entirety for all purposes.

2.6.1. ERP Process Features

The ERP processes described above may include two operation modes: a streaming mode and a reporting mode. The ERP processes can operate in streaming mode only, in reporting mode only, or in both modes simultaneously. Operating in both modes simultaneously is referred to as mixed mode operation. In a mixed mode operation, the ERP at some point can stop providing the search head with streaming results and only provide reporting results thereafter, or the search head at some point may start ignoring streaming results it has been using and only use reporting results thereafter.

The streaming mode returns search results in real time, with minimal processing, in response to the search request. The reporting mode provides results of a search request with processing of the search results prior to providing them to the requesting search head, which in turn provides results to the requesting client device. ERP operation with such multiple modes provides greater performance flexibility with regard to report time, search latency, and resource utilization.

In a mixed mode operation, both streaming mode and reporting mode are operating simultaneously. The streaming mode results (e.g., the machine data obtained from the external data source) are provided to the search head, which can then process the results data (e.g., break the machine data into events, timestamp it, filter it, etc.) and integrate the results data with the results data from other external data sources, and/or from data stores of the search head. The search head performs such processing and can immediately start returning interim (streaming mode) results to the user at the requesting client device; simultaneously, the search head is waiting for the ERP process to process the data it is retrieving from the external data source as a result of the concurrently executing reporting mode.

In some instances, the ERP process initially operates in a mixed mode, such that the streaming mode operates to enable the ERP quickly to return interim results (e.g., some of the machined data or unprocessed data necessary to respond to a search request) to the search head, enabling the search head to process the interim results and begin providing to the client or search requester interim results that are responsive to the query. Meanwhile, in this mixed mode, the ERP also operates concurrently in reporting mode, processing portions of machine data in a manner responsive to the search query. Upon determining that it has results from the reporting mode available to return to the search head, the ERP may halt processing in the mixed mode at that time (or some later time) by stopping the return of data in streaming mode to the search head and switching to reporting mode only. The ERP at this point starts sending interim results in reporting mode to the search head, which in turn may then present this processed data responsive to the search request to the client or search requester. Typically the search head switches from using results from the ERP's streaming mode of operation to results from the ERP's reporting mode of operation when the higher bandwidth results from the reporting mode outstrip the amount of data processed by the search head in the streaming mode of ERP operation.

A reporting mode may have a higher bandwidth because the ERP does not have to spend time transferring data to the search head for processing all the machine data. In addition, the ERP may optionally direct another processor to do the processing.

The streaming mode of operation does not need to be stopped to gain the higher bandwidth benefits of a reporting mode; the search head could simply stop using the streaming mode results—and start using the reporting mode results—when the bandwidth of the reporting mode has caught up with or exceeded the amount of bandwidth provided by the streaming mode. Thus, a variety of triggers and ways to accomplish a search head's switch from using streaming mode results to using reporting mode results may be appreciated by one skilled in the art.

The reporting mode can involve the ERP process (or an external system) performing event breaking, time stamping, filtering of events to match the search query request, and calculating statistics on the results. The user can request particular types of data, such as if the search query itself involves types of events, or the search request may ask for statistics on data, such as on events that meet the search request. In either case, the search head understands the query language used in the received query request, which may be a proprietary language. One exemplary query language is Splunk Processing Language (SPL) developed by the assignee of the application, Splunk Inc. The search head typically understands how to use that language to obtain data from the indexers, which store data in a format used by the SPLUNK® Enterprise system.

The ERP processes support the search head, as the search head is not ordinarily configured to understand the format in which data is stored in external data sources such as Hadoop or SQL data systems. Rather, the ERP process performs that translation from the query submitted in the search support system's native format (e.g., SPL if SPLUNK® ENTERPRISE is used as the search support system) to a search query request format that will be accepted by the corresponding external data system. The external data system typically stores data in a different format from that of the search support system's native index format, and it utilizes a different query language (e.g., SQL or MapReduce, rather than SPL or the like).

As noted, the ERP process can operate in the streaming mode alone. After the ERP process has performed the translation of the query request and received raw results from the streaming mode, the search head can integrate the returned data with any data obtained from local data sources (e.g., native to the search support system), other external data sources, and other ERP processes (if such operations were required to satisfy the terms of the search query). An advantage of mixed mode operation is that, in addition to streaming mode, the ERP process is also executing concurrently in reporting mode. Thus, the ERP process (rather than the search head) is processing query results (e.g., performing event breaking, timestamping, filtering, possibly calculating statistics if required to be responsive to the search query request, etc.). It should be apparent to those skilled in the art that additional time is needed for the ERP process to perform the processing in such a configuration. Therefore, the streaming mode will allow the search head to start returning interim results to the user at the client device before the ERP process can complete sufficient processing to start returning any search results. The switchover between streaming and reporting mode happens when the ERP process determines that the switchover is appropriate, such as when the ERP process determines it can begin returning meaningful results from its reporting mode.

The operation described above illustrates the source of operational latency: streaming mode has low latency (immediate results) and usually has relatively low bandwidth (fewer results can be returned per unit of time). In contrast, the concurrently running reporting mode has relatively high latency (it has to perform a lot more processing before returning any results) and usually has relatively high bandwidth (more results can be processed per unit of time). For example, when the ERP process does begin returning report results, it returns more processed results than in the streaming mode, because, e.g., statistics only need to be calculated to be responsive to the search request. That is, the ERP process doesn't have to take time to first return machine data to the search head. As noted, the ERP process could be configured to operate in streaming mode alone and return just the machine data for the search head to process in a way that is responsive to the search request. Alternatively, the ERP process can be configured to operate in the reporting mode only. Also, the ERP process can be configured to operate in streaming mode and reporting mode concurrently, as described, with the ERP process stopping the transmission of streaming results to the search head when the concurrently running reporting mode has caught up and started providing results. The reporting mode does not require the processing of all machine data that is responsive to the search query request before the ERP process starts returning results; rather, the reporting mode usually performs processing of chunks of events and returns the processing results to the search head for each chunk.

For example, an ERP process can be configured to merely return the contents of a search result file verbatim, with little or no processing of results. That way, the search head performs all processing (such as parsing byte streams into events, filtering, etc.). The ERP process can be configured to perform additional intelligence, such as analyzing the search request and handling all the computation that a native search indexer process would otherwise perform. In this way, the configured ERP process provides greater flexibility in features while operating according to desired preferences, such as response latency and resource requirements.

2.7. Data Ingestion

Figure 5A:
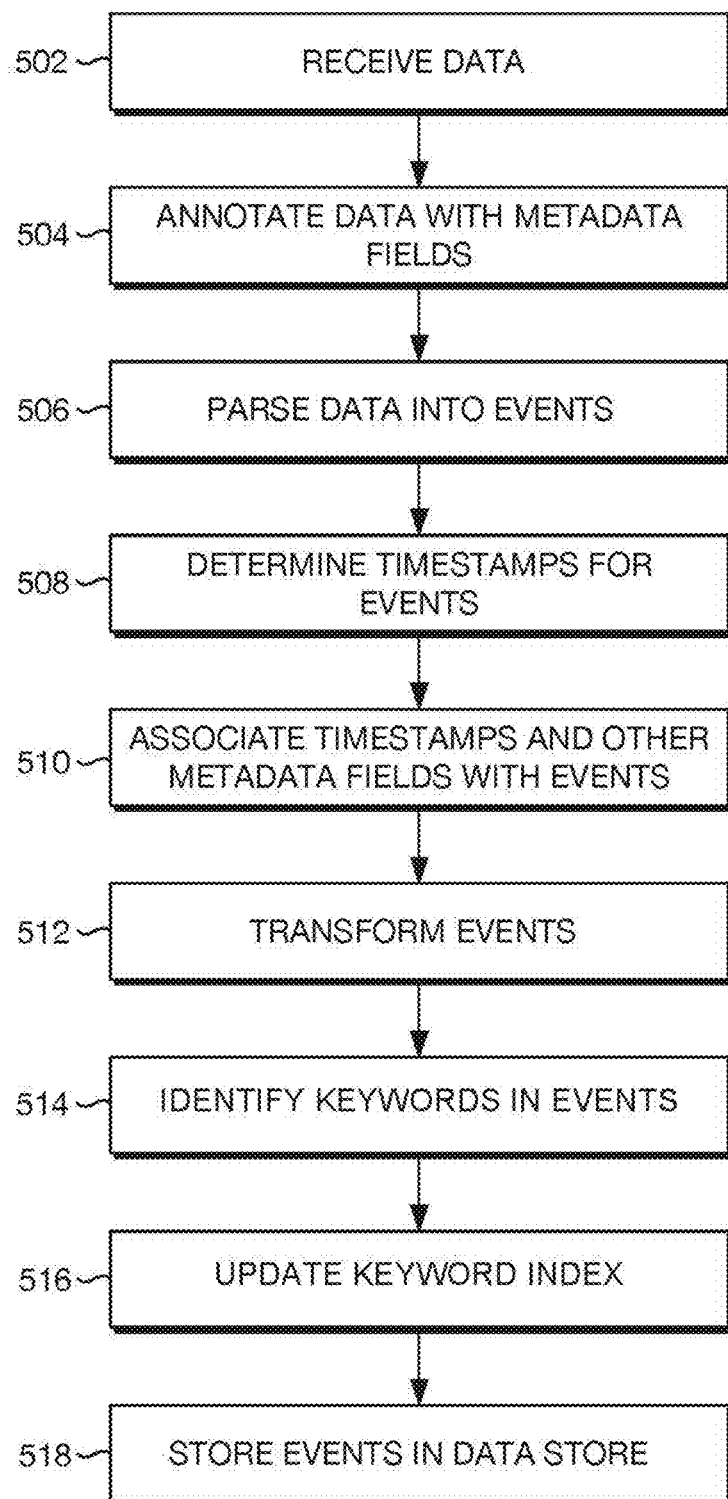
FIG. 5A is a flowchart of an example method that illustrates how indexers process, index, and store data received from forwarders, in accordance with example embodiments.

FIG. 5A is a flow chart of an example method that illustrates how indexers process, index, and store data received from forwarders, in accordance with example embodiments. The data flow illustrated in FIG. 5A is provided for illustrative purposes only; those skilled in the art would understand that one or more of the steps of the processes illustrated in FIG. 5A may be removed or that the ordering of the steps may be changed. Furthermore, for the purposes of illustrating a clear example, one or more particular system components are described in the context of performing various operations during each of the data flow stages. For example, a forwarder is described as receiving and processing machine data during an input phase; an indexer is described as parsing and indexing machine data during parsing and indexing phases; and a search head is described as performing a search query during a search phase. However, other system arrangements and distributions of the processing steps across system components may be used.

2.7.1. Input

At block 502, a forwarder receives data from an input source, such as a data source 202 shown in FIG. 2. A forwarder initially may receive the data as a raw data stream generated by the input source. For example, a forwarder may receive a data stream from a log file generated by an application server, from a stream of network data from a network device, or from any other source of data. In some embodiments, a forwarder receives the raw data and may segment the data stream into "blocks", possibly of a uniform data size, to facilitate subsequent processing steps.

At block 504, a forwarder or other system component annotates each block generated from the raw data with one or more metadata fields. These metadata fields may, for example, provide information related to the data block as a whole and may apply to each event that is subsequently derived from the data in the data block. For example, the metadata fields may include separate fields specifying each of a host, a source, and a source type related to the data block. A host field may contain a value identifying a host name or IP address of a device that generated the data. A source field may contain a value identifying a source of the data, such as a pathname of a file or a protocol and port related to received network data. A source type field may contain a value specifying a particular source type label for the data. Additional metadata fields may also be included during the input phase, such as a character encoding of the data, if known, and possibly other values that provide information relevant to later processing steps. In some embodiments, a forwarder forwards the annotated data blocks to another system component (typically an indexer) for further processing.

The data intake and query system allows forwarding of data from one data intake and query instance to another, or even to a third-party system. The data intake and query system can employ different types of forwarders in a configuration.

In some embodiments, a forwarder may contain the essential components needed to forward data. A forwarder can gather data from a variety of inputs and forward the data to an indexer for indexing and searching. A forwarder can also tag metadata (e.g., source, source type, host, etc.).

In some embodiments, a forwarder has the capabilities of the aforementioned forwarder as well as additional capabilities. The forwarder can parse data before forwarding the data (e.g., can associate a time stamp with a portion of data and create an event, etc.) and can route data based on criteria such as source or type of event. The forwarder can also index data locally while forwarding the data to another indexer.

2.7.2. Parsing

At block 506, an indexer receives data blocks from a forwarder and parses the data to organize the data into events. In some embodiments, to organize the data into events, an indexer may determine a source type associated with each data block (e.g., by extracting a source type label from the metadata fields associated with the data block, etc.) and refer to a source type configuration corresponding to the identified source type. The source type definition may include one or more properties that indicate to the indexer to automatically determine the boundaries within the received data that indicate the portions of machine data for events. In general, these properties may include regular expression-based rules or delimiter rules where, for example, event boundaries may be indicated by predefined characters or character strings. These predefined characters may include punctuation marks or other special characters including, for example, carriage returns, tabs, spaces, line breaks, etc. If a source type for the data is unknown to the indexer, an indexer may infer a source type for the data by examining the structure of the data. Then, the indexer can apply an inferred source type definition to the data to create the events.

At block 508, the indexer determines a timestamp for each event. Similar to the process for parsing machine data, an indexer may again refer to a source type definition associated with the data to locate one or more properties that indicate instructions for determining a timestamp for each event. The properties may, for example, instruct an indexer to extract a time value from a portion of data for the event, to interpolate time values based on timestamps associated with temporally proximate events, to create a timestamp based on a time the portion of machine data was received or generated, to use the timestamp of a previous event, or use any other rules for determining timestamps.

At block 510, the indexer associates with each event one or more metadata fields including a field containing the timestamp determined for the event. In some embodiments, a timestamp may be included in the metadata fields. These metadata fields may include any number of "default fields" that are associated with all events, and may also include one more custom fields as defined by a user. Similar to the metadata fields associated with the data blocks at block 504, the default metadata fields associated with each event may include a host, source, and source type field including or in addition to a field storing the timestamp.

At block 512, an indexer may optionally apply one or more transformations to data included in the events created at block 506. For example, such transformations can include removing a portion of an event (e.g., a portion used to define event boundaries, extraneous characters from the event, other extraneous text, etc.), masking a portion of an event (e.g., masking a credit card number), removing redundant portions of an event, etc. The transformations applied to events may, for example, be specified in one or more configuration files and referenced by one or more source type definitions.

FIG. 5C illustrates an illustrative example of machine data can be stored in a data store in accordance with various disclosed embodiments. In other embodiments, machine data can be stored in a flat file in a corresponding bucket with an associated index file, such as a time series index or "TSIDX." As such, the depiction of machine data and associated metadata as rows and columns in the table of FIG. 5C is merely illustrative and is not intended to limit the data format in which the machine data and metadata is stored in various embodiments described herein. In one particular embodiment, machine data can be stored in a compressed or encrypted formatted. In such embodiments, the machine data can be stored with or be associated with data that describes the compression or encryption scheme with which the machine data is stored. The information about the compression or encryption scheme can be used to decompress or decrypt the machine data, and any metadata with which it is stored, at search time.

As mentioned above, certain metadata, e.g., host 536, source 537, source type 538 and timestamps 535 can be generated for each event, and associated with a corresponding portion of machine data 539 when storing the event data in a data store, e.g., data store 208. Any of the metadata can be extracted from the corresponding machine data, or supplied or defined by an entity, such as a user or computer system. The metadata fields can become part of or stored with the event. Note that while the time-stamp metadata field can be extracted from the raw data of each event, the values for the other metadata fields may be determined by the indexer based on information it receives pertaining to the source of the data separate from the machine data.

While certain default or user-defined metadata fields can be extracted from the machine data for indexing purposes, all the machine data within an event can be maintained in its original condition. As such, in embodiments in which the portion of machine data included in an event is unprocessed or otherwise unaltered, it is referred to herein as a portion of raw machine data. In other embodiments, the port of machine data in an event can be processed or otherwise altered. As such, unless certain information needs to be removed for some reasons (e.g. extraneous information, confidential information), all the raw machine data contained in an event can be preserved and saved in its original form. Accordingly, the data store in which the event records are stored is sometimes referred to as a "raw record data store." The raw record data store contains a record of the raw event data tagged with the various default fields.

In FIG. 5C, the first three rows of the table represent events 531, 532, and 533 and are related to a server access log that records requests from multiple clients processed by a server, as indicated by entry of "access.log" in the source column 536.

In the example shown in FIG. 5C, each of the events 531-534 is associated with a discrete request made from a client device. The raw machine data generated by the server and extracted from a server access log can include the IP address of the client 540, the user id of the person requesting the document 541, the time the server finished processing the request 542, the request line from the client 543, the status code returned by the server to the client 545, the size of the object returned to the client (in this case, the gif file requested by the client) 546 and the time spent to serve the request in microseconds 544. As seen in FIG. 5C, all the raw machine data retrieved from the server access log is retained and stored as part of the corresponding events, 1221, 1222, and 1223 in the data store.

Event 534 is associated with an entry in a server error log, as indicated by "error.log" in the source column 537, that records errors that the server encountered when processing a client request. Similar to the events related to the server access log, all the raw machine data in the error log file pertaining to event 534 can be preserved and stored as part of the event 534.

Saving minimally processed or unprocessed machine data in a data store associated with metadata fields in the manner similar to that shown in FIG. 5C is advantageous because it allows search of all the machine data at search time instead of searching only previously specified and identified fields or field-value pairs. As mentioned above, because data structures used by various embodiments of the present disclosure maintain the underlying raw machine data and use a late-binding schema for searching the raw machines data, it enables a user to continue investigating and learn valuable insights about the raw data. In other words, the user is not compelled to know about all the fields of information that will be needed at data ingestion time. As a user learns more about the data in the events, the user can continue to refine the late-binding schema by defining new extraction rules, or modifying or deleting existing extraction rules used by the system.

2.7.3. Indexing

At blocks 514 and 516, an indexer can optionally generate a keyword index to facilitate fast keyword searching for events. To build a keyword index, at block 514, the indexer identifies a set of keywords in each event. At block 516, the indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword.

In some embodiments, the keyword index may include entries for field name-value pairs found in events, where a field name-value pair can include a pair of keywords connected by a symbol, such as an equals sign or colon. This way, events containing these field name-value pairs can be quickly located. In some embodiments, fields can automatically be generated for some or all of the field names of the field name-value pairs at the time of indexing. For example, if the string "dest=10.0.1.2" is found in an event, a field named "dest" may be created for the event, and assigned a value of "10.0.1.2".

At block 518, the indexer stores the events with an associated timestamp in a data store 208. Timestamps enable a user to search for events based on a time range. In some embodiments, the stored events are organized into "buckets," where each bucket stores events associated with a specific time range based on the timestamps associated with each event. This improves time-based searching, as well as allows for events with recent timestamps, which may have a higher likelihood of being accessed, to be stored in a faster memory to facilitate faster retrieval. For example, buckets containing the most recent events can be stored in flash memory rather than on a hard disk. In some embodiments, each bucket may be associated with an identifier, a time range, and a size constraint.

Each indexer 206 may be responsible for storing and searching a subset of the events contained in a corresponding data store 208. By distributing events among the indexers and data stores, the indexers can analyze events for a query in parallel. For example, using map-reduce techniques, each indexer returns partial responses for a subset of events to a search head that combines the results to produce an answer for the query. By storing events in buckets for specific time ranges, an indexer may further optimize the data retrieval process by searching buckets corresponding to time ranges that are relevant to a query.

In some embodiments, each indexer has a home directory and a cold directory. The home directory of an indexer stores hot buckets and warm buckets, and the cold directory of an indexer stores cold buckets. A hot bucket is a bucket that is capable of receiving and storing events. A warm bucket is a bucket that can no longer receive events for storage but has not yet been moved to the cold directory. A cold bucket is a bucket that can no longer receive events and may be a bucket that was previously stored in the home directory. The home directory may be stored in faster memory, such as flash memory, as events may be actively written to the home directory, and the home directory may typically store events that are more frequently searched and thus are accessed more frequently. The cold directory may be stored in slower and/or larger memory, such as a hard disk, as events are no longer being written to the cold directory, and the cold directory may typically store events that are not as frequently searched and thus are accessed less frequently. In some embodiments, an indexer may also have a quarantine bucket that contains events having potentially inaccurate information, such as an incorrect time stamp associated with the event or a time stamp that appears to be an unreasonable time stamp for the corresponding event. The quarantine bucket may have events from any time range; as such, the quarantine bucket may always be searched at search time. Additionally, an indexer may store old, archived data in a frozen bucket that is not capable of being searched at search time. In some embodiments, a frozen bucket may be stored in slower and/or larger memory, such as a hard disk, and may be stored in offline and/or remote storage.

Moreover, events and buckets can also be replicated across different indexers and data stores to facilitate high availability and disaster recovery as described in U.S. Pat. No. 9,130,971, entitled "Site-Based Search Affinity", issued on 8 Sep. 2015, and in U.S. patent Ser. No. 14/266,817, entitled "Multi-Site Clustering", issued on 1 Sep. 2015, each of which is hereby incorporated by reference in its entirety for all purposes.

Figure 5B:
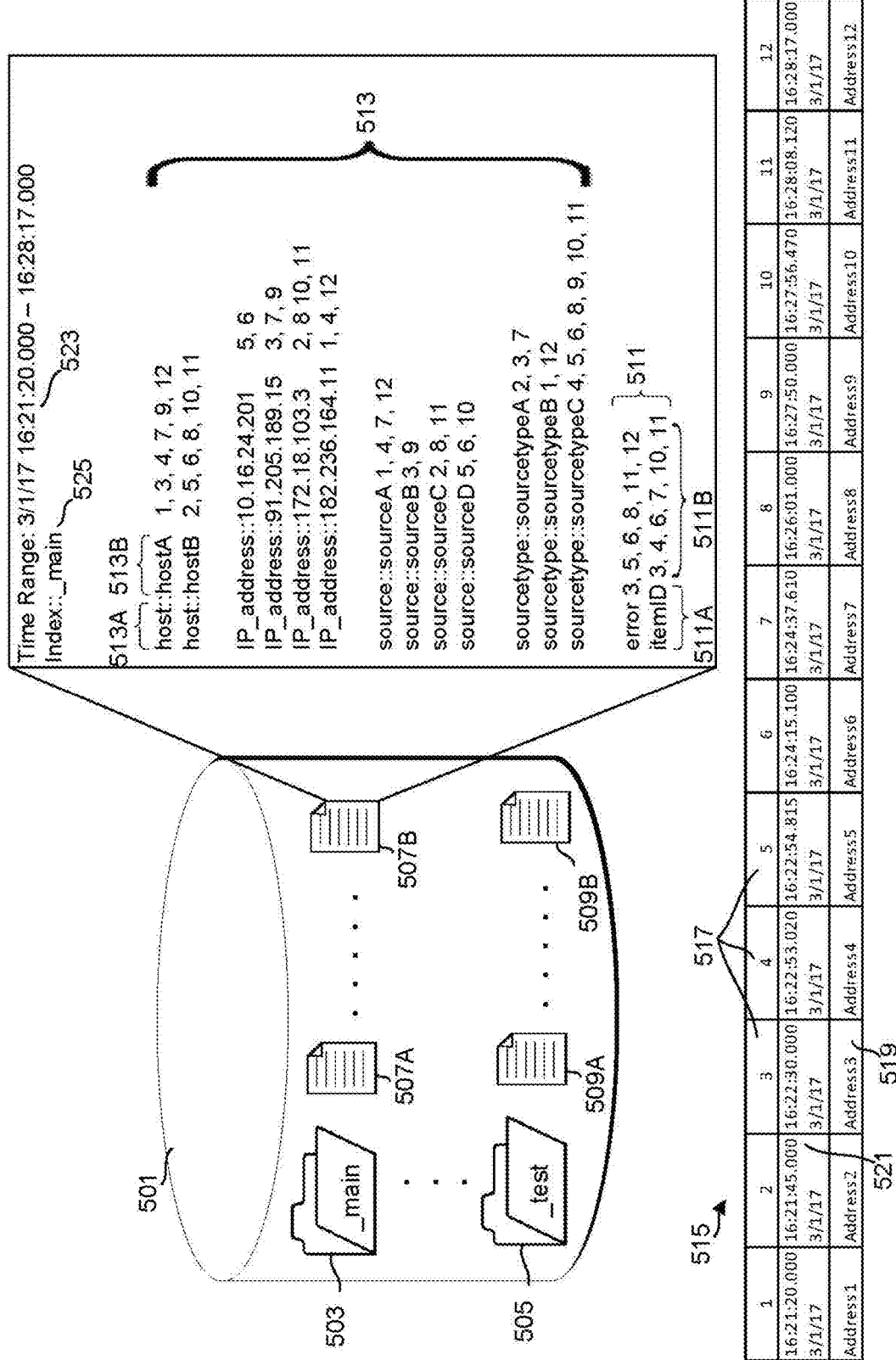
FIG. 5B is a block diagram of a data structure in which time-stamped event data can be stored in a data store, in accordance with example embodiments.

FIG. 5B is a block diagram of an example data store 501 that includes a directory for each index (or partition) that contains a portion of data managed by an indexer. FIG. 5B further illustrates details of an embodiment of an inverted index 507B and an event reference array 515 associated with inverted index 507B.

The data store 501 can correspond to a data store 208 that stores events managed by an indexer 206 or can correspond to a different data store associated with an indexer 206. In the illustrated embodiment, the data store 501 includes a_main directory 503 associated with a_main index and a_test directory 505 associated with a_test index. However, the data store 501 can include fewer or more directories. In some embodiments, multiple indexes can share a single directory or all indexes can share a common directory. Additionally, although illustrated as a single data store 501, it will be understood that the data store 501 can be implemented as multiple data stores storing different portions of the information shown in FIG. 5B. For example, a single index or partition can span multiple directories or multiple data stores, and can be indexed or searched by multiple corresponding indexers.

In the illustrated embodiment of FIG. 5B, the index-specific directories 503 and 505 include inverted indexes 507A, 507B and 509A, 509B, respectively. The inverted indexes 507A . . . 507B, and 509A . . . 509B can be keyword indexes or field-value pair indexes described herein and can include less or more information that depicted in FIG. 5B.

In some embodiments, the inverted index 507A . . . 507B, and 509A . . . 509B can correspond to a distinct time-series bucket that is managed by the indexer 206 and that contains events corresponding to the relevant index (e.g., _main index, _test index). As such, each inverted index can correspond to a particular range of time for an index. Additional files, such as high performance indexes for each time-series bucket of an index, can also be stored in the same directory as the inverted indexes 507A . . . 507B, and 509A . . . 509B. In some embodiments inverted index 507A . . . 507B, and 509A . . . 509B can correspond to multiple time-series buckets or inverted indexes 507A . . . 507B, and 509A . . . 509B can correspond to a single time-series bucket.

Each inverted index 507A . . . 507B, and 509A . . . 509B can include one or more entries, such as keyword (or token) entries or field-value pair entries. Furthermore, in certain embodiments, the inverted indexes 507A . . . 507B, and 509A . . . 509B can include additional information, such as a time range 523 associated with the inverted index or an index identifier 525 identifying the index associated with the inverted index 507A . . . 507B, and 509A . . . 509B. However, each inverted index 507A . . . 507B, and 509A . . . 509B can include less or more information than depicted.

Token entries, such as token entries 511 illustrated in inverted index 507B, can include a token 511A (e.g., "error," "itemID," etc.) and event references 511B indicative of events that include the token. For example, for the token "error," the corresponding token entry includes the token "error" and an event reference, or unique identifier, for each event stored in the corresponding time-series bucket that includes the token "error." In the illustrated embodiment of FIG. 5B, the error token entry includes the identifiers 3, 5, 6, 8, 11, and 12 corresponding to events managed by the indexer 206 and associated with the index_main 503 that are located in the time-series bucket associated with the inverted index 507B.

In some cases, some token entries can be default entries, automatically determined entries, or user specified entries. In some embodiments, the indexer 206 can identify each word or string in an event as a distinct token and generate a token entry for it. In some cases, the indexer 206 can identify the beginning and ending of tokens based on punctuation, spaces, as described in greater detail herein. In certain cases, the indexer 206 can rely on user input or a configuration file to identify tokens for token entries 511, etc. It will be understood that any combination of token entries can be included as a default, automatically determined, or included based on user-specified criteria.

Similarly, field-value pair entries, such as field-value pair entries 513 shown in inverted index 507B, can include a field-value pair 513A and event references 513B indicative of events that include a field value that corresponds to the field-value pair. For example, for a field-value pair sourcetype::sendmail, a field-value pair entry would include the field-value pair sourcetype::sendmail and a unique identifier, or event reference, for each event stored in the corresponding time-series bucket that includes a sendmail sourcetype.

In some cases, the field-value pair entries 513 can be default entries, automatically determined entries, or user specified entries. As a non-limiting example, the field-value pair entries for the fields host, source, sourcetype can be included in the inverted indexes 507A . . . 507B, and 509A . . . 509B as a default. As such, all of the inverted indexes 507A . . . 507B, and 509A . . . 509B can include field-value pair entries for the fields host, source, sourcetype. As yet another non-limiting example, the field-value pair entries for the IP_address field can be user specified and may only appear in the inverted index 507B based on user-specified criteria. As another non-limiting example, as the indexer indexes the events, it can automatically identify field-value pairs and create field-value pair entries. For example, based on the indexers review of events, it can identify IP_address as a field in each event and add the IP_address field-value pair entries to the inverted index 507B. It will be understood that any combination of field-value pair entries can be included as a default, automatically determined, or included based on user-specified criteria.

Each unique identifier 517, or event reference, can correspond to a unique event located in the time series bucket. However, the same event reference can be located in multiple entries. For example if an event has a sourcetype splunkd, host www1 and token "warning," then the unique identifier for the event will appear in the field-value pair entries sourcetype::splunkd and host::www1, as well as the token entry "warning." With reference to the illustrated embodiment of FIG. 5B and the event that corresponds to the event reference 3, the event reference 3 is found in the field-value pair entries 513 host::hostA, source::sourceB, sourcetype::sourcetypeA, and IP_address::91.205.189.15 indicating that the event corresponding to the event references is from hostA, sourceB, of sourcetypeA, and includes 91.205.189.15 in the event data.

For some fields, the unique identifier is located in only one field-value pair entry for a particular field. For example, the inverted index may include four sourcetype field-value pair entries corresponding to four different sourcetypes of the events stored in a bucket (e.g., sourcetypes: sendmail, splunkd, web_access, and web_service). Within those four sourcetype field-value pair entries, an identifier for a particular event may appear in only one of the field-value pair entries. With continued reference to the example illustrated embodiment of FIG. 5B, since the event reference 7 appears in the field-value pair entry sourcetype::sourcetypeA, then it does not appear in the other field-value pair entries for the sourcetype field, including sourcetype::sourcetypeB, sourcetype::sourcetypeC, and sourcetype::sourcetypeD.

The event references 517 can be used to locate the events in the corresponding bucket. For example, the inverted index can include, or be associated with, an event reference array 515. The event reference array 515 can include an array entry 517 for each event reference in the inverted index 507B. Each array entry 517 can include location information 519 of the event corresponding to the unique identifier (non-limiting example: seek address of the event), a timestamp 521 associated with the event, or additional information regarding the event associated with the event reference, etc.

For each token entry 511 or field-value pair entry 513, the event reference 501B or unique identifiers can be listed in chronological order or the value of the event reference can be assigned based on chronological data, such as a timestamp associated with the event referenced by the event reference. For example, the event reference 1 in the illustrated embodiment of FIG. 5B can correspond to the first-in-time event for the bucket, and the event reference 12 can correspond to the last-in-time event for the bucket. However, the event references can be listed in any order, such as reverse chronological order, ascending order, descending order, or some other order, etc. Further, the entries can be sorted. For example, the entries can be sorted alphabetically (collectively or within a particular group), by entry origin (e.g., default, automatically generated, user-specified, etc.), by entry type (e.g., field-value pair entry, token entry, etc.), or chronologically by when added to the inverted index, etc. In the illustrated embodiment of FIG. 5B, the entries are sorted first by entry type and then alphabetically.

As a non-limiting example of how the inverted indexes 507A . . . 507B, and 509A . . . 509B can be used during a data categorization request command, the indexers can receive filter criteria indicating data that is to be categorized and categorization criteria indicating how the data is to be categorized. Example filter criteria can include, but is not limited to, indexes (or partitions), hosts, sources, sourcetypes, time ranges, field identifier, keywords, etc.

Using the filter criteria, the indexer identifies relevant inverted indexes to be searched. For example, if the filter criteria includes a set of partitions, the indexer can identify the inverted indexes stored in the directory corresponding to the particular partition as relevant inverted indexes. Other means can be used to identify inverted indexes associated with a partition of interest. For example, in some embodiments, the indexer can review an entry in the inverted indexes, such as an index-value pair entry 513 to determine if a particular inverted index is relevant. If the filter criteria does not identify any partition, then the indexer can identify all inverted indexes managed by the indexer as relevant inverted indexes.

Similarly, if the filter criteria includes a time range, the indexer can identify inverted indexes corresponding to buckets that satisfy at least a portion of the time range as relevant inverted indexes. For example, if the time range is last hour then the indexer can identify all inverted indexes that correspond to buckets storing events associated with timestamps within the last hour as relevant inverted indexes.

When used in combination, an index filter criterion specifying one or more partitions and a time range filter criterion specifying a particular time range can be used to identify a subset of inverted indexes within a particular directory (or otherwise associated with a particular partition) as relevant inverted indexes. As such, the indexer can focus the processing to only a subset of the total number of inverted indexes that the indexer manages.

Once the relevant inverted indexes are identified, the indexer can review them using any additional filter criteria to identify events that satisfy the filter criteria. In some cases, using the known location of the directory in which the relevant inverted indexes are located, the indexer can determine that any events identified using the relevant inverted indexes satisfy an index filter criterion. For example, if the filter criteria includes a partition main, then the indexer can determine that any events identified using inverted indexes within the partition main directory (or otherwise associated with the partition main) satisfy the index filter criterion.

Furthermore, based on the time range associated with each inverted index, the indexer can determine that that any events identified using a particular inverted index satisfies a time range filter criterion. For example, if a time range filter criterion is for the last hour and a particular inverted index corresponds to events within a time range of 50 minutes ago to 35 minutes ago, the indexer can determine that any events identified using the particular inverted index satisfy the time range filter criterion. Conversely, if the particular inverted index corresponds to events within a time range of 59 minutes ago to 62 minutes ago, the indexer can determine that some events identified using the particular inverted index may not satisfy the time range filter criterion.

Using the inverted indexes, the indexer can identify event references (and therefore events) that satisfy the filter criteria. For example, if the token "error" is a filter criterion, the indexer can track all event references within the token entry "error." Similarly, the indexer can identify other event references located in other token entries or field-value pair entries that match the filter criteria. The system can identify event references located in all of the entries identified by the filter criteria. For example, if the filter criteria include the token "error" and field-value pair sourcetype::web_ui, the indexer can track the event references found in both the token entry "error" and the field-value pair entry sourcetype::web_ui. As mentioned previously, in some cases, such as when multiple values are identified for a particular filter criterion (e.g., multiple sources for a source filter criterion), the system can identify event references located in at least one of the entries corresponding to the multiple values and in all other entries identified by the filter criteria. The indexer can determine that the events associated with the identified event references satisfy the filter criteria.

In some cases, the indexer can further consult a timestamp associated with the event reference to determine whether an event satisfies the filter criteria. For example, if an inverted index corresponds to a time range that is partially outside of a time range filter criterion, then the indexer can consult a timestamp associated with the event reference to determine whether the corresponding event satisfies the time range criterion. In some embodiments, to identify events that satisfy a time range, the indexer can review an array, such as the event reference array 1614 that identifies the time associated with the events. Furthermore, as mentioned above using the known location of the directory in which the relevant inverted indexes are located (or other index identifier), the indexer can determine that any events identified using the relevant inverted indexes satisfy the index filter criterion.

In some cases, based on the filter criteria, the indexer reviews an extraction rule. In certain embodiments, if the filter criteria includes a field name that does not correspond to a field-value pair entry in an inverted index, the indexer can review an extraction rule, which may be located in a configuration file, to identify a field that corresponds to a field-value pair entry in the inverted index.

For example, the filter criteria includes a field name "sessionID" and the indexer determines that at least one relevant inverted index does not include a field-value pair entry corresponding to the field name sessionID, the indexer can review an extraction rule that identifies how the sessionID field is to be extracted from a particular host, source, or sourcetype (implicitly identifying the particular host, source, or sourcetype that includes a sessionID field). The indexer can replace the field name "sessionID" in the filter criteria with the identified host, source, or sourcetype. In some cases, the field name "sessionID" may be associated with multiples hosts, sources, or sourcetypes, in which case, all identified hosts, sources, and sourcetypes can be added as filter criteria. In some cases, the identified host, source, or sourcetype can replace or be appended to a filter criterion, or be excluded. For example, if the filter criteria includes a criterion for source S1 and the "sessionID" field is found in source S2, the source S2 can replace S1 in the filter criteria, be appended such that the filter criteria includes source S1 and source S2, or be excluded based on the presence of the filter criterion source S1. If the identified host, source, or sourcetype is included in the filter criteria, the indexer can then identify a field-value pair entry in the inverted index that includes a field value corresponding to the identity of the particular host, source, or sourcetype identified using the extraction rule.

Once the events that satisfy the filter criteria are identified, the system, such as the indexer 206 can categorize the results based on the categorization criteria. The categorization criteria can include categories for grouping the results, such as any combination of partition, source, sourcetype, or host, or other categories or fields as desired.

The indexer can use the categorization criteria to identify categorization criteria-value pairs or categorization criteria values by which to categorize or group the results. The categorization criteria-value pairs can correspond to one or more field-value pair entries stored in a relevant inverted index, one or more index-value pairs based on a directory in which the inverted index is located or an entry in the inverted index (or other means by which an inverted index can be associated with a partition), or other criteria-value pair that identifies a general category and a particular value for that category. The categorization criteria values can correspond to the value portion of the categorization criteria-value pair.

As mentioned, in some cases, the categorization criteria-value pairs can correspond to one or more field-value pair entries stored in the relevant inverted indexes. For example, the categorization criteria-value pairs can correspond to field-value pair entries of host, source, and sourcetype (or other field-value pair entry as desired). For instance, if there are ten different hosts, four different sources, and five different sourcetypes for an inverted index, then the inverted index can include ten host field-value pair entries, four source field-value pair entries, and five sourcetype field-value pair entries. The indexer can use the nineteen distinct field-value pair entries as categorization criteria-value pairs to group the results.

Specifically, the indexer can identify the location of the event references associated with the events that satisfy the filter criteria within the field-value pairs, and group the event references based on their location. As such, the indexer can identify the particular field value associated with the event corresponding to the event reference. For example, if the categorization criteria include host and sourcetype, the host field-value pair entries and sourcetype field-value pair entries can be used as categorization criteria-value pairs to identify the specific host and sourcetype associated with the events that satisfy the filter criteria.

In addition, as mentioned, categorization criteria-value pairs can correspond to data other than the field-value pair entries in the relevant inverted indexes. For example, if partition or index is used as a categorization criterion, the inverted indexes may not include partition field-value pair entries. Rather, the indexer can identify the categorization criteria-value pair associated with the partition based on the directory in which an inverted index is located, information in the inverted index, or other information that associates the inverted index with the partition, etc. As such a variety of methods can be used to identify the categorization criteria-value pairs from the categorization criteria.

Accordingly based on the categorization criteria (and categorization criteria-value pairs), the indexer can generate groupings based on the events that satisfy the filter criteria. As a non-limiting example, if the categorization criteria includes a partition and sourcetype, then the groupings can correspond to events that are associated with each unique combination of partition and sourcetype. For instance, if there are three different partitions and two different sourcetypes associated with the identified events, then the six different groups can be formed, each with a unique partition value-sourcetype value combination. Similarly, if the categorization criteria includes partition, sourcetype, and host and there are two different partitions, three sourcetypes, and five hosts associated with the identified events, then the indexer can generate up to thirty groups for the results that satisfy the filter criteria. Each group can be associated with a unique combination of categorization criteria-value pairs (e.g., unique combinations of partition value sourcetype value, and host value).

In addition, the indexer can count the number of events associated with each group based on the number of events that meet the unique combination of categorization criteria for a particular group (or match the categorization criteria-value pairs for the particular group). With continued reference to the example above, the indexer can count the number of events that meet the unique combination of partition, sourcetype, and host for a particular group.

Each indexer communicates the groupings to the search head. The search head can aggregate the groupings from the indexers and provide the groupings for display. In some cases, the groups are displayed based on at least one of the host, source, sourcetype, or partition associated with the groupings. In some embodiments, the search head can further display the groups based on display criteria, such as a display order or a sort order as described in greater detail above.

As a non-limiting example and with reference to FIG. 5B, consider a request received by an indexer 206 that includes the following filter criteria: keyword=error, partition=_main, time range=3/1/17 16:22.00.000-16:28.00.000, sourcetype=sourcetypeC, host=hostB, and the following categorization criteria: source.

Based on the above criteria, the indexer 206 identifies_ main directory 503 and can ignore_test directory 505 and any other partition-specific directories. The indexer determines that inverted partition 507B is a relevant partition based on its location within the_main directory 503 and the time range associated with it. For sake of simplicity in this example, the indexer 206 determines that no other inverted indexes in the_main directory 503, such as inverted index 507A satisfy the time range criterion.

Having identified the relevant inverted index 507B, the indexer reviews the token entries 511 and the field-value pair entries 513 to identify event references, or events, that satisfy all of the filter criteria.

With respect to the token entries 511, the indexer can review the error token entry and identify event references 3, 5, 6, 8, 11, 12, indicating that the term "error" is found in the corresponding events. Similarly, the indexer can identify event references 4, 5, 6, 8, 9, 10, 11 in the field-value pair entry sourcetype::sourcetypeC and event references 2, 5, 6, 8, 10, 11 in the field-value pair entry host::hostB. As the filter criteria did not include a source or an IP_address field-value pair, the indexer can ignore those field-value pair entries.

In addition to identifying event references found in at least one token entry or field-value pair entry (e.g., event references 3, 4, 5, 6, 8, 9, 10, 11, 12), the indexer can identify events (and corresponding event references) that satisfy the time range criterion using the event reference array 1614 (e.g., event references 2, 3, 4, 5, 6, 7, 8, 9, 10). Using the information obtained from the inverted index 507B (including the event reference array 515), the indexer 206 can identify the event references that satisfy all of the filter criteria (e.g., event references 5, 6, 8).

Having identified the events (and event references) that satisfy all of the filter criteria, the indexer 206 can group the event references using the received categorization criteria (source). In doing so, the indexer can determine that event references 5 and 6 are located in the field-value pair entry source::sourceD (or have matching categorization criteria-value pairs) and event reference 8 is located in the field-value pair entry source::sourceC. Accordingly, the indexer can generate a sourceC group having a count of one corresponding to reference 8 and a sourceD group having a count of two corresponding to references 5 and 6. This information can be communicated to the search head. In turn the search head can aggregate the results from the various indexers and display the groupings. As mentioned above, in some embodiments, the groupings can be displayed based at least in part on the categorization criteria, including at least one of host, source, sourcetype, or partition.

It will be understood that a change to any of the filter criteria or categorization criteria can result in different groupings. As a one non-limiting example, a request received by an indexer 206 that includes the following filter criteria: partition=_main, time range=3/1/17 3/1/17 16:21:20.000-16:28:17.000, and the following categorization criteria: host, source, sourcetype would result in the indexer identifying event references 1-12 as satisfying the filter criteria. The indexer would then generate up to 24 groupings corresponding to the 24 different combinations of the categorization criteria-value pairs, including host (hostA, hostB), source (sourceA, sourceB, sourceC, sourceD), and sourcetype (sourcetypeA, sourcetypeB, sourcetypeC). However, as there are only twelve events identifiers in the illustrated embodiment and some fall into the same grouping, the indexer generates eight groups and counts as follows:

Group 1 (hostA, sourceA, sourcetypeA): 1 (event reference 7)

Group 2 (hostA, sourceA, sourcetypeB): 2 (event references 1, 12)

Group 3 (hostA, sourceA, sourcetypeC): 1 (event reference 4)

Group 4 (hostA, sourceB, sourcetypeA): 1 (event reference 3)

Group 5 (hostA, sourceB, sourcetypeC): 1 (event reference 9)

Group 6 (hostB, sourceC, sourcetypeA): 1 (event reference 2)

Group 7 (hostB, sourceC, sourcetypeC): 2 (event references 8, 11)

Group 8 (hostB, sourceD, sourcetypeC): 3 (event references 5, 6, 10)

As noted, each group has a unique combination of categorization criteria-value pairs or categorization criteria values. The indexer communicates the groups to the search head for aggregation with results received from other indexers. In communicating the groups to the search head, the indexer can include the categorization criteria-value pairs for each group and the count. In some embodiments, the indexer can include more or less information. For example, the indexer can include the event references associated with each group and other identifying information, such as the indexer or inverted index used to identify the groups.

As another non-limiting examples, a request received by an indexer 206 that includes the following filter criteria: partition=_main, time range=3/1/17 3/1/17 16:21:20.000-

16:28:17.000, source=sourceA, sourceD, and keyword=itemID and the following categorization criteria: host, source, sourcetype would result in the indexer identifying event references 4, 7, and 10 as satisfying the filter criteria, and generate the following groups:

Group 1 (hostA, sourceA, sourcetypeC): 1 (event reference 4)

Group 2 (hostA, sourceA, sourcetypeA): 1 (event reference 7)

Group 3 (hostB, sourceD, sourcetypeC): 1 (event references 10)

The indexer communicates the groups to the search head for aggregation with results received from other indexers. As will be understand there are myriad ways for filtering and categorizing the events and event references. For example, the indexer can review multiple inverted indexes associated with a partition or review the inverted indexes of multiple partitions, and categorize the data using any one or any combination of partition, host, source, sourcetype, or other category, as desired.

Further, if a user interacts with a particular group, the indexer can provide additional information regarding the group. For example, the indexer can perform a targeted search or sampling of the events that satisfy the filter criteria and the categorization criteria for the selected group, also referred to as the filter criteria corresponding to the group or filter criteria associated with the group.

In some cases, to provide the additional information, the indexer relies on the inverted index. For example, the indexer can identify the event references associated with the events that satisfy the filter criteria and the categorization criteria for the selected group and then use the event reference array 515 to access some or all of the identified events. In some cases, the categorization criteria values or categorization criteria-value pairs associated with the group become part of the filter criteria for the review.

With reference to FIG. 5B for instance, suppose a group is displayed with a count of six corresponding to event references 4, 5, 6, 8, 10, 11 (i.e., event references 4, 5, 6, 8, 10, 11 satisfy the filter criteria and are associated with matching categorization criteria values or categorization criteria-value pairs) and a user interacts with the group (e.g., selecting the group, clicking on the group, etc.). In response, the search head communicates with the indexer to provide additional information regarding the group.

In some embodiments, the indexer identifies the event references associated with the group using the filter criteria and the categorization criteria for the group (e.g., categorization criteria values or categorization criteria-value pairs unique to the group). Together, the filter criteria and the categorization criteria for the group can be referred to as the filter criteria associated with the group. Using the filter criteria associated with the group, the indexer identifies event references 4, 5, 6, 8, 10, 11.

Based on a sampling criteria, discussed in greater detail above, the indexer can determine that it will analyze a sample of the events associated with the event references 4, 5, 6, 8, 10, 11. For example, the sample can include analyzing event data associated with the event references 5, 8, 10. In some embodiments, the indexer can use the event reference array 1616 to access the event data associated with the event references 5, 8, 10. Once accessed, the indexer can compile the relevant information and provide it to the search head for aggregation with results from other indexers. By identifying events and sampling event data using the inverted indexes, the indexer can reduce the amount of actual data this is analyzed and the number of events that are accessed in order to generate the summary of the group and provide a response in less time.

2.8. Query Processing

Figure 6A:
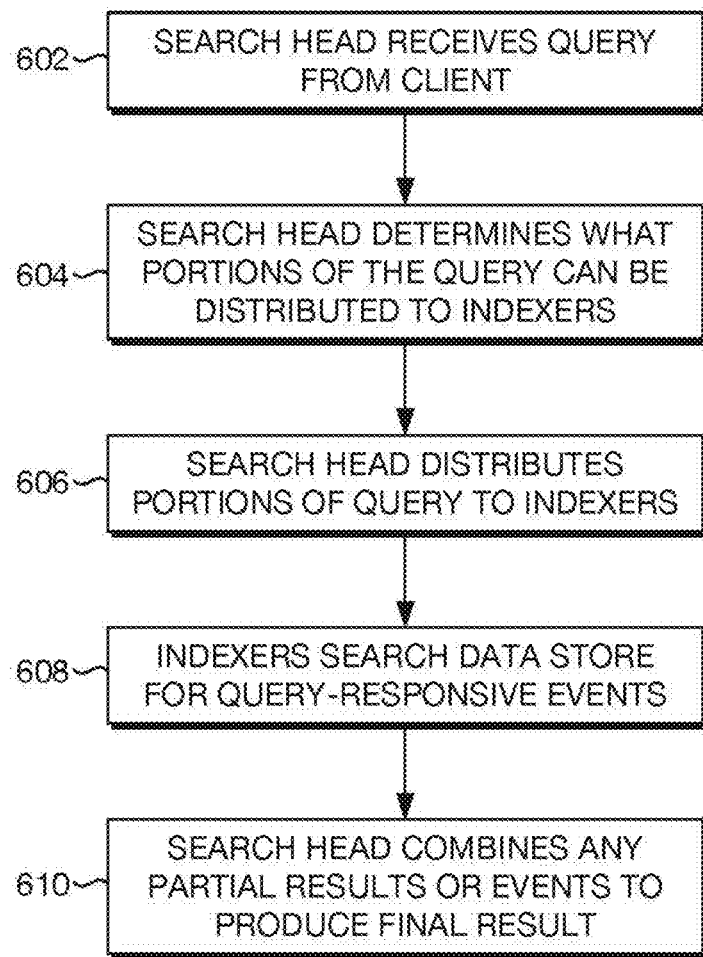
FIG. 6A is a flow diagram of an example method that illustrates how a search head and indexers perform a search query, in accordance with example embodiments.

FIG. 6A is a flow diagram of an example method that illustrates how a search head and indexers perform a search query, in accordance with example embodiments. At block 602, a search head receives a search query from a client. At block 604, the search head analyzes the search query to determine what portion(s) of the query can be delegated to indexers and what portions of the query can be executed locally by the search head. At block 606, the search head distributes the determined portions of the query to the appropriate indexers. In some embodiments, a search head cluster may take the place of an independent search head where each search head in the search head cluster coordinates with peer search heads in the search head cluster to schedule jobs, replicate search results, update configurations, fulfill search requests, etc. In some embodiments, the search head (or each search head) communicates with a master node (also known as a cluster master, not shown in FIG. 2) that provides the search head with a list of indexers to which the search head can distribute the determined portions of the query. The master node maintains a list of active indexers and can also designate which indexers may have responsibility for responding to queries over certain sets of events. A search head may communicate with the master node before the search head distributes queries to indexers to discover the addresses of active indexers.

At block 608, the indexers to which the query was distributed, search data stores associated with them for events that are responsive to the query. To determine which events are responsive to the query, the indexer searches for events that match the criteria specified in the query. These criteria can include matching keywords or specific values for certain fields. The searching operations at block 608 may use the late-binding schema to extract values for specified fields from events at the time the query is processed. In some embodiments, one or more rules for extracting field values may be specified as part of a source type definition in a configuration file. The indexers may then either send the relevant events back to the search head, or use the events to determine a partial result, and send the partial result back to the search head.

At block 610, the search head combines the partial results and/or events received from the indexers to produce a final result for the query. In some examples, the results of the query are indicative of performance or security of the IT environment and may help improve the performance of components in the IT environment. This final result may comprise different types of data depending on what the query requested. For example, the results can include a listing of matching events returned by the query, or some type of visualization of the data from the returned events. In another example, the final result can include one or more calculated values derived from the matching events.

The results generated by the system 108 can be returned to a client using different techniques. For example, one technique streams results or relevant events back to a client in real-time as they are identified. Another technique waits to report the results to the client until a complete set of results (which may include a set of relevant events or a result based on relevant events) is ready to return to the client. Yet another technique streams interim results or relevant events back to the client in real-time until a complete set of results is ready, and then returns the complete set of results to the client. In another technique, certain results are stored as "search jobs" and the client may retrieve the results by referring the search jobs.

The search head can also perform various operations to make the search more efficient. For example, before the search head begins execution of a query, the search head can determine a time range for the query and a set of common keywords that all matching events include. The search head may then use these parameters to query the indexers to obtain a superset of the eventual results. Then, during a filtering stage, the search head can perform field-extraction operations on the superset to produce a reduced set of search results. This speeds up queries, which may be particularly helpful for queries that are performed on a periodic basis.

2.9. Pipelined Search Language

Various embodiments of the present disclosure can be implemented using, or in conjunction with, a pipelined command language. A pipelined command language is a language in which a set of inputs or data is operated on by a first command in a sequence of commands, and then subsequent commands in the order they are arranged in the sequence. Such commands can include any type of functionality for operating on data, such as retrieving, searching, filtering, aggregating, processing, transmitting, and the like. As described herein, a query can thus be formulated in a pipelined command language and include any number of ordered or unordered commands for operating on data.

Splunk Processing Language (SPL) is an example of a pipelined command language in which a set of inputs or data is operated on by any number of commands in a particular sequence. A sequence of commands, or command sequence, can be formulated such that the order in which the commands are arranged defines the order in which the commands are applied to a set of data or the results of an earlier executed command. For example, a first command in a command sequence can operate to search or filter for specific data in particular set of data. The results of the first command can then be passed to another command listed later in the command sequence for further processing.

In various embodiments, a query can be formulated as a command sequence defined in a command line of a search UI. In some embodiments, a query can be formulated as a sequence of SPL commands. Some or all of the SPL commands in the sequence of SPL commands can be separated from one another by a pipe symbol "|". In such embodiments, a set of data, such as a set of events, can be operated on by a first SPL command in the sequence, and then a subsequent SPL command following a pipe symbol "|" after the first SPL command operates on the results produced by the first SPL command or other set of data, and so on for any additional SPL commands in the sequence. As such, a query formulated using SPL comprises a series of consecutive commands that are delimited by pipe "|" characters. The pipe character indicates to the system that the output or result of one command (to the left of the pipe) should be used as the input for one of the subsequent commands (to the right of the pipe). This enables formulation of queries defined by a pipeline of sequenced commands that refines or enhances the data at each step along the pipeline until the desired results are attained. Accordingly, various embodiments described herein can be implemented with Splunk Processing Language (SPL) used in conjunction with the SPLUNK® ENTERPRISE system.

While a query can be formulated in many ways, a query can start with a search command and one or more corresponding search terms at the beginning of the pipeline. Such search terms can include any combination of keywords, phrases, times, dates, Boolean expressions, fieldname-field value pairs, etc. that specify which results should be obtained from an index. The results can then be passed as inputs into subsequent commands in a sequence of commands by using, for example, a pipe character. The subsequent commands in a sequence can include directives for additional processing of the results once it has been obtained from one or more indexes. For example, commands may be used to filter unwanted information out of the results, extract more information, evaluate field values, calculate statistics, reorder the results, create an alert, create summary of the results, or perform some type of aggregation function. In some embodiments, the summary can include a graph, chart, metric, or other visualization of the data. An aggregation function can include analysis or calculations to return an aggregate value, such as an average value, a sum, a maximum value, a root mean square, statistical values, and the like.

Due to its flexible nature, use of a pipelined command language in various embodiments is advantageous because it can perform "filtering" as well as "processing" functions. In other words, a single query can include a search command and search term expressions, as well as data-analysis expressions. For example, a command at the beginning of a query can perform a "filtering" step by retrieving a set of data based on a condition (e.g., records associated with server response times of less than 1 microsecond). The results of the filtering step can then be passed to a subsequent command in the pipeline that performs a "processing" step (e.g. calculation of an aggregate value related to the filtered events such as the average response time of servers with response times of less than 1 microsecond). Furthermore, the search command can allow events to be filtered by keyword as well as field value criteria. For example, a search command can filter out all events containing the word "warning" or filter out all events where a field value associated with a field "clientip" is "10.0.1.2."

The results obtained or generated in response to a command in a query can be considered a set of results data. The set of results data can be passed from one command to another in any data format. In one embodiment, the set of result data can be in the form of a dynamically created table. Each command in a particular query can redefine the shape of the table. In some implementations, an event retrieved from an index in response to a query can be considered a row with a column for each field value. Columns contain basic information about the data and also may contain data that has been dynamically extracted at search time.

Figure 6B:
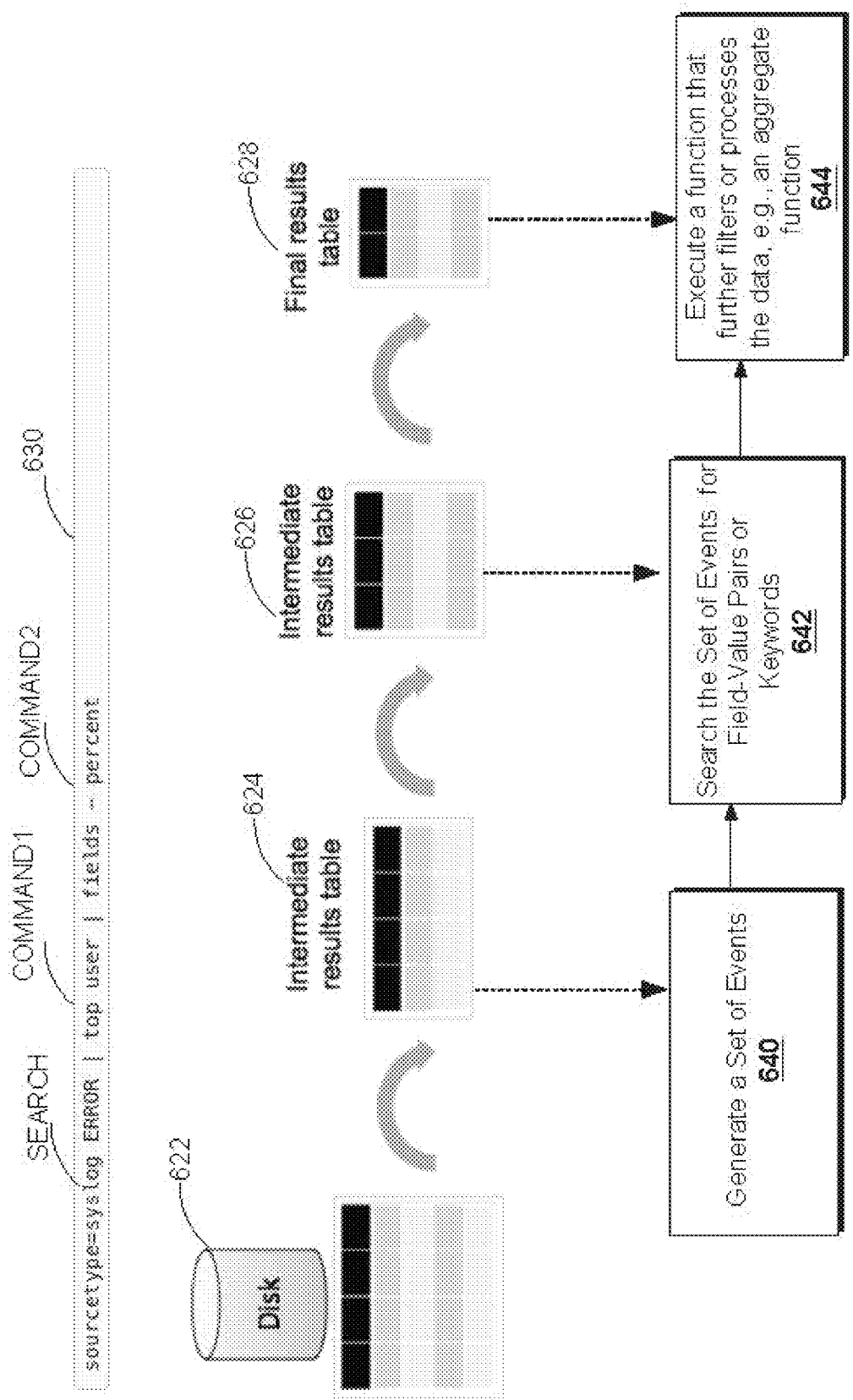
FIG. 6B provides a visual representation of an example manner in which a pipelined command language or query operates, in accordance with example embodiments.

FIG. 6B provides a visual representation of the manner in which a pipelined command language or query operates in accordance with the disclosed embodiments. The query 630 can be inputted by the user into a search. The query comprises a search, the results of which are piped to two commands (namely, command 1 and command 2) that follow the search step.

Disk 622 represents the event data in the raw record data store.

When a user query is processed, a search step will precede other queries in the pipeline in order to generate a set of events at block 640. For example, the query can comprise search terms "sourcetype=syslog ERROR" at the front of the pipeline as shown in FIG. 6B. Intermediate results table 624 shows fewer rows because it represents the subset of events retrieved from the index that matched the search terms "sourcetype=syslog ERROR" from search command 630. By way of further example, instead of a search step, the set of events at the head of the pipeline may be generating by a call to a pre-existing inverted index (as will be explained later).

At block 642, the set of events generated in the first part of the query may be piped to a query that searches the set of events for field-value pairs or for keywords. For example, the second intermediate results table 626 shows fewer columns, representing the result of the top command, "top user" which may summarize the events into a list of the top 10 users and may display the user, count, and percentage.

Finally, at block 644, the results of the prior stage can be pipelined to another stage where further filtering or processing of the data can be performed, e.g., preparing the data for display purposes, filtering the data based on a condition, performing a mathematical calculation with the data, etc. As shown in FIG. 6B, the "fields-percent" part of command 630 removes the column that shows the percentage, thereby, leaving a final results table 628 without a percentage column. In different embodiments, other query languages, such as the Structured Query Language ("SQL"), can be used to create a query.

2.10 Field Extraction

The search head 210 allows users to search and visualize events generated from machine data received from homogenous data sources. The search head 210 also allows users to search and visualize events generated from machine data received from heterogeneous data sources. The search head 210 includes various mechanisms, which may additionally reside in an indexer 206, for processing a query. A query language may be used to create a query, such as any suitable pipelined query language. For example, Splunk Processing Language (SPL) can be utilized to make a query. SPL is a pipelined search language in which a set of inputs is operated on by a first command in a command line, and then a subsequent command following the pipe symbol "|" operates on the results produced by the first command, and so on for additional commands. Other query languages, such as the Structured Query Language ("SQL"), can be used to create a query.

In response to receiving the search query, search head 210 uses extraction rules to extract values for fields in the events being searched. The search head 210 obtains extraction rules that specify how to extract a value for fields from an event. Extraction rules can comprise regex rules that specify how to extract values for the fields corresponding to the extraction rules. In addition to specifying how to extract field values, the extraction rules may also include instructions for deriving a field value by performing a function on a character string or value retrieved by the extraction rule. For example, an extraction rule may truncate a character string or convert the character string into a different data format. In some cases, the query itself can specify one or more extraction rules.

The search head 210 can apply the extraction rules to events that it receives from indexers 206. Indexers 206 may apply the extraction rules to events in an associated data store 208. Extraction rules can be applied to all the events in a data store or to a subset of the events that have been filtered based on some criteria (e.g., event time stamp values, etc.). Extraction rules can be used to extract one or more values for a field from events by parsing the portions of machine data in the events and examining the data for one or more patterns of characters, numbers, delimiters, etc., that indicate where the field begins and, optionally, ends.

Figure 7A:
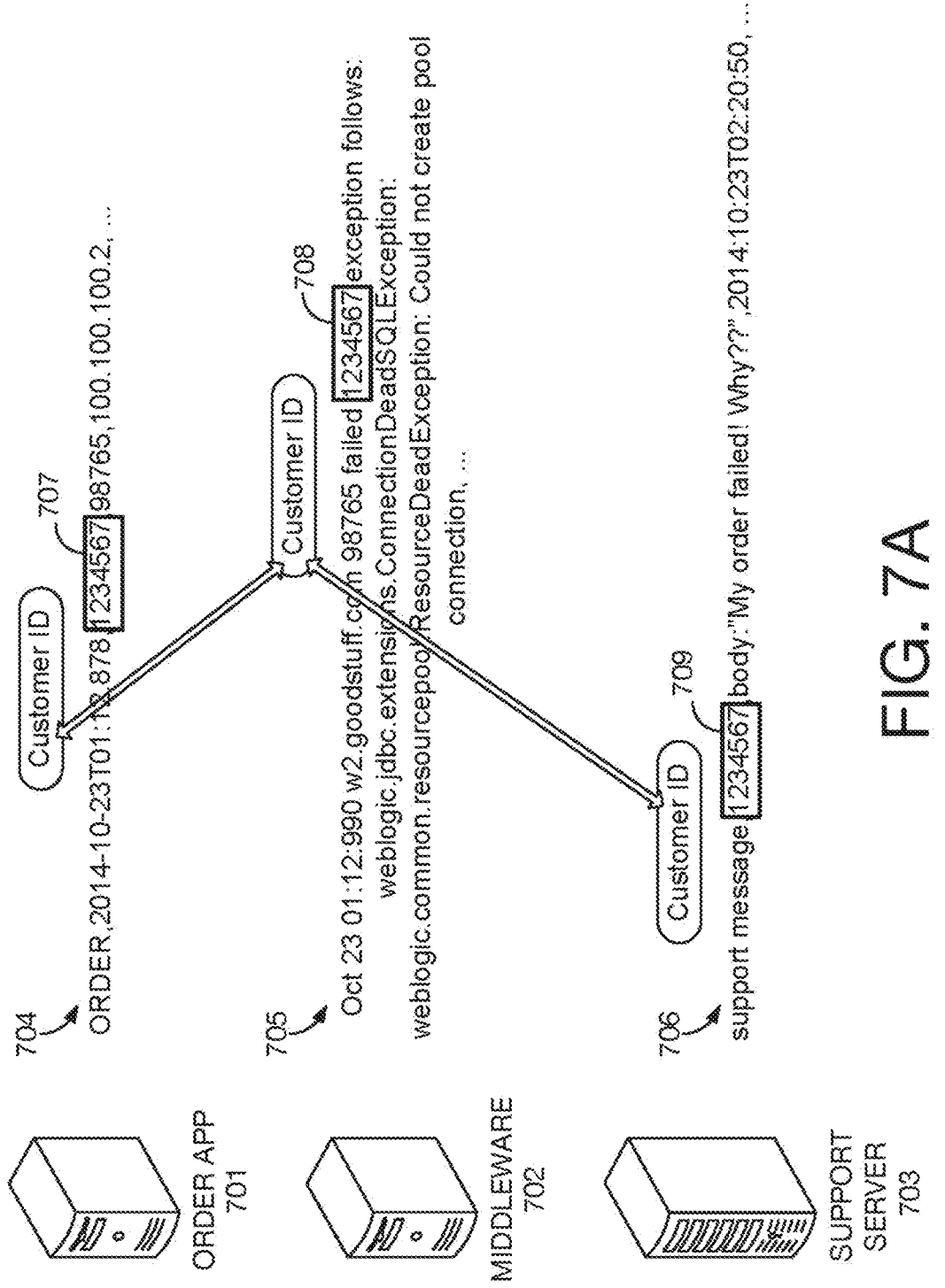
FIG. 7A is a diagram of an example scenario where a common customer identifier is found among log data received from three disparate data sources, in accordance with example embodiments.

FIG. 7A is a diagram of an example scenario where a common customer identifier is found among log data received from three disparate data sources, in accordance with example embodiments. In this example, a user submits an order for merchandise using a vendor's shopping application program 701 running on the user's system. In this example, the order was not delivered to the vendor's server due to a resource exception at the destination server that is detected by the middleware code 702. The user then sends a message to the customer support server 703 to complain about the order failing to complete. The three systems 701, 702, and 703 are disparate systems that do not have a common logging format. The order application 701 sends log data 704 to the data intake and query system in one format, the middleware code 702 sends error log data 705 in a second format, and the support server 703 sends log data 706 in a third format.

Using the log data received at one or more indexers 206 from the three systems, the vendor can uniquely obtain an insight into user activity, user experience, and system behavior. The search head 210 allows the vendor's administrator to search the log data from the three systems that one or more indexers 206 are responsible for searching, thereby obtaining correlated information, such as the order number and corresponding customer ID number of the person placing the order. The system also allows the administrator to see a visualization of related events via a user interface. The administrator can query the search head 210 for customer ID field value matches across the log data from the three systems that are stored at the one or more indexers 206. The customer ID field value exists in the data gathered from the three systems, but the customer ID field value may be located in different areas of the data given differences in the architecture of the systems. There is a semantic relationship between the customer ID field values generated by the three systems. The search head 210 requests events from the one or more indexers 206 to gather relevant events from the three systems. The search head 210 then applies extraction rules to the events in order to extract field values that it can correlate. The search head may apply a different extraction rule to each set of events from each system when the event format differs among systems. In this example, the user interface can display to the administrator the events corresponding to the common customer ID field values 707, 708, and 709, thereby providing the administrator with insight into a customer's experience.

Note that query results can be returned to a client, a search head, or any other system component for further processing. In general, query results may include a set of one or more events, a set of one or more values obtained from the events, a subset of the values, statistics calculated based on the values, a report containing the values, a visualization (e.g., a graph or chart) generated from the values, and the like.

Figure 7B:
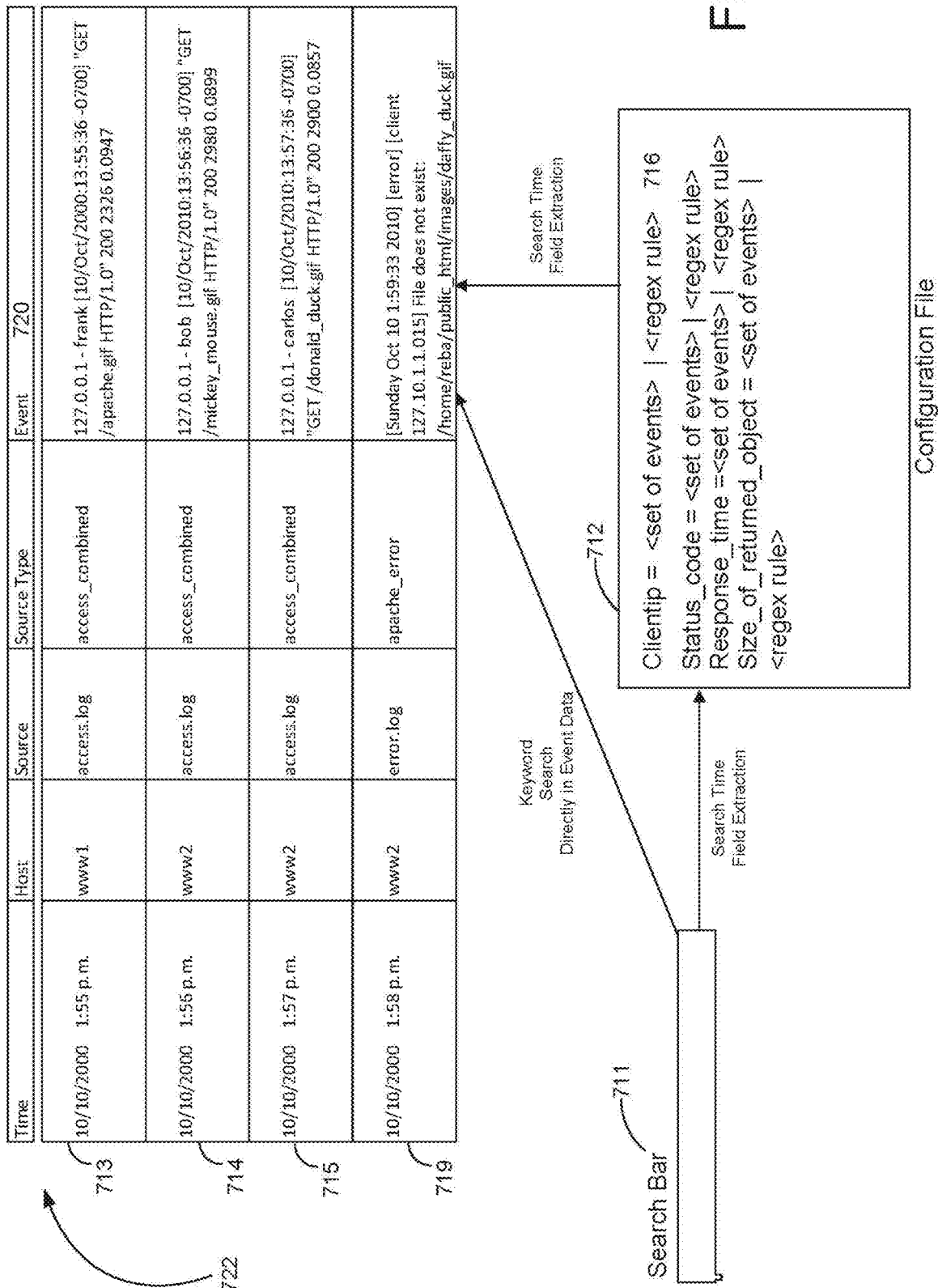
FIG. 7B illustrates an example of processing keyword searches and field searches, in accordance with disclosed embodiments.

The search system enables users to run queries against the stored data to retrieve events that meet criteria specified in a query, such as containing certain keywords or having specific values in defined fields. FIG. 7B illustrates the manner in which keyword searches and field searches are processed in accordance with disclosed embodiments.

If a user inputs a search query into search bar 1401 that includes only keywords (also known as "tokens"), e.g., the keyword "error" or "warning", the query search engine of the data intake and query system searches for those keywords directly in the event data 722 stored in the raw record data store. Note that while FIG. 7B only illustrates four events, the raw record data store (corresponding to data store 208 in FIG. 2) may contain records for millions of events.

As disclosed above, an indexer can optionally generate a keyword index to facilitate fast keyword searching for event data. The indexer includes the identified keywords in an index, which associates each stored keyword with reference pointers to events containing that keyword (or to locations within events where that keyword is located, other location identifiers, etc.). When an indexer subsequently receives a keyword-based query, the indexer can access the keyword index to quickly identify events containing the keyword. For example, if the keyword "HTTP" was indexed by the indexer at index time, and the user searches for the keyword "HTTP", events 713 to 715 will be identified based on the results returned from the keyword index. As noted above, the index contains reference pointers to the events containing the keyword, which allows for efficient retrieval of the relevant events from the raw record data store.

If a user searches for a keyword that has not been indexed by the indexer, the data intake and query system would nevertheless be able to retrieve the events by searching the event data for the keyword in the raw record data store directly as shown in FIG. 7B. For example, if a user searches for the keyword "frank", and the name "frank" has not been indexed at index time, the DATA INTAKE AND QUERY system will search the event data directly and return the first event 713. Note that whether the keyword has been indexed at index time or not, in both cases the raw data with the events 712 is accessed from the raw data record store to service the keyword search. In the case where the keyword has been indexed, the index will contain a reference pointer that will allow for a more efficient retrieval of the event data from the data store. If the keyword has not been indexed, the search engine will need to search through all the records in the data store to service the search.

In most cases, however, in addition to keywords, a user's search will also include fields. The term "field" refers to a location in the event data containing one or more values for a specific data item. Often, a field is a value with a fixed, delimited position on a line, or a name and value pair, where there is a single value to each field name. A field can also be multivalued, that is, it can appear more than once in an event and have a different value for each appearance, e.g., email address fields. Fields are searchable by the field name or field name-value pairs. Some examples of fields are "clientip" for IP addresses accessing a web server, or the "From" and "To" fields in email addresses.

By way of further example, consider the search, "status=404". This search query finds events with "status" fields that have a value of "404." When the search is run, the search engine does not look for events with any other "status" value. It also does not look for events containing other fields that share "404" as a value. As a result, the search returns a set of results that are more focused than if "404" had been used in the search string as part of a keyword search. Note also that fields can appear in events as "key=value" pairs such as "user_name=Bob." But in most cases, field values appear in fixed, delimited positions without identifying keys. For example, the data store may contain events where the "user_name" value always appears by itself after the timestamp as illustrated by the following string: "November 15 09:33:22johnmedlock."

The data intake and query system advantageously allows for search time field extraction. In other words, fields can be extracted from the event data at search time using late-binding schema as opposed to at data ingestion time, which was a major limitation of the prior art systems.

In response to receiving the search query, search head 210 uses extraction rules to extract values for the fields associated with a field or fields in the event data being searched. The search head 210 obtains extraction rules that specify how to extract a value for certain fields from an event. Extraction rules can comprise regex rules that specify how to extract values for the relevant fields. In addition to specifying how to extract field values, the extraction rules may also include instructions for deriving a field value by performing a function on a character string or value retrieved by the extraction rule. For example, a transformation rule may truncate a character string, or convert the character string into a different data format. In some cases, the query itself can specify one or more extraction rules.

FIG. 7B illustrates the manner in which configuration files may be used to configure custom fields at search time in accordance with the disclosed embodiments. In response to receiving a search query, the data intake and query system determines if the query references a "field." For example, a query may request a list of events where the "clientip" field equals "127.0.0.1." If the query itself does not specify an extraction rule and if the field is not a metadata field, e.g., time, host, source, source type, etc., then in order to determine an extraction rule, the search engine may, in one or more embodiments, need to locate configuration file 712 during the execution of the search as shown in FIG. 7B.

Configuration file 712 may contain extraction rules for all the various fields that are not metadata fields, e.g., the "clientip" field. The extraction rules may be inserted into the configuration file in a variety of ways. In some embodiments, the extraction rules can comprise regular expression rules that are manually entered in by the user. Regular expressions match patterns of characters in text and are used for extracting custom fields in text.

In one or more embodiments, as noted above, a field extractor may be configured to automatically generate extraction rules for certain field values in the events when the events are being created, indexed, or stored, or possibly at a later time. In one embodiment, a user may be able to dynamically create custom fields by highlighting portions of a sample event that should be extracted as fields using a graphical user interface. The system would then generate a regular expression that extracts those fields from similar events and store the regular expression as an extraction rule for the associated field in the configuration file 712.

In some embodiments, the indexers may automatically discover certain custom fields at index time and the regular expressions for those fields will be automatically generated at index time and stored as part of extraction rules in configuration file 712. For example, fields that appear in the event data as "key=value" pairs may be automatically extracted as part of an automatic field discovery process. Note that there may be several other ways of adding field definitions to configuration files in addition to the methods discussed herein.

The search head 210 can apply the extraction rules derived from configuration file 1402 to event data that it receives from indexers 206. Indexers 206 may apply the extraction rules from the configuration file to events in an associated data store 208. Extraction rules can be applied to all the events in a data store, or to a subset of the events that have been filtered based on some criteria (e.g., event time stamp values, etc.). Extraction rules can be used to extract one or more values for a field from events by parsing the event data and examining the event data for one or more patterns of characters, numbers, delimiters, etc., that indicate where the field begins and, optionally, ends.

In one more embodiments, the extraction rule in configuration file 712 will also need to define the type or set of events that the rule applies to. Because the raw record data store will contain events from multiple heterogeneous sources, multiple events may contain the same fields in different locations because of discrepancies in the format of the data generated by the various sources. Furthermore, certain events may not contain a particular field at all. For example, event 719 also contains "clientip" field, however, the "clientip" field is in a different format from events 713-715. To address the discrepancies in the format and content of the different types of events, the configuration file will also need to specify the set of events that an extraction rule applies to, e.g., extraction rule 716 specifies a rule for filtering by the type of event and contains a regular expression for parsing out the field value. Accordingly, each extraction rule will pertain to only a particular type of event. If a particular field, e.g., "clientip" occurs in multiple events, each of those types of events would need its own corresponding extraction rule in the configuration file 712 and each of the extraction rules would comprise a different regular expression to parse out the associated field value. The most common way to categorize events is by source type because events generated by a particular source can have the same format.

The field extraction rules stored in configuration file 712 perform search-time field extractions. For example, for a query that requests a list of events with source type "access_combined" where the "clientip" field equals "127.0.0.1," the query search engine would first locate the configuration file 712 to retrieve extraction rule 716 that would allow it to extract values associated with the "clientip" field from the event data 720 "where the source type is "access_combined. After the "clientip" field has been extracted from all the events comprising the "clientip" field where the source type is "access_combined," the query search engine can then execute the field criteria by performing the compare operation to filter out the events where the "clientip" field equals "127.0.0.1." In the example shown in FIG. 7B, events 713-715 would be returned in response to the user query. In this manner, the search engine can service queries containing field criteria in addition to queries containing keyword criteria (as explained above).

The configuration file can be created during indexing. It may either be manually created by the user or automatically generated with certain predetermined field extraction rules. As discussed above, the events may be distributed across several indexers, wherein each indexer may be responsible for storing and searching a subset of the events contained in a corresponding data store. In a distributed indexer system, each indexer would need to maintain a local copy of the configuration file that is synchronized periodically across the various indexers.

The ability to add schema to the configuration file at search time results in increased efficiency. A user can create new fields at search time and simply add field definitions to the configuration file. As a user learns more about the data in the events, the user can continue to refine the late-binding schema by adding new fields, deleting fields, or modifying the field extraction rules in the configuration file for use the next time the schema is used by the system. Because the data intake and query system maintains the underlying raw data and uses late-binding schema for searching the raw data, it enables a user to continue investigating and learn valuable insights about the raw data long after data ingestion time.

The ability to add multiple field definitions to the configuration file at search time also results in increased flexibility. For example, multiple field definitions can be added to the configuration file to capture the same field across events generated by different source types. This allows the data intake and query system to search and correlate data across heterogeneous sources flexibly and efficiently.

Further, by providing the field definitions for the queried fields at search time, the configuration file 712 allows the record data store 712 to be field searchable. In other words, the raw record data store 712 can be searched using keywords as well as fields, wherein the fields are searchable name/value pairings that distinguish one event from another and can be defined in configuration file 1402 using extraction rules. In comparison to a search containing field names, a keyword search does not need the configuration file and can search the event data directly as shown in FIG. 7B.

It should also be noted that any events filtered out by performing a search-time field extraction using a configuration file can be further processed by directing the results of the filtering step to a processing step using a pipelined search language. Using the prior example, a user could pipeline the results of the compare step to an aggregate function by asking the query search engine to count the number of events where the "clientip" field equals "127.0.0.1."

2.11. Example Search Screen

Figure 8A:
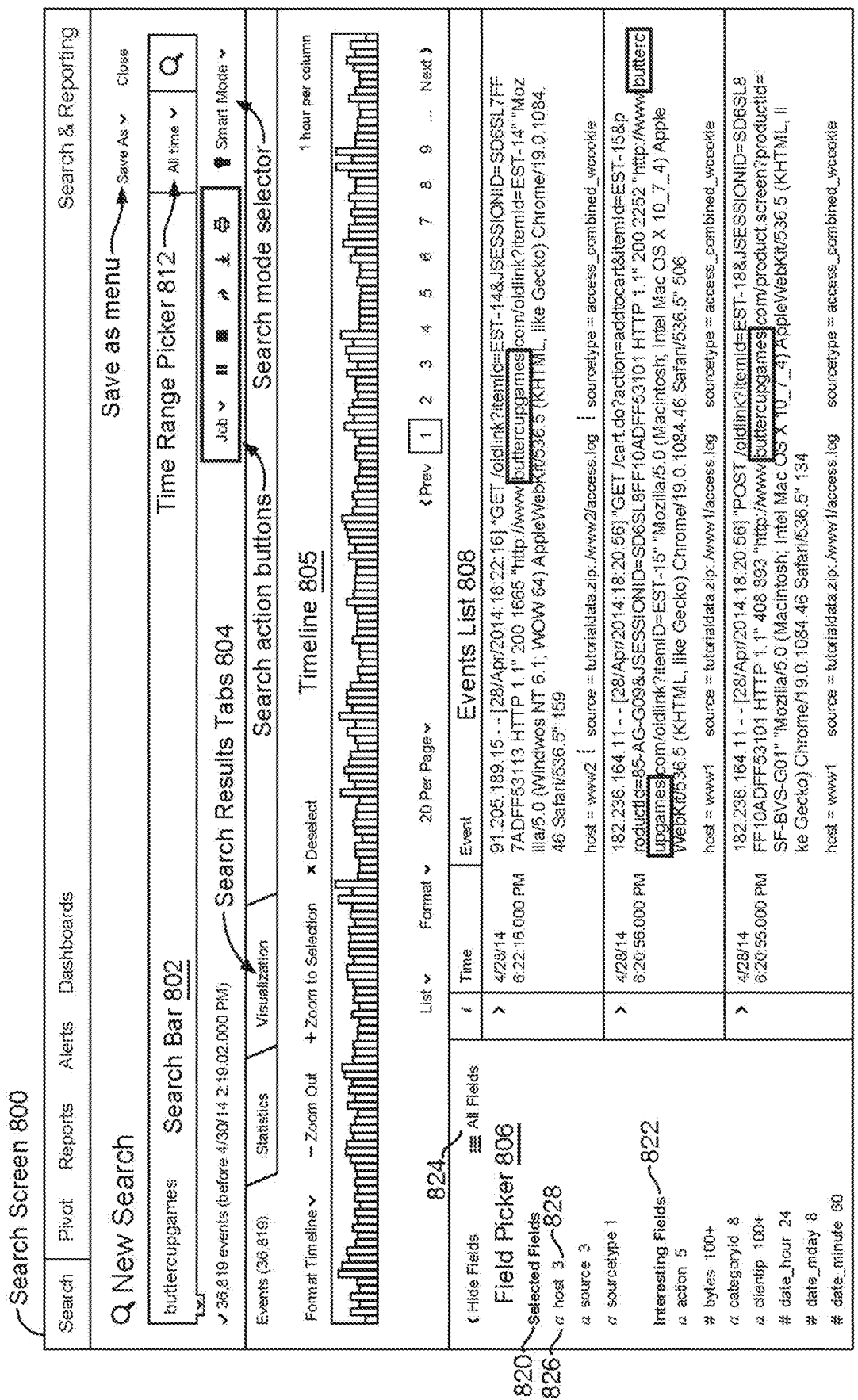
FIG. 8A is an interface diagram of an example user interface for a search screen, in accordance with example embodiments.

FIG. 8A is an interface diagram of an example user interface for a search screen 800, in accordance with example embodiments. Search screen 800 includes a search bar 802 that accepts user input in the form of a search string. It also includes a time range picker 812 that enables the user to specify a time range for the search. For historical searches (e.g., searches based on a particular historical time range), the user can select a specific time range, or alternatively a relative time range, such as "today," "yesterday" or "last week." For real-time searches (e.g., searches whose results are based on data received in real-time), the user can select the size of a preceding time window to search for real-time events. Search screen 800 also initially may display a "data summary" dialog as is illustrated in FIG. 8B that enables the user to select different sources for the events, such as by selecting specific hosts and log files.

After the search is executed, the search screen 800 in FIG. 8A can display the results through search results tabs 804, wherein search results tabs 804 includes: an "events tab" that may display various information about events returned by the search; a "statistics tab" that may display statistics about the search results; and a "visualization tab" that may display various visualizations of the search results. The events tab illustrated in FIG. 8A may display a timeline graph 805 that graphically illustrates the number of events that occurred in one-hour intervals over the selected time range. The events tab also may display an events list 808 that enables a user to view the machine data in each of the returned events.

The events tab additionally may display a sidebar that is an interactive field picker 806. The field picker 806 may be displayed to a user in response to the search being executed and allows the user to further analyze the search results based on the fields in the events of the search results. The field picker 806 includes field names that reference fields present in the events in the search results. The field picker may display any Selected Fields 820 that a user has preselected for display (e.g., host, source, sourcetype) and may also display any Interesting Fields 822 that the system determines may be interesting to the user based on pre-specified criteria (e.g., action, bytes, categoryid, clientip, date_hour, date_mday, date_minute, etc.). The field picker also provides an option to display field names for all the fields present in the events of the search results using the All Fields control 824.

Each field name in the field picker 806 has a value type identifier to the left of the field name, such as value type identifier 826. A value type identifier identifies the type of value for the respective field, such as an "a" for fields that include literal values or a "#" for fields that include numerical values.

Each field name in the field picker also has a unique value count to the right of the field name, such as unique value count 828. The unique value count indicates the number of unique values for the respective field in the events of the search results.

Each field name is selectable to view the events in the search results that have the field referenced by that field name. For example, a user can select the "host" field name, and the events shown in the events list 808 will be updated with events in the search results that have the field that is reference by the field name "host."

2.12. Data Models

A data model is a hierarchically structured search-time mapping of semantic knowledge about one or more datasets. It encodes the domain knowledge used to build a variety of specialized searches of those datasets. Those searches, in turn, can be used to generate reports.

A data model is composed of one or more "objects" (or "data model objects") that define or otherwise correspond to a specific set of data. An object is defined by constraints and attributes. An object's constraints are search criteria that define the set of events to be operated on by running a search having that search criteria at the time the data model is selected. An object's attributes are the set of fields to be exposed for operating on that set of events generated by the search criteria.

Objects in data models can be arranged hierarchically in parent/child relationships. Each child object represents a subset of the dataset covered by its parent object. The top-level objects in data models are collectively referred to as "root objects."

Child objects have inheritance. Child objects inherit constraints and attributes from their parent objects and may have additional constraints and attributes of their own. Child objects provide a way of filtering events from parent objects. Because a child object may provide an additional constraint in addition to the constraints it has inherited from its parent object, the dataset it represents may be a subset of the dataset that its parent represents. For example, a first data model object may define a broad set of data pertaining to e-mail activity generally, and another data model object may define specific datasets within the broad dataset, such as a subset of the e-mail data pertaining specifically to e-mails sent. For example, a user can simply select an "e-mail activity" data model object to access a dataset relating to e-mails generally (e.g., sent or received), or select an "e-mails sent" data model object (or data sub-model object) to access a dataset relating to e-mails sent.

Because a data model object is defined by its constraints (e.g., a set of search criteria) and attributes (e.g., a set of fields), a data model object can be used to quickly search data to identify a set of events and to identify a set of fields to be associated with the set of events. For example, an "e-mails sent" data model object may specify a search for events relating to e-mails that have been sent, and specify a set of fields that are associated with the events. Thus, a user can retrieve and use the "e-mails sent" data model object to quickly search source data for events relating to sent e-mails, and may be provided with a listing of the set of fields relevant to the events in a user interface screen.

Examples of data models can include electronic mail, authentication, databases, intrusion detection, malware, application state, alerts, compute inventory, network sessions, network traffic, performance, audits, updates, vulnerabilities, etc. Data models and their objects can be designed by knowledge managers in an organization, and they can enable downstream users to quickly focus on a specific set of data. A user iteratively applies a model development tool (not shown in FIG. 8A) to prepare a query that defines a subset of events and assigns an object name to that subset. A child subset is created by further limiting a query that generated a parent subset.

Data definitions in associated schemas can be taken from the common information model (CIM) or can be devised for a particular schema and optionally added to the CIM. Child objects inherit fields from parents and can include fields not present in parents. A model developer can select fewer extraction rules than are available for the sources returned by the query that defines events belonging to a model. Selecting a limited set of extraction rules can be a tool for simplifying and focusing the data model, while allowing a user flexibility to explore the data subset. Development of a data model is further explained in U.S. Pat. Nos. 8,788,525 and 8,788,526, both entitled "DATA MODEL FOR MACHINE DATA FOR SEMANTIC SEARCH", both issued on 22 Jul. 2014, U.S. Pat. No. 8,983,994, entitled "GENERATION OF A DATA MODEL FOR SEARCHING MACHINE DATA", issued on 17 Mar. 2015, U.S. Pat. No. 9,128,980, entitled "GENERATION OF A DATA MODEL APPLIED TO QUERIES", issued on 8 Sep. 2015, and U.S. Pat. No. 9,589,012, entitled "GENERATION OF A DATA MODEL APPLIED TO OBJECT QUERIES", issued on 7 Mar. 2017, each of which is hereby incorporated by reference in its entirety for all purposes.

A data model can also include reports. One or more report formats can be associated with a particular data model and be made available to run against the data model. A user can use child objects to design reports with object datasets that already have extraneous data pre-filtered out. In some embodiments, the data intake and query system 108 provides the user with the ability to produce reports (e.g., a table, chart, visualization, etc.) without having to enter SPL, SQL, or other query language terms into a search screen. Data models are used as the basis for the search feature.

Data models may be selected in a report generation interface. The report generator supports drag-and-drop organization of fields to be summarized in a report. When a model is selected, the fields with available extraction rules are made available for use in the report. The user may refine and/or filter search results to produce more precise reports. The user may select some fields for organizing the report and select other fields for providing detail according to the report organization. For example, "region" and "salesperson" are fields used for organizing the report and sales data can be summarized (subtotaled and totaled) within this organization. The report generator allows the user to specify one or more fields within events and apply statistical analysis on values extracted from the specified one or more fields. The report generator may aggregate search results across sets of events and generate statistics based on aggregated search results. Building reports using the report generation interface is further explained in U.S. patent application Ser. No. 14/503,335, entitled "GENERATING REPORTS FROM UNSTRUCTURED DATA", filed on 30 Sep. 2014, and which is hereby incorporated by reference in its entirety for all purposes. Data visualizations also can be generated in a variety of formats, by reference to the data model. Reports, data visualizations, and data model objects can be saved and associated with the data model for future use. The data model object may be used to perform searches of other data.

FIGS. 9-15 are interface diagrams of example report generation user interfaces, in accordance with example embodiments. The report generation process may be driven by a predefined data model object, such as a data model object defined and/or saved via a reporting application or a data model object obtained from another source. A user can load a saved data model object using a report editor. For example, the initial search query and fields used to drive the report editor may be obtained from a data model object. The data model object that is used to drive a report generation process may define a search and a set of fields. Upon loading of the data model object, the report generation process may enable a user to use the fields (e.g., the fields defined by the data model object) to define criteria for a report (e.g., filters, split rows/columns, aggregates, etc.) and the search may be used to identify events (e.g., to identify events responsive to the search) used to generate the report. That is, for example, if a data model object is selected to drive a report editor, the graphical user interface of the report editor may enable a user to define reporting criteria for the report using the fields associated with the selected data model object, and the events used to generate the report may be constrained to the events that match, or otherwise satisfy, the search constraints of the selected data model object.

Figure 9:
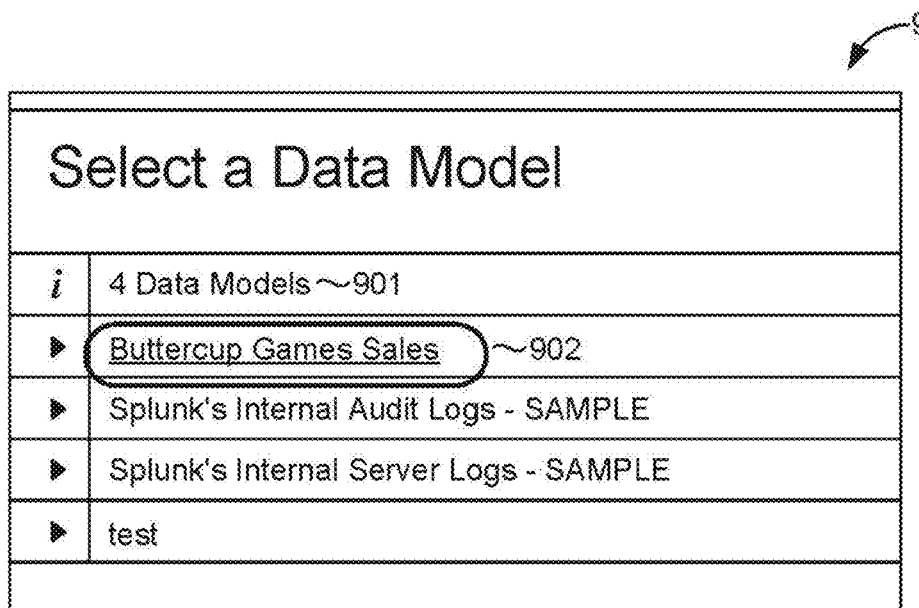

The selection of a data model object for use in driving a report generation may be facilitated by a data model object selection interface. FIG. 9 illustrates an example interactive data model selection graphical user interface 900 of a report editor that may display a listing of available data models 901. The user may select one of the data models 902.

Figure 10:
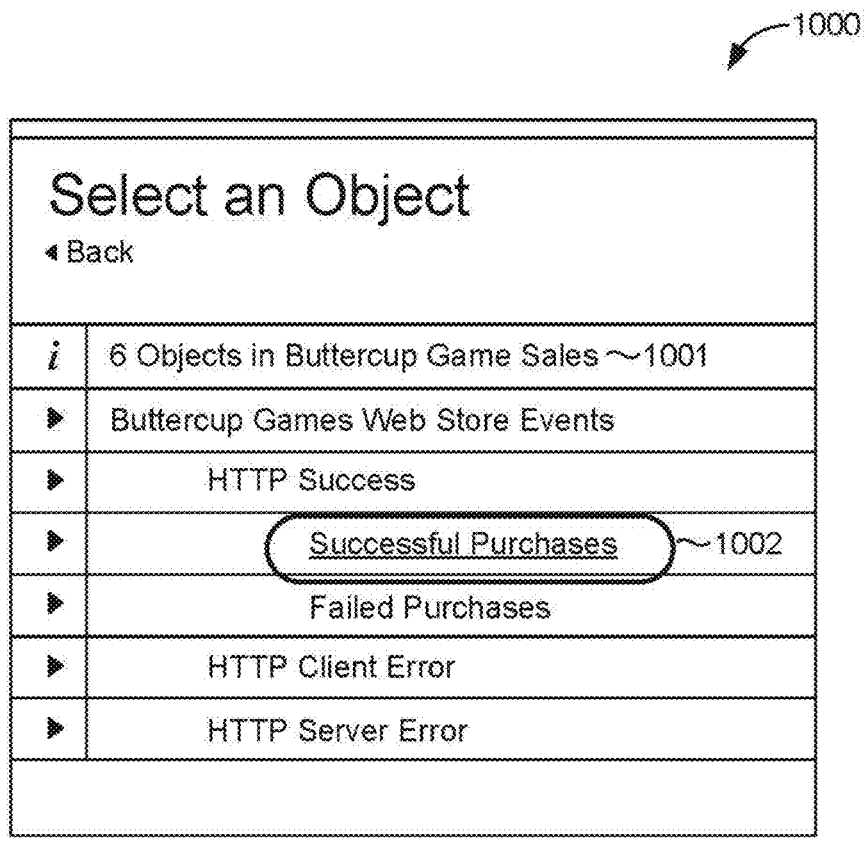

FIG. 10 illustrates an example data model object selection graphical user interface 1000 that may display available data objects 1001 for the selected data object model 902. The user may select one of the displayed data model objects 1002 for use in driving the report generation process.

Figure 11A:
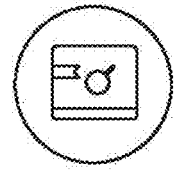

Once a data model object is selected by the user, a user interface screen 1100 shown in FIG. 11A may display an interactive listing of automatic field identification options 1101 based on the selected data model object. For example, a user may select one of the three illustrated options (e.g., the "All Fields" option 1102, the "Selected Fields" option 1103, or the "Coverage" option (e.g., fields with at least a specified % of coverage) 1104). If the user selects the "All Fields" option 1102, all of the fields identified from the events that were returned in response to an initial search query may be selected. That is, for example, all of the fields of the identified data model object fields may be selected. If the user selects the "Selected Fields" option 1103, only the fields from the fields of the identified data model object fields that are selected by the user may be used. If the user selects the "Coverage" option 1104, only the fields of the identified data model object fields meeting a specified coverage criteria may be selected. A percent coverage may refer to the percentage of events returned by the initial search query that a given field appears in. Thus, for example, if an object dataset includes 10,000 events returned in response to an initial search query, and the "avg_age" field appears in 854 of those 10,000 events, then the "avg_age" field would have a coverage of 8.54% for that object dataset. If, for example, the user selects the "Coverage" option and specifies a coverage value of 2%, only fields having a coverage value equal to or greater than 2% may be selected. The number of fields corresponding to each selectable option may be displayed in association with each option. For example, "97" displayed next to the "All Fields" option 1102 indicates that 97 fields will be selected if the "All Fields" option is selected. The "3" displayed next to the "Selected Fields" option 1103 indicates that 3 of the 97 fields will be selected if the "Selected Fields" option is selected. The "49" displayed next to the "Coverage" option 1104 indicates that 49 of the 97 fields (e.g., the 49 fields having a coverage of 2% or greater) will be selected if the "Coverage" option is selected. The number of fields corresponding to the "Coverage" option may be dynamically updated based on the specified percent of coverage.

Figure 11B:
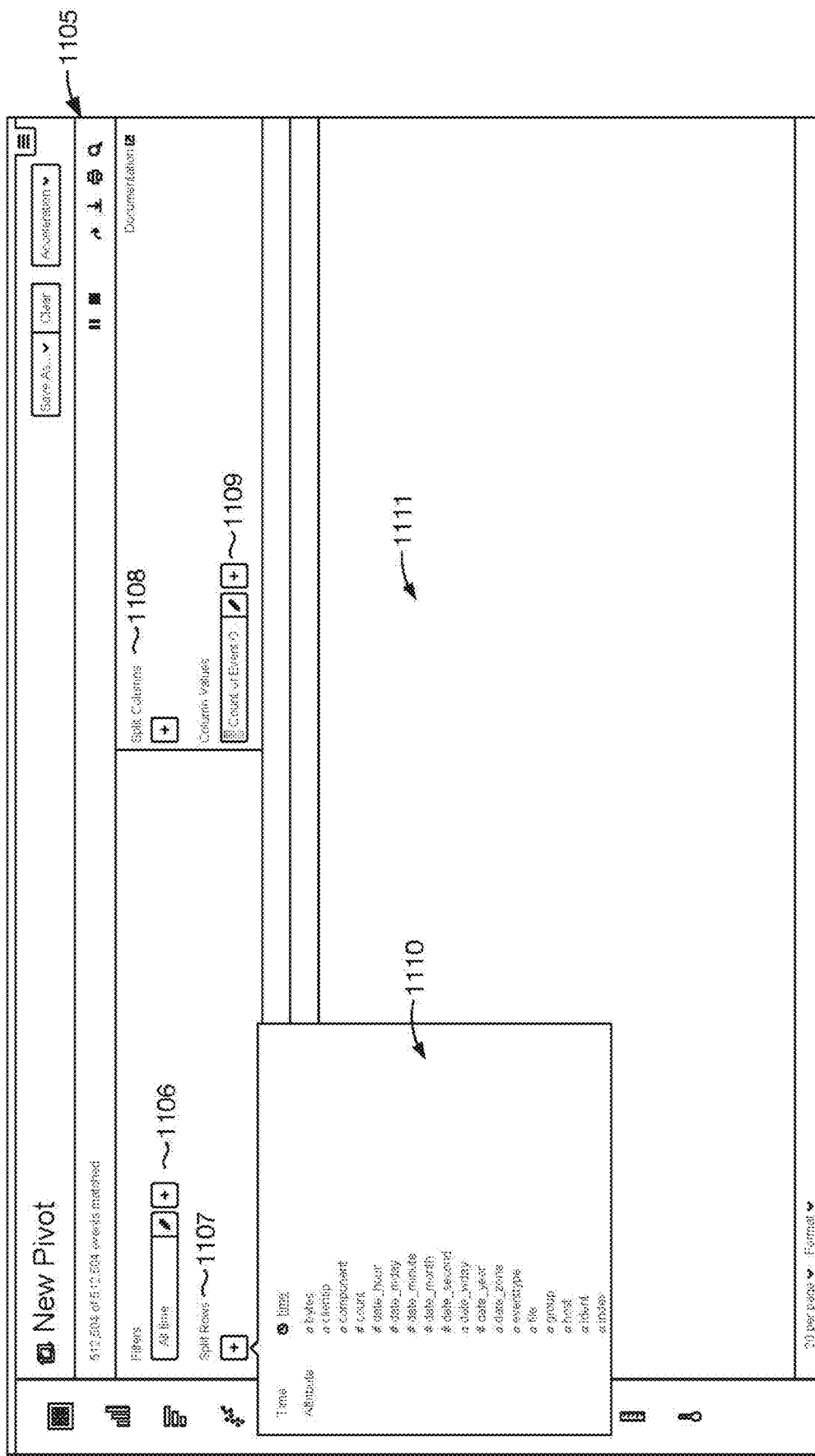
Figure 11C:
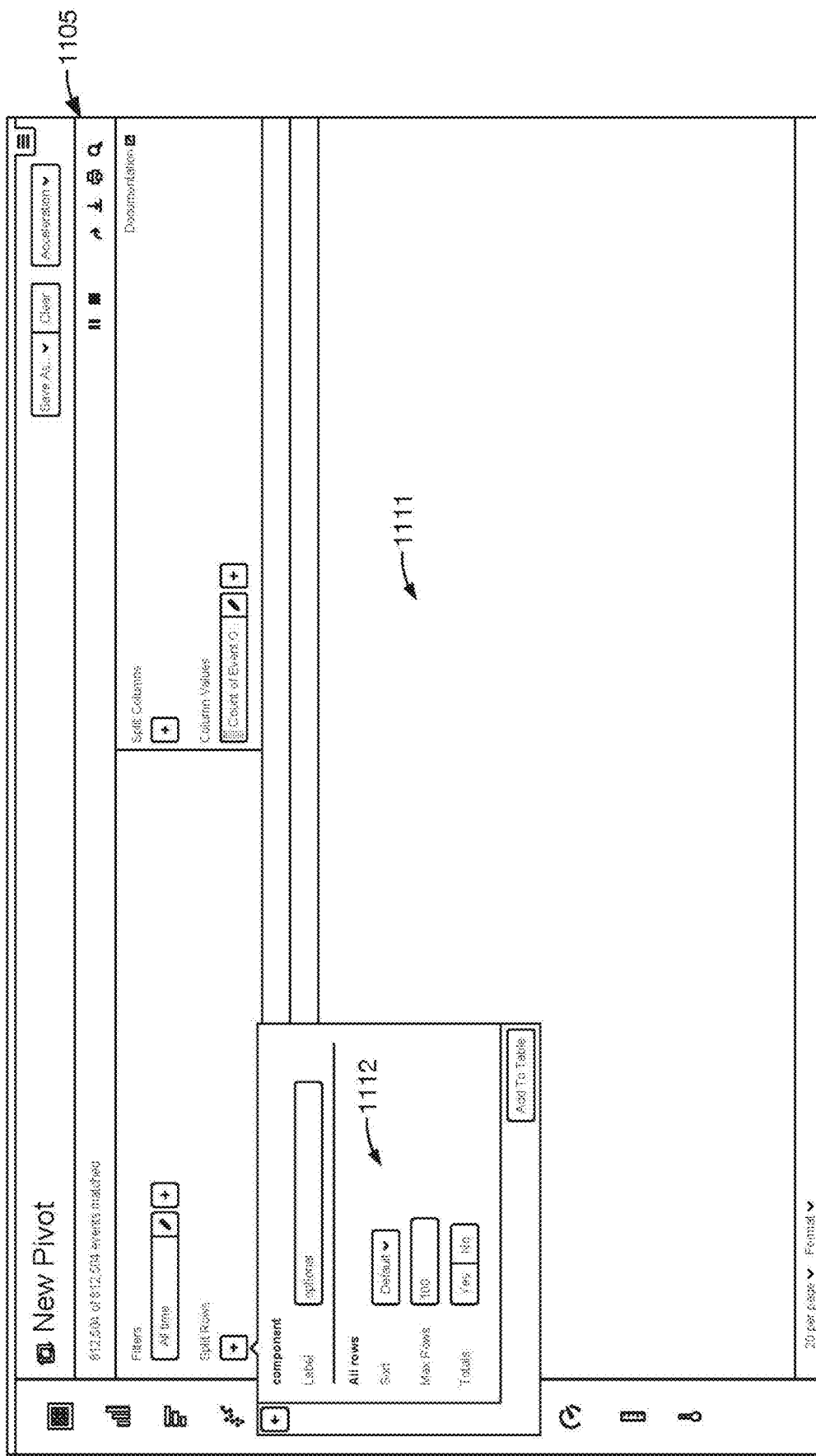

FIG. 11B illustrates an example graphical user interface screen 1105 displaying the reporting application's "Report Editor" page. The screen may display interactive elements for defining various elements of a report. For example, the page includes a "Filters" element 1106, a "Split Rows" element 1107, a "Split Columns" element 1108, and a "Column Values" element 1109. The page may include a list of search results 1111. In this example, the Split Rows element 1107 is expanded, revealing a listing of fields 1110 that can be used to define additional criteria (e.g., reporting criteria). The listing of fields 1110 may correspond to the selected fields. That is, the listing of fields 1110 may list only the fields previously selected, either automatically and/or manually by a user. FIG. 11C illustrates a formatting dialogue 1112 that may be displayed upon selecting a field from the listing of fields 1110. The dialogue can be used to format the display of the results of the selection (e.g., label the column for the selected field to be displayed as "component").

Figure 11D:
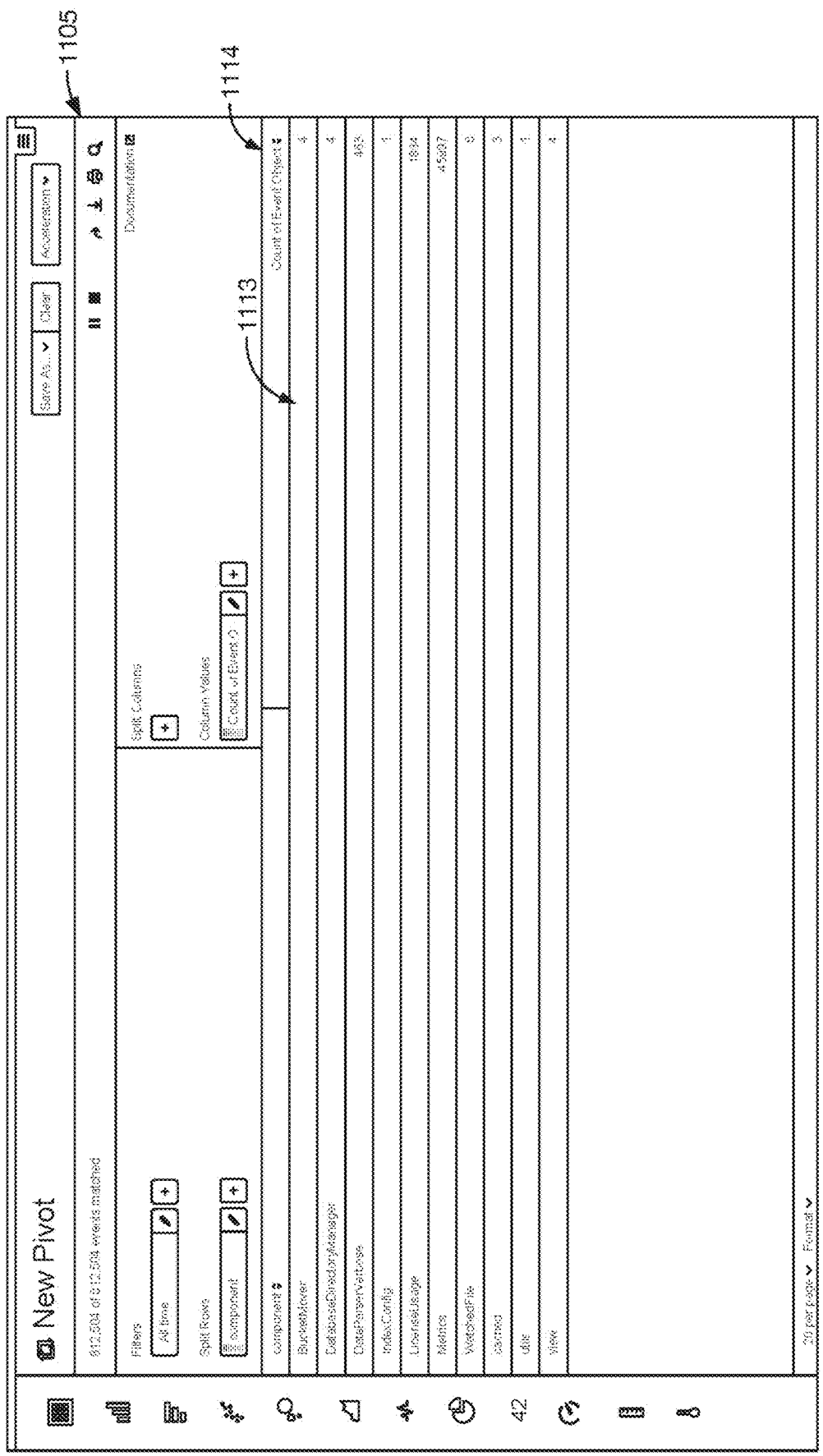

FIG. 11D illustrates an example graphical user interface screen 1105 including a table of results 1113 based on the selected criteria including splitting the rows by the "component" field. A column 1114 having an associated count for each component listed in the table may be displayed that indicates an aggregate count of the number of times that the particular field-value pair (e.g., the value in a row for a particular field, such as the value "BucketMover" for the field "component") occurs in the set of events responsive to the initial search query.

Figure 12:
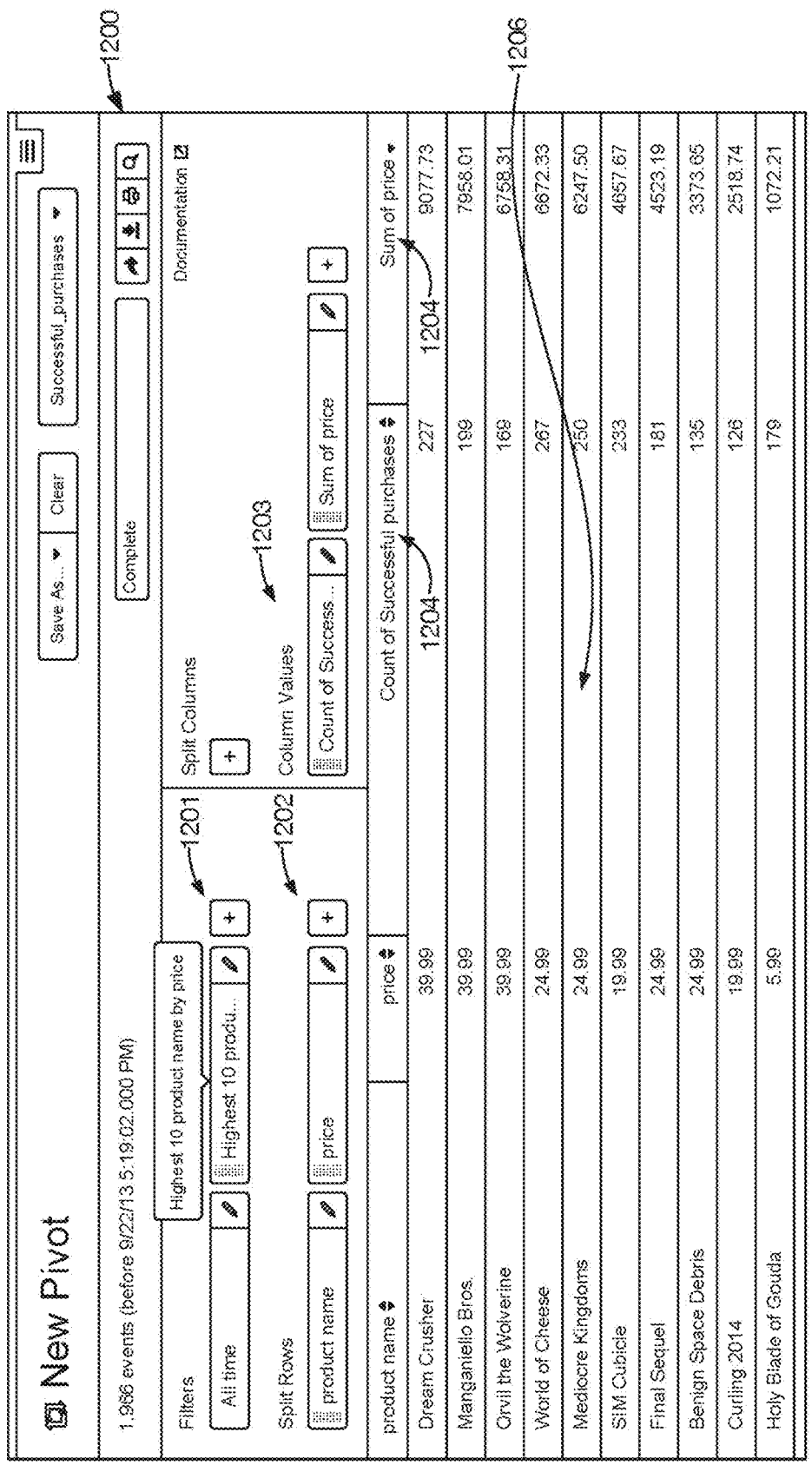

FIG. 12 illustrates an example graphical user interface screen 1200 that allows the user to filter search results and to perform statistical analysis on values extracted from specific fields in the set of events. In this example, the top ten product names ranked by price are selected as a filter 1201 that causes the display of the ten most popular products sorted by price. Each row is displayed by product name and price 1202. This results in each product displayed in a column labeled "product name" along with an associated price in a column labeled "price" 1206. Statistical analysis of other fields in the events associated with the ten most popular products have been specified as column values 1203. A count of the number of successful purchases for each product is displayed in column 1204. These statistics may be produced by filtering the search results by the product name, finding all occurrences of a successful purchase in a field within the events and generating a total of the number of occurrences. A sum of the total sales is displayed in column 1205, which is a result of the multiplication of the price and the number of successful purchases for each product.

Figure 13:
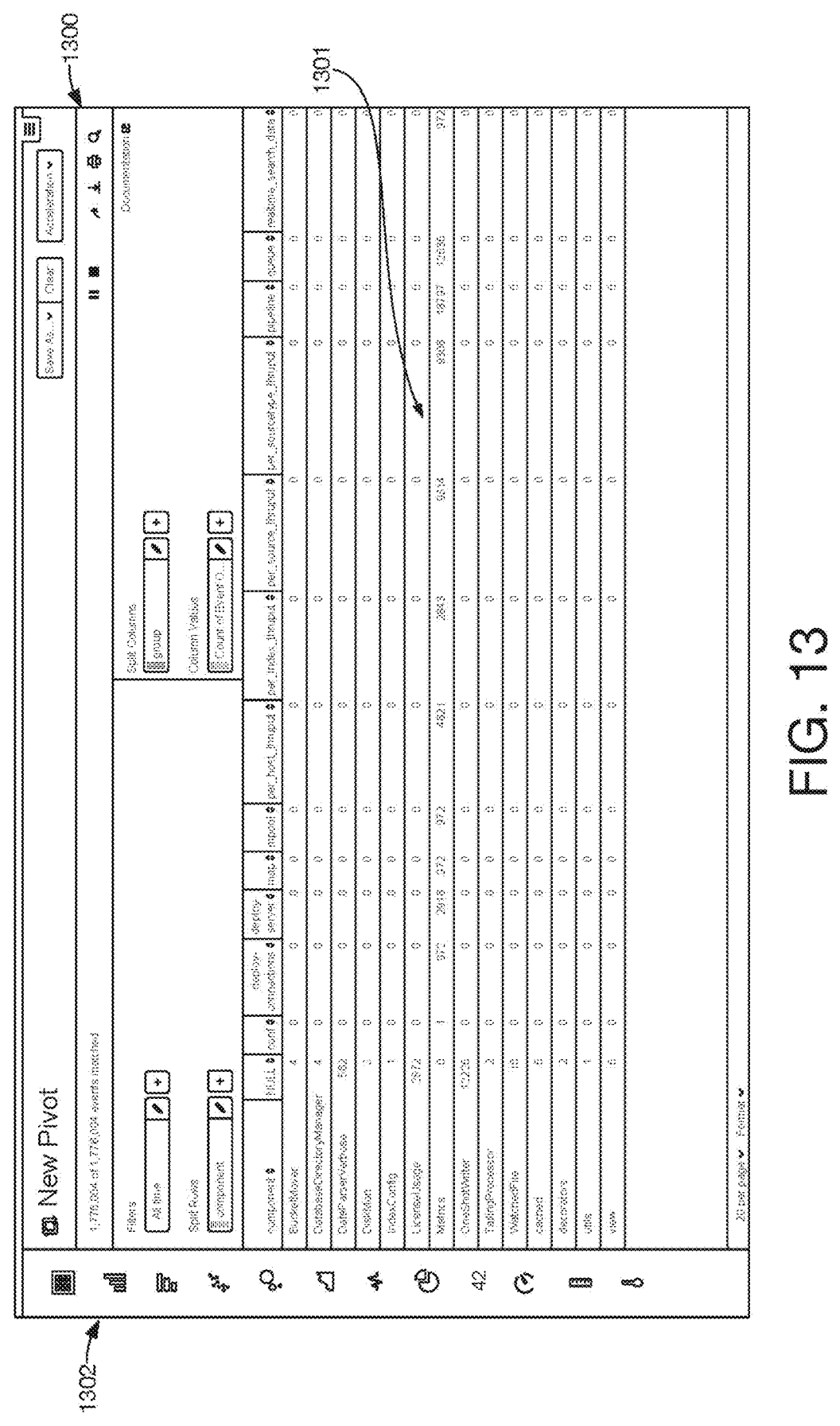
Figure 14:
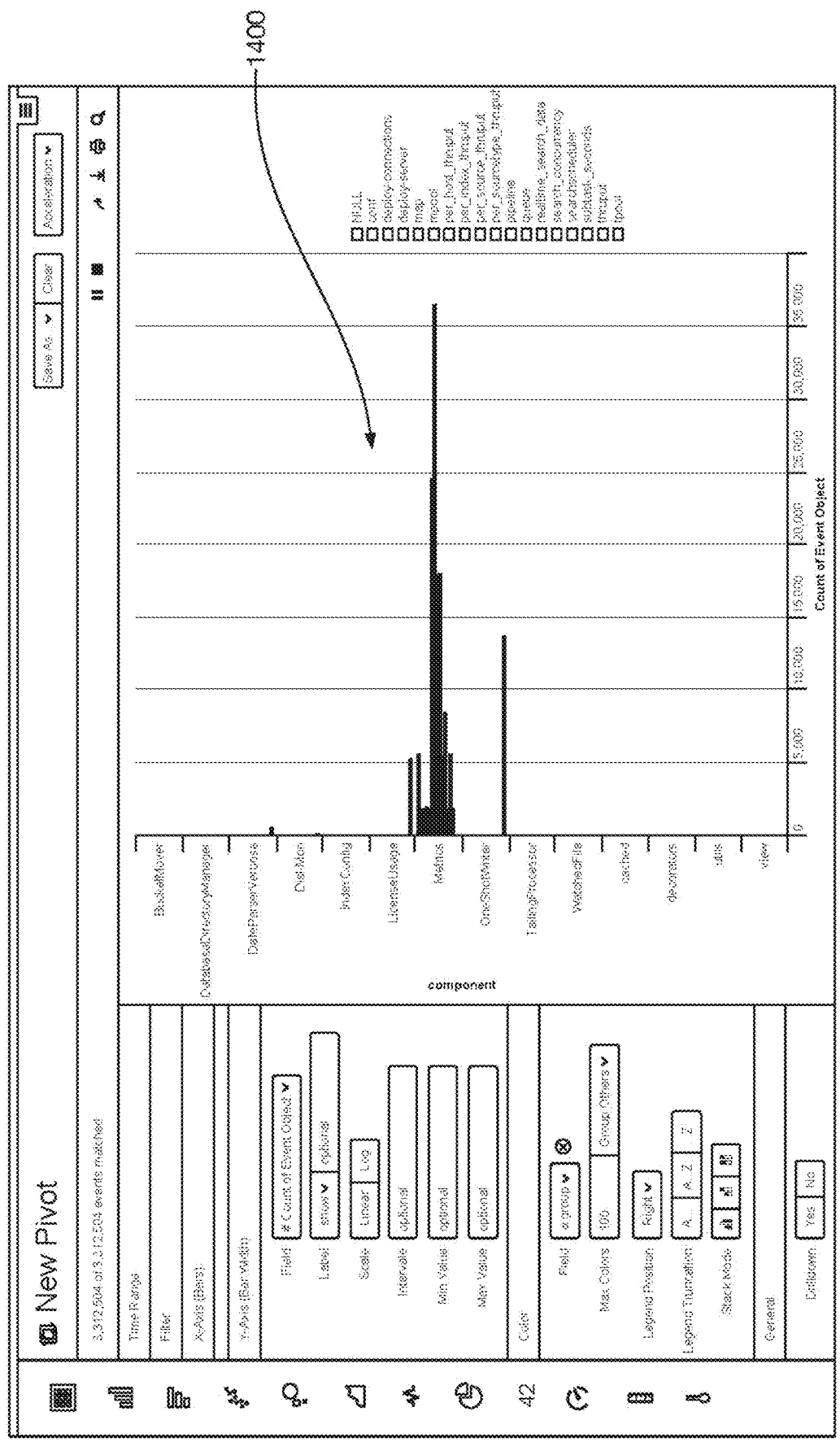
Figure 15:
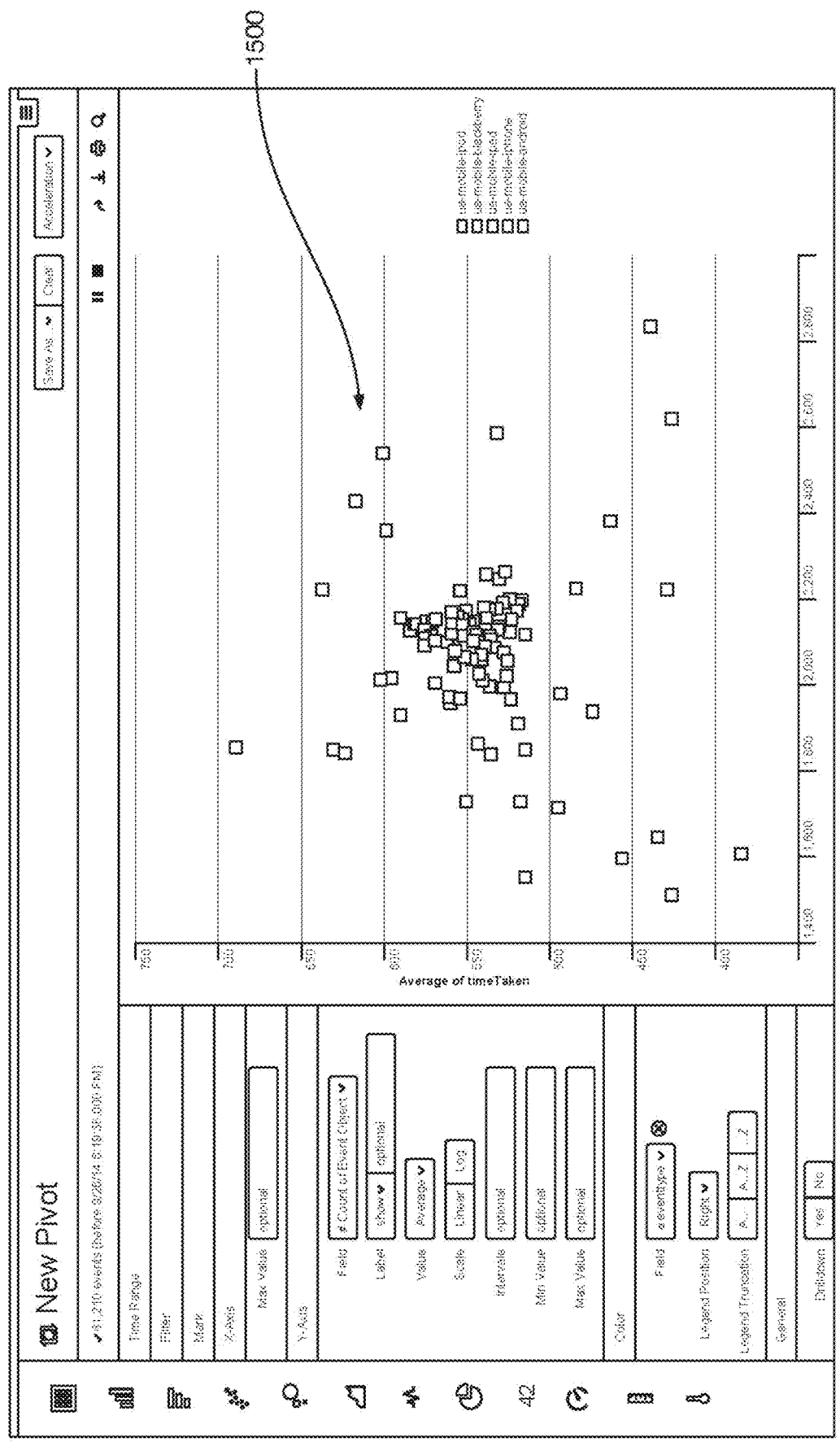

The reporting application allows the user to create graphical visualizations of the statistics generated for a report. For example, FIG. 13 illustrates an example graphical user interface 1300 that may display a set of components and associated statistics 1301. The reporting application allows the user to select a visualization of the statistics in a graph (e.g., bar chart, scatter plot, area chart, line chart, pie chart, radial gauge, marker gauge, filler gauge, etc.), where the format of the graph may be selected using the user interface controls 1302 along the left panel of the user interface 1300. FIG. 14 illustrates an example of a bar chart visualization 1400 of an aspect of the statistical data 1301. FIG. 15 illustrates a scatter plot visualization 1500 of an aspect of the statistical data 1301.

2.13. Acceleration Technique

The above-described system provides significant flexibility by enabling a user to analyze massive quantities of minimally-processed data "on the fly" at search time using a late-binding schema, instead of storing pre-specified portions of the data in a database at ingestion time. This flexibility enables a user to see valuable insights, correlate data, and perform subsequent queries to examine interesting aspects of the data that may not have been apparent at ingestion time.

However, performing extraction and analysis operations at search time can involve a large amount of data and require a large number of computational operations, which can cause delays in processing the queries. Advantageously, the data intake and query system also employs a number of unique acceleration techniques that have been developed to speed up analysis operations performed at search time. These techniques include: (1) performing search operations in parallel across multiple indexers; (2) using a keyword index; (3) using a high performance analytics store; and (4) accelerating the process of generating reports. These novel techniques are described in more detail below.

2.13.1. Aggregation Technique

To facilitate faster query processing, a query can be structured such that multiple indexers perform the query in parallel, while aggregation of search results from the multiple indexers is performed locally at the search head. For example, FIG. 16 is an example search query received from a client and executed by search peers, in accordance with example embodiments. FIG. 16 illustrates how a search query 1602 received from a client at a search head 210 can split into two phases, including: (1) subtasks 1604 (e.g., data retrieval or simple filtering) that may be performed in parallel by indexers 206 for execution, and (2) a search results aggregation operation 1606 to be executed by the search head when the results are ultimately collected from the indexers.

During operation, upon receiving search query 1602, a search head 210 determines that a portion of the operations involved with the search query may be performed locally by the search head. The search head modifies search query 1602 by substituting "stats" (create aggregate statistics over results sets received from the indexers at the search head) with "prestats" (create statistics by the indexer from local results set) to produce search query 1604, and then distributes search query 1604 to distributed indexers, which are also referred to as "search peers" or "peer indexers." Note that search queries may generally specify search criteria or operations to be performed on events that meet the search criteria. Search queries may also specify field names, as well as search criteria for the values in the fields or operations to be performed on the values in the fields. Moreover, the search head may distribute the full search query to the search peers as illustrated in FIG. 6A, or may alternatively distribute a modified version (e.g., a more restricted version) of the search query to the search peers. In this example, the indexers are responsible for producing the results and sending them to the search head. After the indexers return the results to the search head, the search head aggregates the received results 1606 to form a single search result set. By executing the query in this manner, the system effectively distributes the computational operations across the indexers while minimizing data transfers.

2.13.2. Keyword Index

As described above with reference to the flow charts in FIG. 5A and FIG. 6A, data intake and query system 108 can construct and maintain one or more keyword indices to quickly identify events containing specific keywords. This technique can greatly speed up the processing of queries involving specific keywords. As mentioned above, to build a keyword index, an indexer first identifies a set of keywords. Then, the indexer includes the identified keywords in an index, which associates each stored keyword with references to events containing that keyword, or to locations within events where that keyword is located. When an indexer subsequently receives a keyword-based query, the indexer can access the keyword index to quickly identify events containing the keyword.

2.13.3. High Performance Analytics Store

To speed up certain types of queries, some embodiments of system 108 create a high performance analytics store, which is referred to as a "summarization table," that contains entries for specific field-value pairs. Each of these entries keeps track of instances of a specific value in a specific field in the events and includes references to events containing the specific value in the specific field. For example, an example entry in a summarization table can keep track of occurrences of the value "94107" in a "ZIP code" field of a set of events and the entry includes references to all of the events that contain the value "94107" in the ZIP code field. This optimization technique enables the system to quickly process queries that seek to determine how many events have a particular value for a particular field. To this end, the system can examine the entry in the summarization table to count instances of the specific value in the field without having to go through the individual events or perform data extractions at search time. Also, if the system needs to process all events that have a specific field-value combination, the system can use the references in the summarization table entry to directly access the events to extract further information without having to search all of the events to find the specific field-value combination at search time.

In some embodiments, the system maintains a separate summarization table for each of the above-described time-specific buckets that stores events for a specific time range. A bucket-specific summarization table includes entries for specific field-value combinations that occur in events in the specific bucket. Alternatively, the system can maintain a separate summarization table for each indexer. The indexer-specific summarization table includes entries for the events in a data store that are managed by the specific indexer. Indexer-specific summarization tables may also be bucket-specific.

The summarization table can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination.

In some cases, when the summarization tables may not cover all of the events that are relevant to a query, the system can use the summarization tables to obtain partial results for the events that are covered by summarization tables, but may also have to search through other events that are not covered by the summarization tables to produce additional results. These additional results can then be combined with the partial results to produce a final set of results for the query. The summarization table and associated techniques are described in more detail in U.S. Pat. No. 8,682,925, entitled "Distributed High Performance Analytics Store", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", issued on 8 Sep. 2015, and U.S. patent application Ser. No. 14/815,973, entitled "GENERATING AND STORING SUMMARIZATION TABLES FOR SETS OF SEARCHABLE EVENTS", filed on 1 Aug. 2015, each of which is hereby incorporated by reference in its entirety for all purposes.

To speed up certain types of queries, e.g., frequently encountered queries or computationally intensive queries, some embodiments of system 108 create a high performance analytics store, which is referred to as a "summarization table," (also referred to as a "lexicon" or "inverted index") that contains entries for specific field-value pairs. Each of these entries keeps track of instances of a specific value in a specific field in the event data and includes references to events containing the specific value in the specific field. For example, an example entry in an inverted index can keep track of occurrences of the value "94107" in a "ZIP code" field of a set of events and the entry includes references to all of the events that contain the value "94107" in the ZIP code field. Creating the inverted index data structure avoids needing to incur the computational overhead each time a statistical query needs to be run on a frequently encountered field-value pair. In order to expedite queries, in most embodiments, the search engine will employ the inverted index separate from the raw record data store to generate responses to the received queries.

Note that the term "summarization table" or "inverted index" as used herein is a data structure that may be generated by an indexer that includes at least field names and field values that have been extracted and/or indexed from event records. An inverted index may also include reference values that point to the location(s) in the field searchable data store where the event records that include the field may be found. Also, an inverted index may be stored using well-known compression techniques to reduce its storage size.

Further, note that the term "reference value" (also referred to as a "posting value") as used herein is a value that references the location of a source record in the field searchable data store. In some embodiments, the reference value may include additional information about each record, such as timestamps, record size, meta-data, or the like. Each reference value may be a unique identifier which may be used to access the event data directly in the field searchable data store. In some embodiments, the reference values may be ordered based on each event record's timestamp. For example, if numbers are used as identifiers, they may be sorted so event records having a later timestamp always have a lower valued identifier than event records with an earlier timestamp, or vice-versa. Reference values are often included in inverted indexes for retrieving and/or identifying event records.

In one or more embodiments, an inverted index is generated in response to a user-initiated collection query. The term "collection query" as used herein refers to queries that include commands that generate summarization information and inverted indexes (or summarization tables) from event records stored in the field searchable data store.

Note that a collection query is a special type of query that can be user-generated and is used to create an inverted index.

A collection query is not the same as a query that is used to call up or invoke a pre-existing inverted index. In one or more embodiment, a query can comprise an initial step that calls up a pre-generated inverted index on which further filtering and processing can be performed. For example, referring back to FIG. 13, a set of events generated at block 1320 by either using a "collection" query to create a new inverted index or by calling up a pre-generated inverted index. A query with several pipelined steps will start with a pre-generated index to accelerate the query.

Figure 7C:
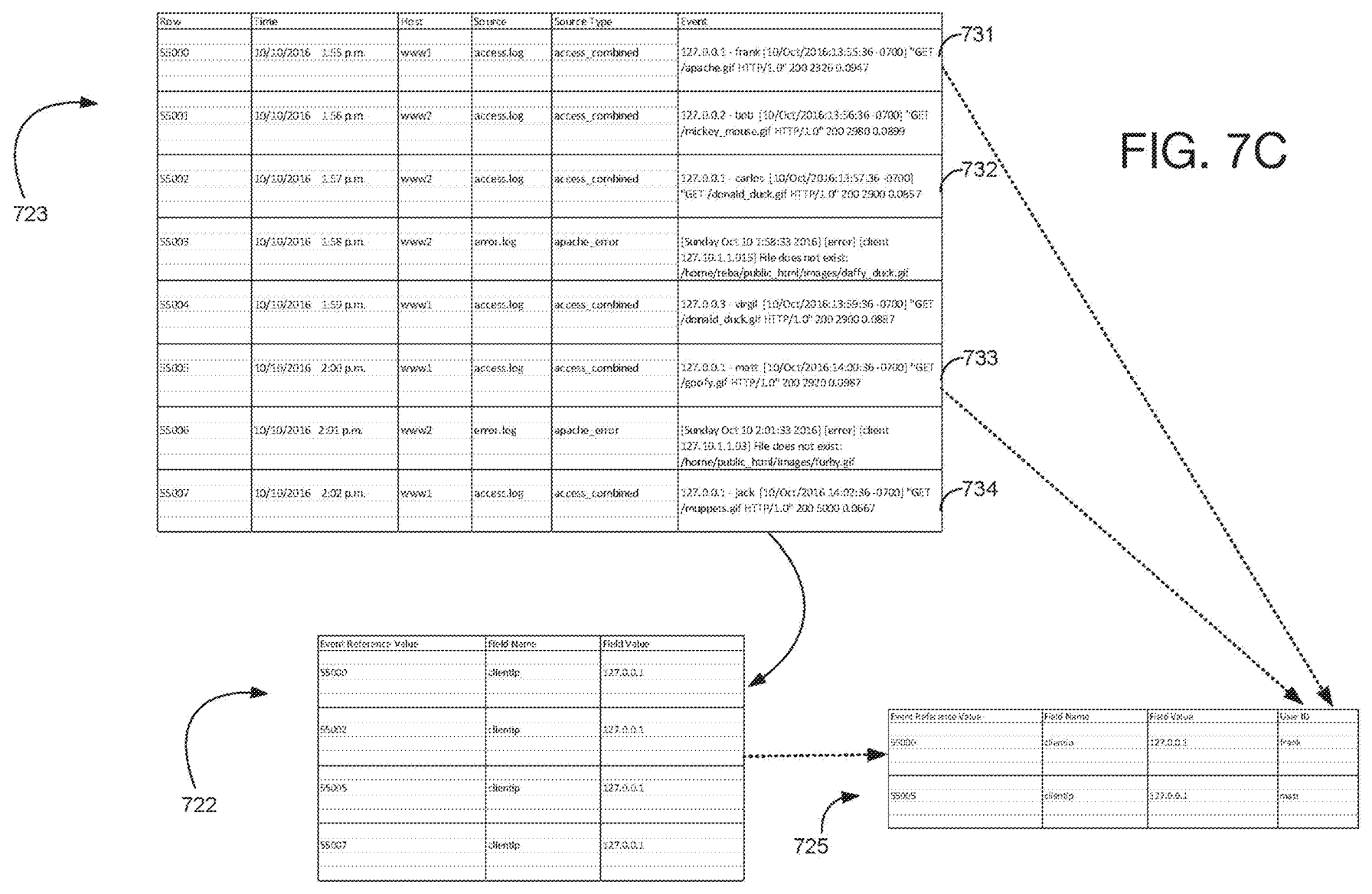

FIG. 7C illustrates the manner in which an inverted index is created and used in accordance with the disclosed embodiments. As shown in FIG. 7C, an inverted index 722 can be created in response to a user-initiated collection query using the event data 723 stored in the raw record data store. For example, a non-limiting example of a collection query may include "collect clientip=127.0.0.1" which may result in an inverted index 722 being generated from the event data 723 as shown in FIG. 7C. Each entry in inverted index 722 includes an event reference value that references the location of a source record in the field searchable data store. The reference value may be used to access the original event record directly from the field searchable data store.

In one or more embodiments, if one or more of the queries is a collection query, the responsive indexers may generate summarization information based on the fields of the event records located in the field searchable data store. In at least one of the various embodiments, one or more of the fields used in the summarization information may be listed in the collection query and/or they may be determined based on terms included in the collection query. For example, a collection query may include an explicit list of fields to summarize. Or, in at least one of the various embodiments, a collection query may include terms or expressions that explicitly define the fields, e.g., using regex rules. In FIG. 7C, prior to running the collection query that generates the inverted index 722, the field name "clientip" may need to be defined in a configuration file by specifying the "access_combined" source type and a regular expression rule to parse out the client IP address. Alternatively, the collection query may contain an explicit definition for the field name "clientip" which may obviate the need to reference the configuration file at search time.

In one or more embodiments, collection queries may be saved and scheduled to run periodically. These scheduled collection queries may periodically update the summarization information corresponding to the query. For example, if the collection query that generates inverted index 722 is scheduled to run periodically, one or more indexers would periodically search through the relevant buckets to update inverted index 722 with event data for any new events with the "clientip" value of "127.0.0.1."

In some embodiments, the inverted indexes that include fields, values, and reference value (e.g., inverted index 722) for event records may be included in the summarization information provided to the user. In other embodiments, a user may not be interested in specific fields and values contained in the inverted index, but may need to perform a statistical query on the data in the inverted index. For example, referencing the example of FIG. 7C rather than viewing the fields within summarization table 722, a user may want to generate a count of all client requests from IP address "127.0.0.1." In this case, the search engine would simply return a result of "4" rather than including details about the inverted index 722 in the information provided to the user.

The pipelined search language, e.g., SPL of the SPLUNK® ENTERPRISE system can be used to pipe the contents of an inverted index to a statistical query using the "stats" command for example. A "stats" query refers to queries that generate result sets that may produce aggregate and statistical results from event records, e.g., average, mean, max, min, rms, etc. Where sufficient information is available in an inverted index, a "stats" query may generate their result sets rapidly from the summarization information available in the inverted index rather than directly scanning event records. For example, the contents of inverted index 722 can be pipelined to a stats query, e.g., a "count" function that counts the number of entries in the inverted index and returns a value of "4." In this way, inverted indexes may enable various stats queries to be performed absent scanning or search the event records. Accordingly, this optimization technique enables the system to quickly process queries that seek to determine how many events have a particular value for a particular field. To this end, the system can examine the entry in the inverted index to count instances of the specific value in the field without having to go through the individual events or perform data extractions at search time.

In some embodiments, the system maintains a separate inverted index for each of the above-described time-specific buckets that stores events for a specific time range. A bucket-specific inverted index includes entries for specific field-value combinations that occur in events in the specific bucket. Alternatively, the system can maintain a separate inverted index for each indexer. The indexer-specific inverted index includes entries for the events in a data store that are managed by the specific indexer. Indexer-specific inverted indexes may also be bucket-specific. In at least one or more embodiments, if one or more of the queries is a stats query, each indexer may generate a partial result set from previously generated summarization information. The partial result sets may be returned to the search head that received the query and combined into a single result set for the query As mentioned above, the inverted index can be populated by running a periodic query that scans a set of events to find instances of a specific field-value combination, or alternatively instances of all field-value combinations for a specific field. A periodic query can be initiated by a user, or can be scheduled to occur automatically at specific time intervals. A periodic query can also be automatically launched in response to a query that asks for a specific field-value combination. In some embodiments, if summarization information is absent from an indexer that includes responsive event records, further actions may be taken, such as, the summarization information may generated on the fly, warnings may be provided the user, the collection query operation may be halted, the absence of summarization information may be ignored, or the like, or combination thereof.

In one or more embodiments, an inverted index may be set up to update continually. For example, the query may ask for the inverted index to update its result periodically, e.g., every hour. In such instances, the inverted index may be a dynamic data structure that is regularly updated to include information regarding incoming events.

In some cases, e.g., where a query is executed before an inverted index updates, when the inverted index may not cover all of the events that are relevant to a query, the system can use the inverted index to obtain partial results for the events that are covered by inverted index, but may also have to search through other events that are not covered by the inverted index to produce additional results on the fly. In other words, an indexer would need to search through event data on the data store to supplement the partial results. These additional results can then be combined with the partial results to produce a final set of results for the query. Note that in typical instances where an inverted index is not completely up to date, the number of events that an indexer would need to search through to supplement the results from the inverted index would be relatively small. In other words, the search to get the most recent results can be quick and efficient because only a small number of event records will be searched through to supplement the information from the inverted index. The inverted index and associated techniques are described in more detail in U.S. Pat. No. 8,682,925, entitled "Distributed High Performance Analytics Store", issued on 25 Mar. 2014, U.S. Pat. No. 9,128,985, entitled "SUPPLEMENTING A HIGH PERFORMANCE ANALYTICS STORE WITH EVALUATION OF INDIVIDUAL EVENTS TO RESPOND TO AN EVENT QUERY", filed on 31 Jan. 2014, and U.S. patent application Ser. No. 14/815,973, entitled "STORAGE MEDIUM AND CONTROL DEVICE", filed on 21 Feb. 2014, each of which is hereby incorporated by reference in its entirety.

2.13.3.1 Extracting Event Data Using Posting

In one or more embodiments, if the system needs to process all events that have a specific field-value combination, the system can use the references in the inverted index entry to directly access the events to extract further information without having to search all of the events to find the specific field-value combination at search time. In other words, the system can use the reference values to locate the associated event data in the field searchable data store and extract further information from those events, e.g., extract further field values from the events for purposes of filtering or processing or both.

The information extracted from the event data using the reference values can be directed for further filtering or processing in a query using the pipeline search language. The pipelined search language will, in one embodiment, include syntax that can direct the initial filtering step in a query to an inverted index. In one embodiment, a user would include syntax in the query that explicitly directs the initial searching or filtering step to the inverted index.

Referencing the example in FIG. 15, if the user determines that she needs the user id fields associated with the client requests from IP address "127.0.0.1," instead of incurring the computational overhead of performing a brand new search or re-generating the inverted index with an additional field, the user can generate a query that explicitly directs or pipes the contents of the already generated inverted index 1502 to another filtering step requesting the user ids for the entries in inverted index 1502 where the server response time is greater than "0.0900" microseconds. The search engine would use the reference values stored in inverted index 722 to retrieve the event data from the field searchable data store, filter the results based on the "response time" field values and, further, extract the user id field from the resulting event data to return to the user. In the present instance, the user ids "frank" and "carlos" would be returned to the user from the generated results table 722.

In one embodiment, the same methodology can be used to pipe the contents of the inverted index to a processing step. In other words, the user is able to use the inverted index to efficiently and quickly perform aggregate functions on field values that were not part of the initially generated inverted index. For example, a user may want to determine an average object size (size of the requested gif) requested by clients from IP address "127.0.0.1." In this case, the search engine would again use the reference values stored in inverted index 722 to retrieve the event data from the field searchable data store and, further, extract the object size field values from the associated events 731, 732, 733 and 734. Once, the corresponding object sizes have been extracted (i.e. 2326, 2900, 2920, and 5000), the average can be computed and returned to the user.

In one embodiment, instead of explicitly invoking the inverted index in a user-generated query, e.g., by the use of special commands or syntax, the SPLUNK® ENTERPRISE system can be configured to automatically determine if any prior-generated inverted index can be used to expedite a user query. For example, the user's query may request the average object size (size of the requested gif) requested by clients from IP address "127.0.0.1." without any reference to or use of inverted index 722. The search engine, in this case, would automatically determine that an inverted index 722 already exists in the system that could expedite this query. In one embodiment, prior to running any search comprising a field-value pair, for example, a search engine may search though all the existing inverted indexes to determine if a pre-generated inverted index could be used to expedite the search comprising the field-value pair. Accordingly, the search engine would automatically use the pre-generated inverted index, e.g., index 722 to generate the results without any user-involvement that directs the use of the index.

Using the reference values in an inverted index to be able to directly access the event data in the field searchable data store and extract further information from the associated event data for further filtering and processing is highly advantageous because it avoids incurring the computation overhead of regenerating the inverted index with additional fields or performing a new search.

The data intake and query system includes one or more forwarders that receive raw machine data from a variety of input data sources, and one or more indexers that process and store the data in one or more data stores. By distributing events among the indexers and data stores, the indexers can analyze events for a query in parallel. In one or more embodiments, a multiple indexer implementation of the search system would maintain a separate and respective inverted index for each of the above-described time-specific buckets that stores events for a specific time range. A bucket-specific inverted index includes entries for specific field-value combinations that occur in events in the specific bucket. As explained above, a search head would be able to correlate and synthesize data from across the various buckets and indexers.

This feature advantageously expedites searches because instead of performing a computationally intensive search in a centrally located inverted index that catalogues all the relevant events, an indexer is able to directly search an inverted index stored in a bucket associated with the time-range specified in the query. This allows the search to be performed in parallel across the various indexers. Further, if the query requests further filtering or processing to be conducted on the event data referenced by the locally stored bucket-specific inverted index, the indexer is able to simply access the event records stored in the associated bucket for further filtering and processing instead of needing to access a central repository of event records, which would dramatically add to the computational overhead.

In one embodiment, there may be multiple buckets associated with the time-range specified in a query. If the query is directed to an inverted index, or if the search engine automatically determines that using an inverted index would expedite the processing of the query, the indexers will search through each of the inverted indexes associated with the buckets for the specified time-range. This feature allows the High Performance Analytics Store to be scaled easily.

In certain instances, where a query is executed before a bucket-specific inverted index updates, when the bucket-specific inverted index may not cover all of the events that are relevant to a query, the system can use the bucket-specific inverted index to obtain partial results for the events that are covered by bucket-specific inverted index, but may also have to search through the event data in the bucket associated with the bucket-specific inverted index to produce additional results on the fly. In other words, an indexer would need to search through event data stored in the bucket (that was not yet processed by the indexer for the corresponding inverted index) to supplement the partial results from the bucket-specific inverted index.

Figure 7D:
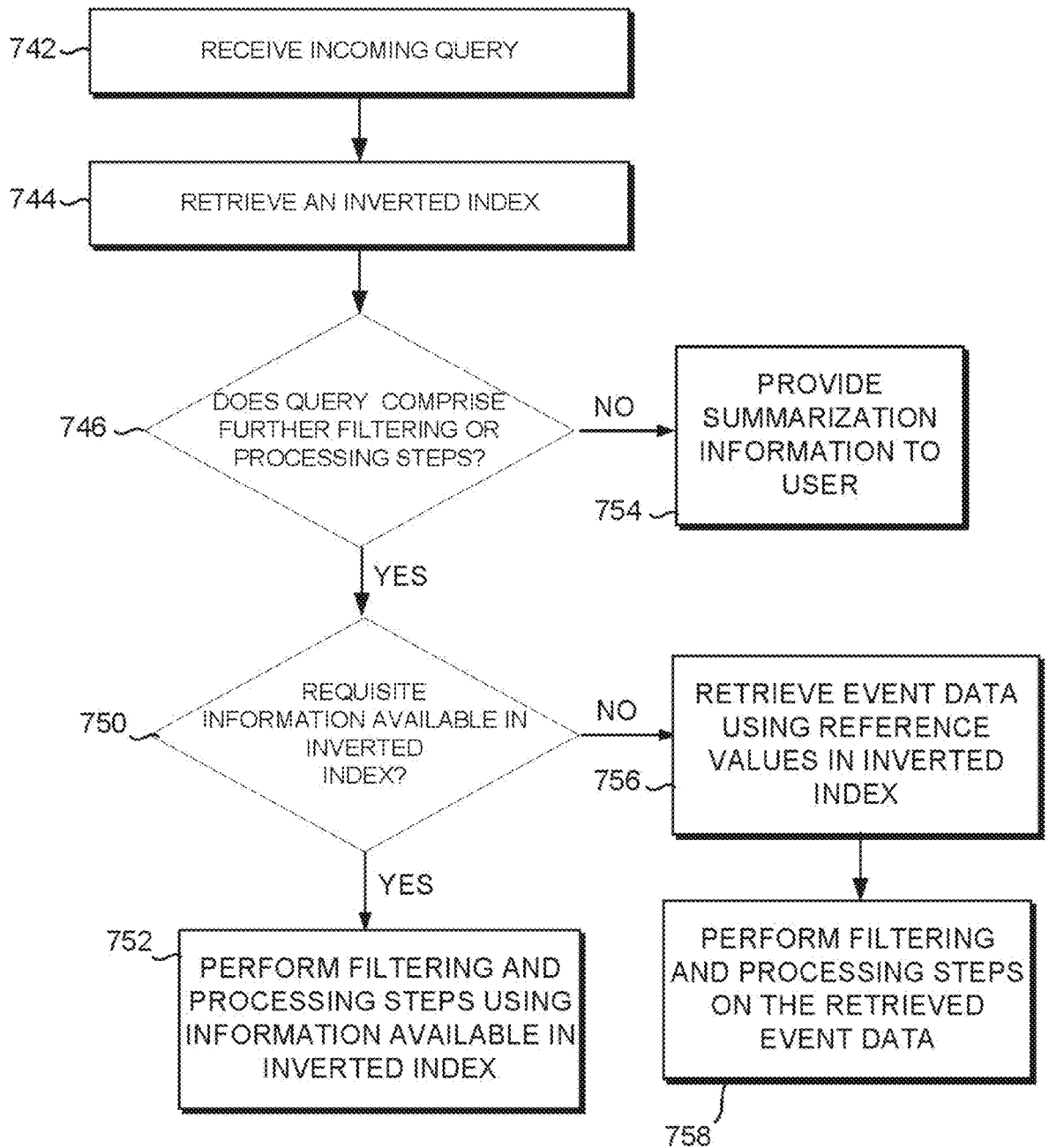
FIG. 7D depicts a flowchart of example use of an inverted index in a pipelined search query, in accordance with example embodiments.

FIG. 7D presents a flowchart illustrating how an inverted index in a pipelined search query can be used to determine a set of event data that can be further limited by filtering or processing in accordance with the disclosed embodiments.

At block 742, a query is received by a data intake and query system. In some embodiments, the query can be received as a user generated query entered into a search bar of a graphical user search interface. The search interface also includes a time range control element that enables specification of a time range for the query.

At block 744, an inverted index is retrieved. Note, that the inverted index can be retrieved in response to an explicit user search command inputted as part of the user generated query. Alternatively, the search engine can be configured to automatically use an inverted index if it determines that using the inverted index would expedite the servicing of the user generated query. Each of the entries in an inverted index keeps track of instances of a specific value in a specific field in the event data and includes references to events containing the specific value in the specific field. In order to expedite queries, in most embodiments, the search engine will employ the inverted index separate from the raw record data store to generate responses to the received queries.

At block 746, the query engine determines if the query contains further filtering and processing steps. If the query contains no further commands, then, in one embodiment, summarization information can be provided to the user at block 754.

If, however, the query does contain further filtering and processing commands, then at block 750, the query engine determines if the commands relate to further filtering or processing of the data extracted as part of the inverted index or whether the commands are directed to using the inverted index as an initial filtering step to further filter and process event data referenced by the entries in the inverted index. If the query can be completed using data already in the generated inverted index, then the further filtering or processing steps, e.g., a "count" number of records function, "average" number of records per hour etc. are performed and the results are provided to the user at block 752.

If, however, the query references fields that are not extracted in the inverted index, then the indexers will access event data pointed to by the reference values in the inverted index to retrieve any further information required at block 756. Subsequently, any further filtering or processing steps are performed on the fields extracted directly from the event data and the results are provided to the user at step 758.

2.13.4. Accelerating Report Generation

In some embodiments, a data server system such as the data intake and query system can accelerate the process of periodically generating updated reports based on query results. To accelerate this process, a summarization engine automatically examines the query to determine whether generation of updated reports can be accelerated by creating intermediate summaries. If reports can be accelerated, the summarization engine periodically generates a summary covering data obtained during a latest non-overlapping time period. For example, where the query seeks events meeting a specified criteria, a summary for the time period includes only events within the time period that meet the specified criteria. Similarly, if the query seeks statistics calculated from the events, such as the number of events that match the specified criteria, then the summary for the time period includes the number of events in the period that match the specified criteria.

In addition to the creation of the summaries, the summarization engine schedules the periodic updating of the report associated with the query. During each scheduled report update, the query engine determines whether intermediate summaries have been generated covering portions of the time period covered by the report update. If so, then the report is generated based on the information contained in the summaries. Also, if additional event data has been received and has not yet been summarized, and is required to generate the complete report, the query can be run on these additional events. Then, the results returned by this query on the additional events, along with the partial results obtained from the intermediate summaries, can be combined to generate the updated report. This process is repeated each time the report is updated. Alternatively, if the system stores events in buckets covering specific time ranges, then the summaries can be generated on a bucket-by-bucket basis. Note that producing intermediate summaries can save the work involved in re-running the query for previous time periods, so advantageously only the newer events needs to be processed while generating an updated report. These report acceleration techniques are described in more detail in U.S. Pat. No. 8,589,403, entitled "Compressed Journaling In Event Tracking Files For Metadata Recovery And Replication", issued on 19 Nov. 2013, U.S. Pat. No. 8,412,696, entitled "Real Time Searching And Reporting", issued on 2 Apr. 2011, and U.S. Pat. Nos. 8,589,375 and 8,589,432, both also entitled "REAL TIME SEARCHING AND REPORTING", both issued on 19 Nov. 2013, each of which is hereby incorporated by reference in its entirety for all purposes.

2.14. Security Features

The data intake and query system provides various schemas, dashboards, and visualizations that simplify developers' tasks to create applications with additional capabilities. One such application is the an enterprise security application, such as SPLUNK® ENTERPRISE SECURITY, which performs monitoring and alerting operations and includes analytics to facilitate identifying both known and unknown security threats based on large volumes of data stored by the data intake and query system. The enterprise security application provides the security practitioner with visibility into security-relevant threats found in the enterprise infrastructure by capturing, monitoring, and reporting on data from enterprise security devices, systems, and applications. Through the use of the data intake and query system searching and reporting capabilities, the enterprise security application provides a top-down and bottom-up view of an organization's security posture.

The enterprise security application leverages the data intake and query system search-time normalization techniques, saved searches, and correlation searches to provide visibility into security-relevant threats and activity and generate notable events for tracking. The enterprise security application enables the security practitioner to investigate and explore the data to find new or unknown threats that do not follow signature-based patterns.

Conventional Security Information and Event Management (STEM) systems lack the infrastructure to effectively store and analyze large volumes of security-related data. Traditional SIEM systems typically use fixed schemas to extract data from pre-defined security-related fields at data ingestion time and store the extracted data in a relational database. This traditional data extraction process (and associated reduction in data size) that occurs at data ingestion time inevitably hampers future incident investigations that may need original data to determine the root cause of a security issue, or to detect the onset of an impending security threat.

In contrast, the enterprise security application system stores large volumes of minimally-processed security-related data at ingestion time for later retrieval and analysis at search time when a live security threat is being investigated. To facilitate this data retrieval process, the enterprise security application provides pre-specified schemas for extracting relevant values from the different types of security-related events and enables a user to define such schemas.

The enterprise security application can process many types of security-related information. In general, this security-related information can include any information that can be used to identify security threats. For example, the security-related information can include network-related information, such as IP addresses, domain names, asset identifiers, network traffic volume, uniform resource locator strings, and source addresses. The process of detecting security threats for network-related information is further described in U.S. Pat. No. 8,826,434, entitled "SECURITY THREAT DETECTION BASED ON INDICATIONS IN BIG DATA OF ACCESS TO NEWLY REGISTERED DOMAINS", issued on 2 Sep. 2014, U.S. Pat. No. 9,215,240, entitled "INVESTIGATIVE AND DYNAMIC DETECTION OF POTENTIAL SECURITY-THREAT INDICATORS FROM EVENTS IN BIG DATA", issued on 15 Dec. 2015, U.S. Pat. No. 9,173,801, entitled "GRAPHIC DISPLAY OF SECURITY THREATS BASED ON INDICATIONS OF ACCESS TO NEWLY REGISTERED DOMAINS", issued on 3 Nov. 2015, U.S. Pat. No. 9,248,068, entitled "SECURITY THREAT DETECTION OF NEWLY REGISTERED DOMAINS", issued on 2 Feb. 2016, U.S. Pat. No. 9,426,172, entitled "SECURITY THREAT DETECTION USING DOMAIN NAME ACCESSES", issued on 23 Aug. 2016, and U.S. Pat. No. 9,432,396, entitled "SECURITY THREAT DETECTION USING DOMAIN NAME REGISTRATIONS", issued on 30 Aug. 2016, each of which is hereby incorporated by reference in its entirety for all purposes. Security-related information can also include malware infection data and system configuration information, as well as access control information, such as login/logout information and access failure notifications. The security-related information can originate from various sources within a data center, such as hosts, virtual machines, storage devices and sensors. The security-related information can also originate from various sources in a network, such as routers, switches, email servers, proxy servers, gateways, firewalls and intrusion-detection systems.

During operation, the enterprise security application facilitates detecting "notable events" that are likely to indicate a security threat. A notable event represents one or more anomalous incidents, the occurrence of which can be identified based on one or more events (e.g., time stamped portions of raw machine data) fulfilling pre-specified and/or dynamically-determined (e.g., based on machine-learning)

criteria defined for that notable event. Examples of notable events include the repeated occurrence of an abnormal spike in network usage over a period of time, a single occurrence of unauthorized access to system, a host communicating with a server on a known threat list, and the like. These notable events can be detected in a number of ways, such as: (1) a user can notice a correlation in events and can manually identify that a corresponding group of one or more events amounts to a notable event; or (2) a user can define a "correlation search" specifying criteria for a notable event, and every time one or more events satisfy the criteria, the application can indicate that the one or more events correspond to a notable event; and the like. A user can alternatively select a pre-defined correlation search provided by the application. Note that correlation searches can be run continuously or at regular intervals (e.g., every hour) to search for notable events. Upon detection, notable events can be stored in a dedicated "notable events index," which can be subsequently accessed to generate various visualizations containing security-related information. Also, alerts can be generated to notify system operators when important notable events are discovered.

Figure 17A:
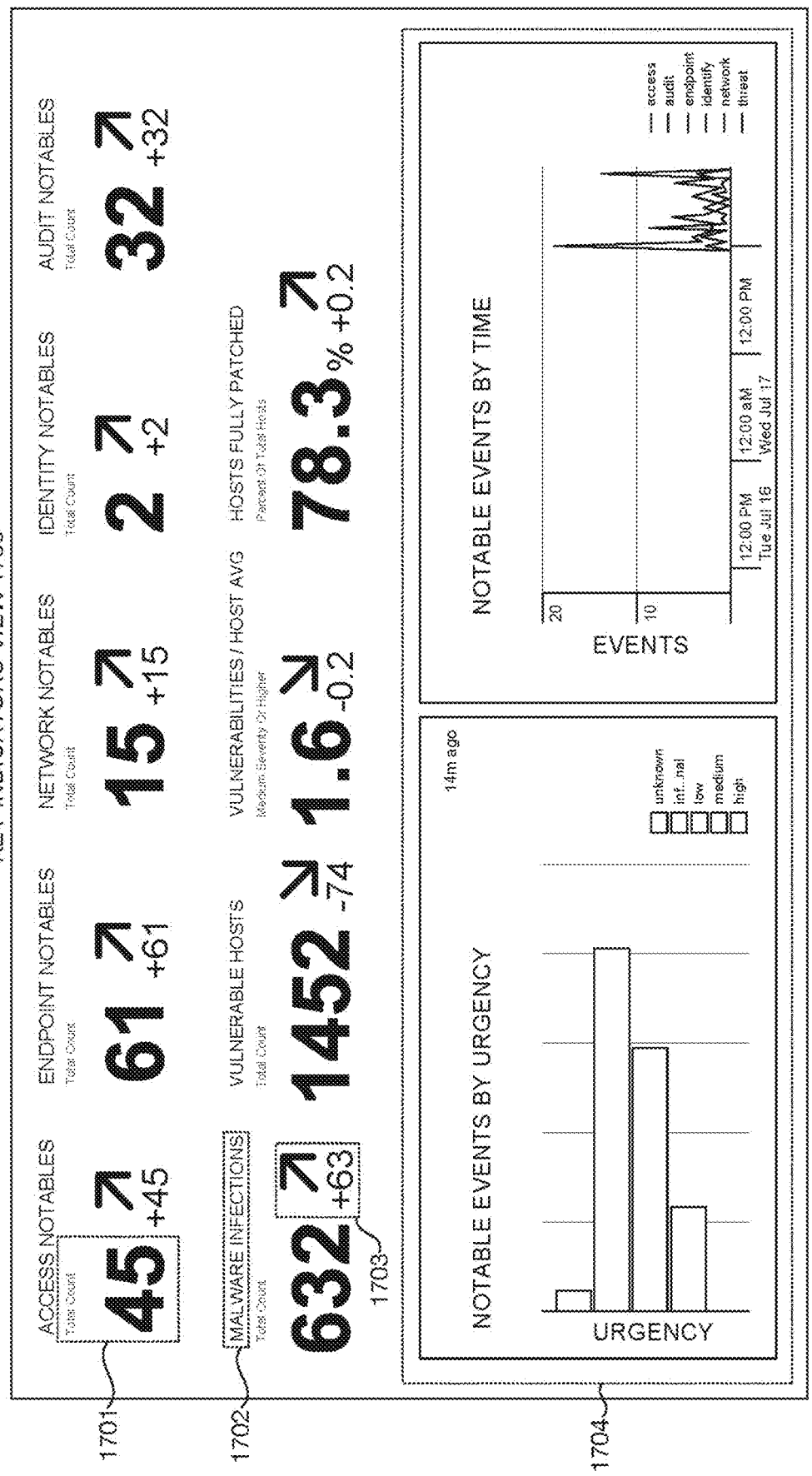
FIG. 17A is an interface diagram of an example user interface of a key indicators view, in accordance with example embodiments.

The enterprise security application provides various visualizations to aid in discovering security threats, such as a "key indicators view" that enables a user to view security metrics, such as counts of different types of notable events. For example, FIG. 17A illustrates an example key indicators view 1700 that comprises a dashboard, which can display a value 1701, for various security-related metrics, such as malware infections 1702. It can also display a change in a metric value 1703, which indicates that the number of malware infections increased by 63 during the preceding interval. Key indicators view 1700 additionally displays a histogram panel 1704 that displays a histogram of notable events organized by urgency values, and a histogram of notable events organized by time intervals. This key indicators view is described in further detail in pending U.S. patent application Ser. No. 13/956,338, entitled "Key Indicators View", filed on 31 Jul. 2013, and which is hereby incorporated by reference in its entirety for all purposes.

Figure 17B:
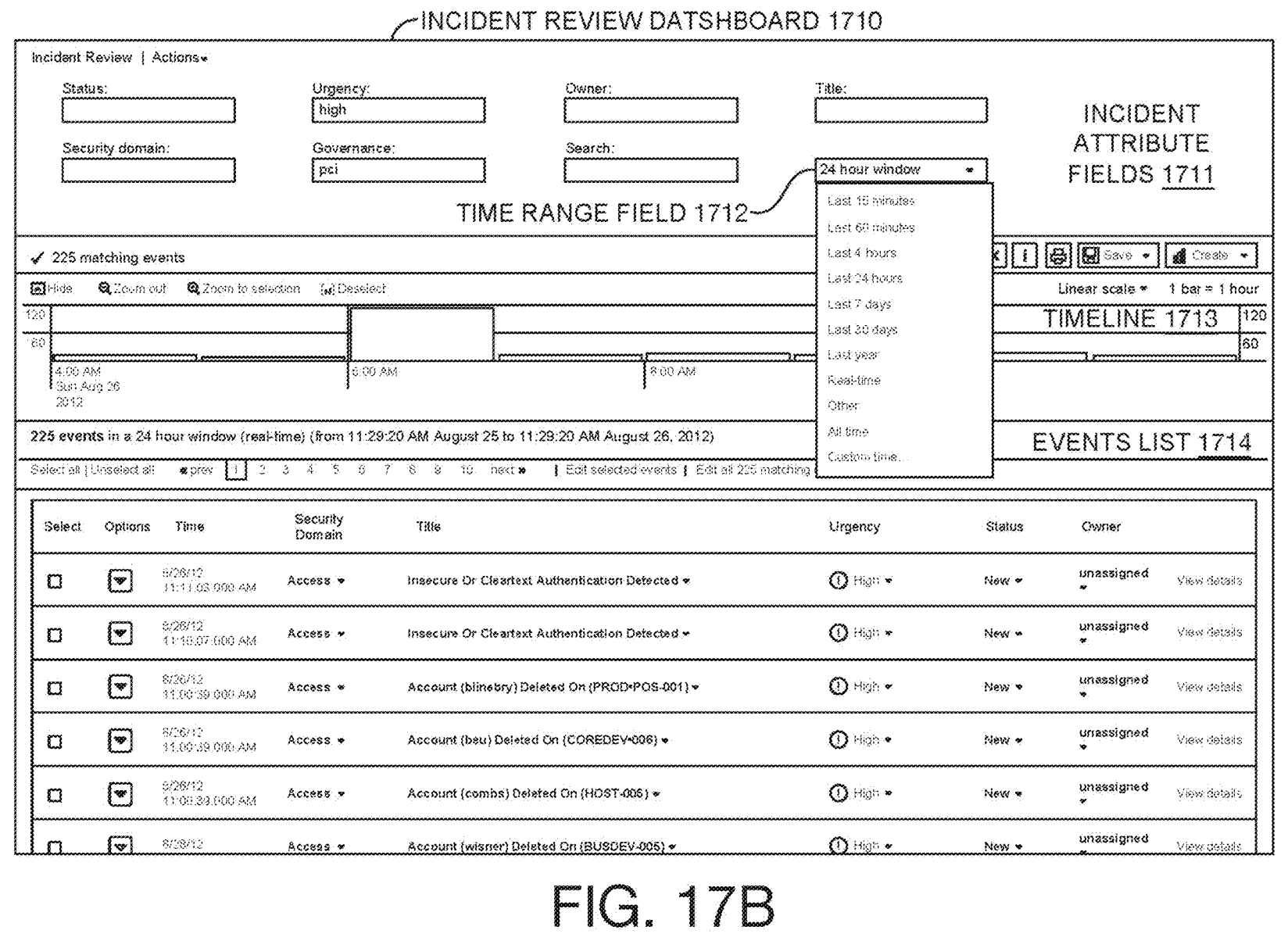

These visualizations can also include an "incident review dashboard" that enables a user to view and act on "notable events." These notable events can include: (1) a single event of high importance, such as any activity from a known web attacker; or (2) multiple events that collectively warrant review, such as a large number of authentication failures on a host followed by a successful authentication. For example, FIG. 17B illustrates an example incident review dashboard 1710 that includes a set of incident attribute fields 1711 that, for example, enables a user to specify a time range field 1712 for the displayed events. It also includes a timeline 1713 that graphically illustrates the number of incidents that occurred in time intervals over the selected time range. It additionally displays an events list 1714 that enables a user to view a list of all of the notable events that match the criteria in the incident attributes fields 1711. To facilitate identifying patterns among the notable events, each notable event can be associated with an urgency value (e.g., low, medium, high, critical), which is indicated in the incident review dashboard. The urgency value for a detected event can be determined based on the severity of the event and the priority of the system component associated with the event.

2.15. Data Center Monitoring

As mentioned above, the data intake and query platform provides various features that simplify the developers' task to create various applications. One such application is a virtual machine monitoring application, such as SPLUNK® APP FOR VMWARE® that provides operational visibility into granular performance metrics, logs, tasks and events, and topology from hosts, virtual machines and virtual centers. It empowers administrators with an accurate real-time picture of the health of the environment, proactively identifying performance and capacity bottlenecks.

Conventional data-center-monitoring systems lack the infrastructure to effectively store and analyze large volumes of machine-generated data, such as performance information and log data obtained from the data center. In conventional data-center-monitoring systems, machine-generated data is typically pre-processed prior to being stored, for example, by extracting pre-specified data items and storing them in a database to facilitate subsequent retrieval and analysis at search time. However, the rest of the data is not saved and discarded during pre-processing.

In contrast, the virtual machine monitoring application stores large volumes of minimally processed machine data, such as performance information and log data, at ingestion time for later retrieval and analysis at search time when a live performance issue is being investigated. In addition to data obtained from various log files, this performance-related information can include values for performance metrics obtained through an application programming interface (API) provided as part of the vSphere Hypervisor™ system distributed by VMware, Inc. of Palo Alto, Calif. For example, these performance metrics can include: (1) CPU-related performance metrics; (2) disk-related performance metrics; (3) memory-related performance metrics; (4) network-related performance metrics; (5) energy-usage statistics; (6) data-traffic-related performance metrics; (7) overall system availability performance metrics; (8) cluster-related performance metrics; and (9) virtual machine performance statistics. Such performance metrics are described in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

To facilitate retrieving information of interest from performance data and log files, the virtual machine monitoring application provides pre-specified schemas for extracting relevant values from different types of performance-related events, and also enables a user to define such schemas.

Figure 17C:
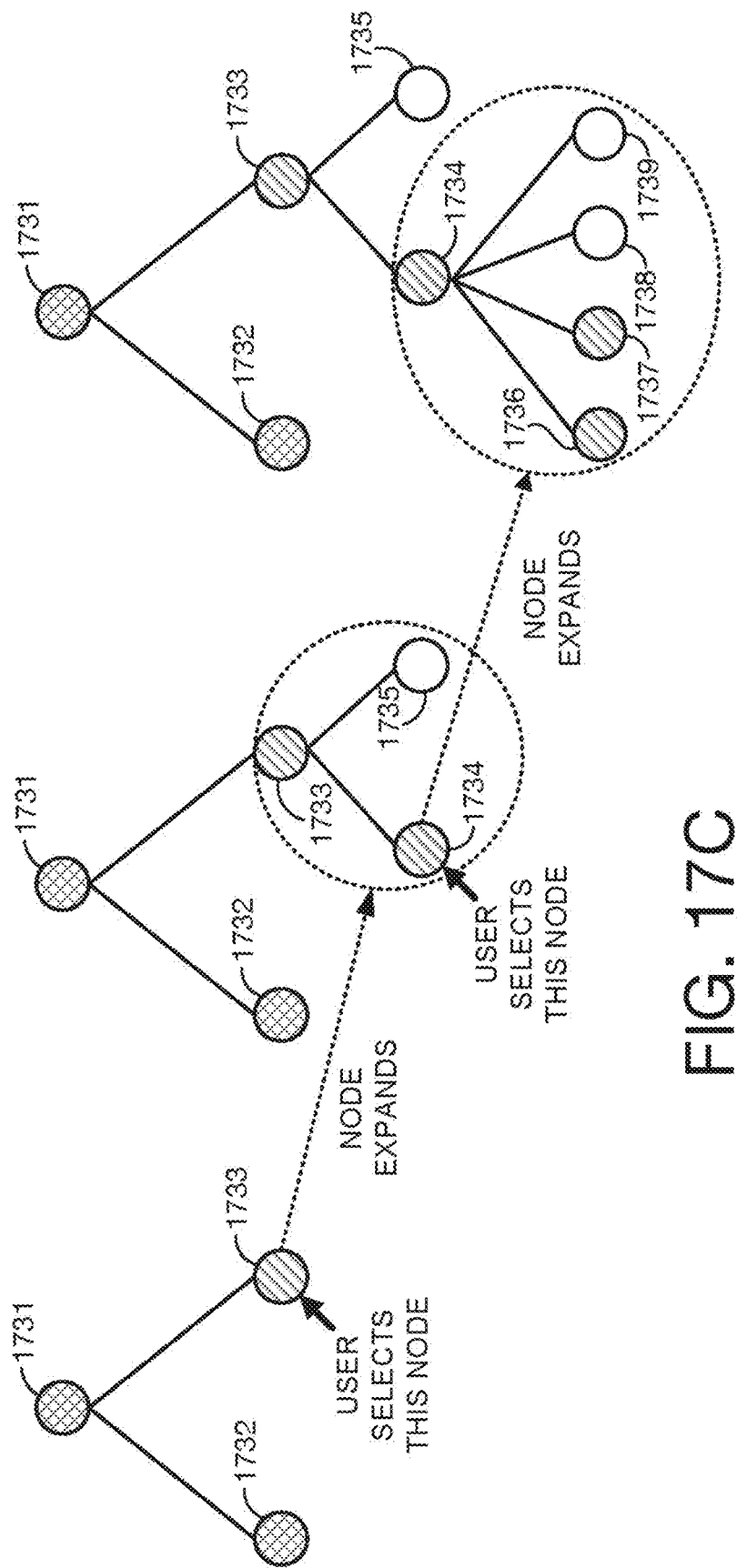
FIG. 17C is a tree diagram of an example a proactive monitoring tree, in accordance with example embodiments.

The virtual machine monitoring application additionally provides various visualizations to facilitate detecting and diagnosing the root cause of performance problems. For example, one such visualization is a "proactive monitoring tree" that enables a user to easily view and understand relationships among various factors that affect the performance of a hierarchically structured computing system. This proactive monitoring tree enables a user to easily navigate the hierarchy by selectively expanding nodes representing various entities (e.g., virtual centers or computing clusters) to view performance information for lower-level nodes associated with lower-level entities (e.g., virtual machines or host systems). Example node-expansion operations are illustrated in FIG. 17C, wherein nodes 1733 and 1734 are selectively expanded. Note that nodes 1731-1739 can be displayed using different patterns or colors to represent different performance states, such as a critical state, a warning state, a normal state or an unknown/offline state. The ease of navigation provided by selective expansion in combination with the associated performance-state information enables a user to quickly diagnose the root cause of a performance problem. The proactive monitoring tree is described in further detail in U.S. Pat. No. 9,185,007, entitled "PROACTIVE MONITORING TREE WITH SEVERITY STATE SORTING", issued on 10 Nov. 2015, and U.S. Pat. No. 9,426,045, also entitled "PROACTIVE MONITORING TREE WITH SEVERITY STATE SORTING", issued on 23 Aug. 2016, each of which is hereby incorporated by reference in its entirety for all purposes.

Figure 17D:
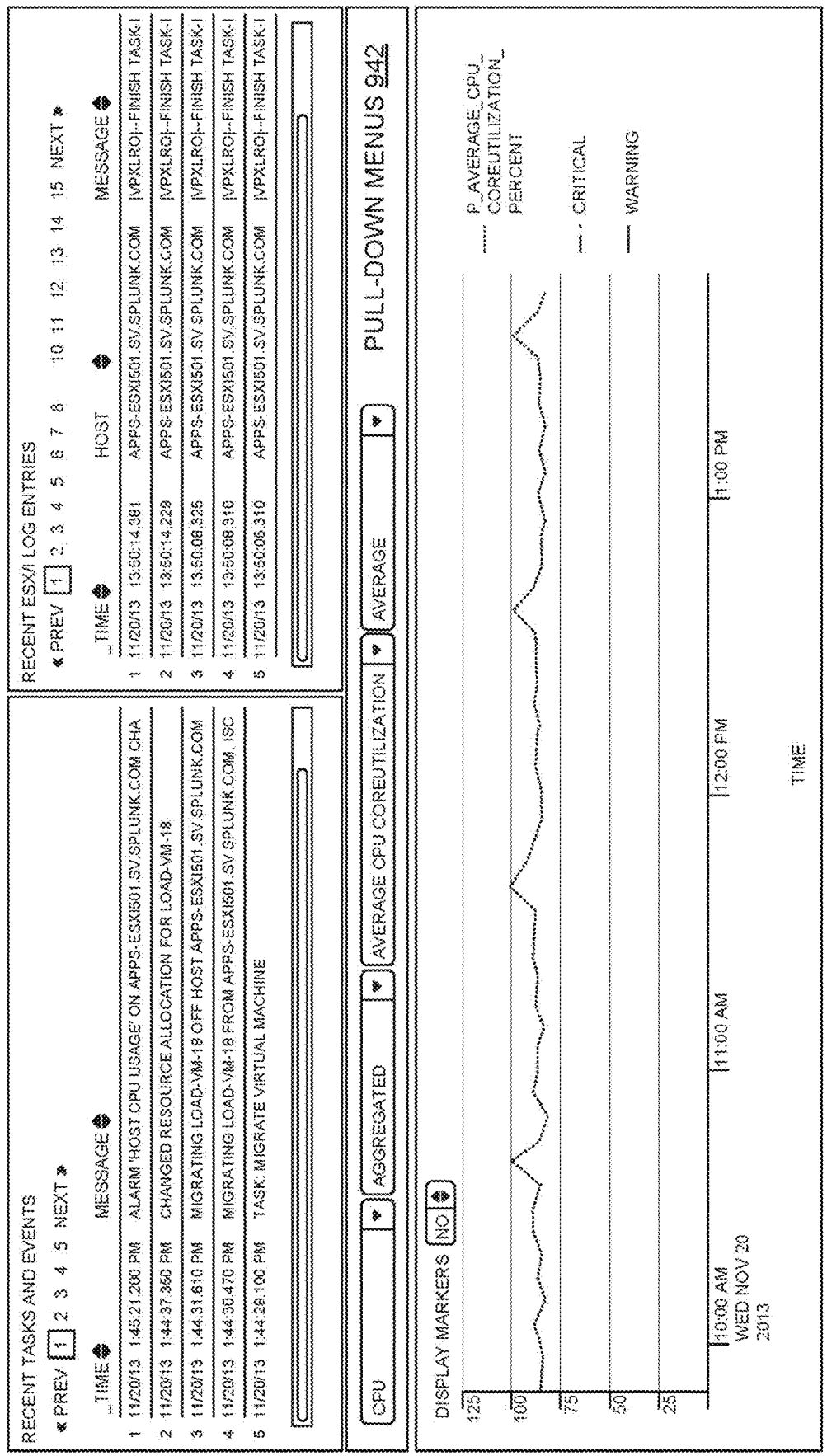
FIG. 17D is an interface diagram of an example a user interface displaying both log data and performance data, in accordance with example embodiments.

The virtual machine monitoring application also provides a user interface that enables a user to select a specific time range and then view heterogeneous data comprising events, log data, and associated performance metrics for the selected time range. For example, the screen illustrated in FIG. 17D displays a listing of recent "tasks and events" and a listing of recent "log entries" for a selected time range above a performance-metric graph for "average CPU core utilization" for the selected time range. Note that a user is able to operate pull-down menus 1742 to selectively display different performance metric graphs for the selected time range. This enables the user to correlate trends in the performance-metric graph with corresponding event and log data to quickly determine the root cause of a performance problem. This user interface is described in more detail in U.S. patent application Ser. No. 14/167,316, entitled "Correlation For User-Selected Time Ranges Of Values For Performance Metrics Of Components In An Information-Technology Environment With Log Data From That Information-Technology Environment", filed on 29 Jan. 2014, and which is hereby incorporated by reference in its entirety for all purposes.

3.0. Manipulation of Virtual Objects in an Extended Reality Environment

Figure 18:
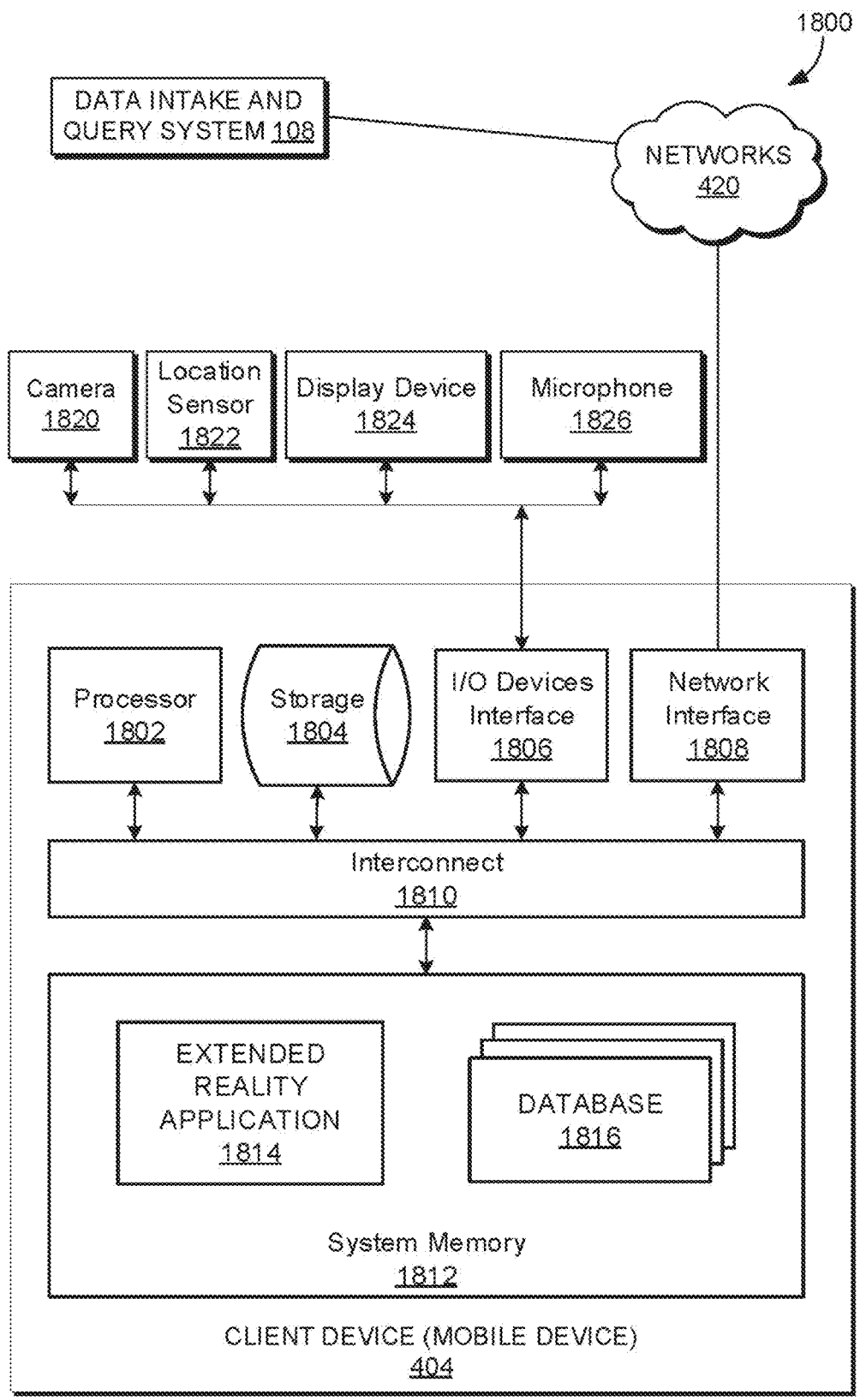
FIG. 18 illustrates a more detailed view of the example system of FIG. 4, in accordance with example embodiments.

FIG. 18 illustrates a more detailed view of the example system of FIG. 4, in accordance with example embodiments. As shown, the networked computer environment 1800 may include, without limitation, a data intake and query system 108 and a client device (otherwise referred to herein as a mobile device) 404 communicating with one another over one or more networks 420. The data intake and query system 108 and client device (mobile device) 404 function substantially the same as described in conjunction with FIGS. 1 and 4, except as further described herein. Examples of mobile devices 404 may include, without limitation, smartphones, tablet computers, handheld computers, wearable devices, laptop computers, desktop computers, servers, portable media players, gaming devices, and so forth. The mobile device 404 may include, without limitation, a processor 1802, storage 1804, an input/output (I/O) device interface 1806, a network interface 1808, an interconnect 1810, and a system memory 1812.

In general, processor 1802 may retrieve and execute programming instructions stored in system memory 1812. Processor 1802 may be any technically feasible form of processing device configured to process data and execute program code. Processor 1802 could be, for example, a central processing unit (CPU), a graphics processing unit (GPU), an application-specific integrated circuit (ASIC), a field-programmable gate array (FPGA), and so forth. Processor 1802 stores and retrieves application data residing in the system memory 1812. Processor 1802 is included to be representative of a single CPU, multiple CPUs, a single CPU having multiple processing cores, and the like. In operation, processor 1802 is the master processor of the mobile device 404, controlling and coordinating operations of other system components. System memory 1812 stores software application programs and data for use by processor 1802. Processor 1802 executes software application programs stored within system memory 1812 and optionally an operating system. In particular, processor 1802 executes software and then performs one or more of the functions and operations set forth in the present application.

The storage 1804 may be a disk drive storage device. Although shown as a single unit, the storage 1804 may be a combination of fixed and/or removable storage devices, such as fixed disc drives, floppy disc drives, tape drives, removable memory cards, or optical storage, network attached storage (NAS), or a storage area-network (SAN). Processor 1802 communicates with other computing devices and systems via network interface 1808, where network interface 1808 is configured to transmit and receive data via one or more communications networks 420.

The interconnect 1810 facilitates transmission, such as of programming instructions and application data, between the processor 1802, input/output (I/O) devices interface 1806, storage 1804, network interface 1808, and system memory 1812. The I/O devices interface 1806 is configured to receive input data from user I/O devices. These I/O devices include, without limitation, camera(s) 1820, location sensor(s) 1822, a display device 1824, and microphone(s) 1826. Display device 1824 generally represents any technically feasible means for generating an image for display. For example, the display device may be a liquid crystal display (LCD) display, organic light emitting diode (OLED) display, or DLP display. Camera 1820 acquires images via a lens and converts the images into digital form. The images acquired by the camera 1820 may be stored in storage 1804 and/or system memory 1812. An acquired image may be displayed on the display device 1824, either alone or in conjunction with one or more other acquired images, graphical overlays, and/or other data.

Location sensor 1822 enables mobile device 404 to determine the physical location and orientation of mobile device 404. Microphone 1826 acquires audio signals for storage and analysis. Additional examples of user I/O devices (not explicitly shown) may include one or more buttons, a keyboard, and a mouse or other pointing device. The I/O devices interface 1806 may also include an audio output unit configured to generate an electrical audio output signal, and the additional user I/O devices may further include a speaker configured to generate an acoustic output in response to the electrical audio output signal.

The system memory 1812 may include, without limitation, an augmented reality application 1814 and a database 1816. Processor 1802 executes the augmented reality application 1814, to perform one or more of the techniques disclosed herein and to store data in and retrieve data from database 1816.

In operation, extended reality application 1814 executing on mobile device 404 establishes bidirectional communications with data intake and query system 108 over a network 420. Extended reality application 1814 acquires descriptions of one or more virtual objects for display in an XR environment. Extended reality application 1814 may receive the virtual objects from data intake and query system 108 over network 420 in response to a search query. Alternatively or in addition, extended reality application 1814 may retrieve the virtual objects from memory, such as from database 1816. Extended reality application 1814 places the virtual objects in the XR environment. The XR environment may be a virtual, computer-generated environment, a physical real-world environment, or an environment that includes both virtual, computer-generated elements and physical real-world elements. Extended reality application 1814 performs various techniques by which one or more virtual objects may be manipulated within the XR environment. In a first technique, extended reality application 1814 facilitates the movement of a virtual object from a first location to a second location. In a second technique, extended reality application 1814 facilitates the rotation of a virtual object. In a third technique, extended reality application 1814 facilitates the scaling of a virtual object along one or more axes. Each of these techniques is described below in further detail.

In various embodiments, extended reality application 1814 may perform manipulations directed towards a virtual object within an XR environment, where the virtual objects may be an extended reality overlay of a real-world object. In such embodiments, the extended reality overlay of the real-world object may be a data representation of real-time data or near-real-time data. This real-time or near-real-time data may be generated by executing a query of machine data, at least part of which machine data may be related to the real-world object. The query of machine data may be directed towards a data intake and query system, such as data intake and query system 108.

In the first technique, extended reality application 1814 facilitates the movement of a virtual object from a first location to a second location. More specifically, extended reality application 1814 receives plane detection information to establish a location and orientation for each virtual object present in the XR environment. Further, extended reality application 1814 establishes a fixed point within the XR environment, referred to herein as the anchor point, where the location of each virtual object may be established relative to the anchor point. The anchor point may be any technically feasible location within the XR environment, including, without limitation, a fixed point on a floor or wall within the XR environment, or a fixed point on some other object, such as a server rack or piece of furniture, within the XR environment.

Then, extended reality application 1814 receives a selection of a virtual object in the XR environment. The selection of the virtual object may be detected via any technically feasible approach, including, without limitation, a touch input received via a touchscreen, a gesture received via a data glove, or an input received via a hardware controller device. In one example, extended reality application 1814 could receive a touch input indicating that a user has touched a touchscreen at a particular location associated with the virtual object. One such touch input is a "long-press gesture," where a user touches a touchscreen with a finger at a particular location and then continues to hold the finger at that location.

Extended reality application 1814 computes a relative location between a location associated with a camera view of mobile device 404 and the virtual object. The location associated with the camera view of the mobile device 404 may be established via any technically feasible approach. In one example, the location associated with the camera view could be a fixed position located on or near the camera 1820. In another example, the location associated with the camera view could be a fixed point located anywhere on or near the mobile device 404. In yet another example, the location associated with the camera view could be a fixed location within a viewport or within a viewing frustum associated with the camera 1820. In yet another example, the location associated with the camera view could be a fixed location within a viewport or within a viewing frustum associated with a virtual camera located within the XR environment.

Extended reality application 1814 attaches the virtual object to the location associated with the camera view. During the time that the virtual object remains selected, the virtual object maintains the same position and orientation relative to the location associated with the camera view. Extended reality application 1814 then tracks the location and orientation of the location associated with the camera view via any technically feasible approach, including, without limitation, accelerometer tracking, gyroscope tracking, and image analysis. Consequently, as the user moves and rotates mobile device 404 (e.g., by walking within the XR environment), the virtual object moves and rotates by a corresponding amount.

Once the virtual object is at the desired location within the XR environment, the user deselects the virtual object. For example, the user could withdraw the finger from the touchscreen. When extended reality application 1814 receives an indication that the virtual object is deselected, extended reality application 1814 detaches the virtual object from the location associated with the camera view. Extended reality application 1814 then fixes the location and orientation of the virtual object at the new location.

In the second technique, extended reality application 1814 facilitates the rotation of a virtual object. More specifically, extended reality application 1814 receives plane detection information to establish a location and orientation of each virtual object present in the XR environment. Extended reality application 1814 receives a selection of an axis of rotation. In some embodiments, extended reality application 1814 may receive a selection of one of three axes, an x-axis, a y-axis, or a z-axis. The x-axis may be the axis that is parallel to the width of display device 1824 of mobile device 404. Rotating a virtual object about the x-axis may alter the pitch of the virtual object, as displayed in display device 1824. Similarly, the y-axis may be the axis that is parallel to the height of display device 1824. Rotating a virtual object about the y-axis may alter the yaw of the virtual object, as displayed in display device 1824. The z-axis may be the axis that is orthogonal the surface of display device 1824. Rotating a virtual object about the z-axis may alter the roll of the virtual object, as displayed in display device 1824.

Then, extended reality application 1814 receives two location inputs. The location inputs of the virtual object may be detected via any technically feasible approach, including, without limitation, touch inputs received via a touchscreen, a gesture received via a data glove, or an input received via a hardware controller device. In one example, extended reality application 1814 could receive touch inputs indicating that a user has touched a touchscreen at two particular locations. Extended reality application 1814 selects a virtual object in the XR environment based on the two location inputs. For example, extended reality application 1814 could select the virtual object that is at or nearest to the midpoint between the two location inputs.

Extended reality application 1814 receives two new location inputs. Extended reality application 1814 compares the two new location inputs relative to the two original location inputs. Based on this comparison, extended reality application 1814 computes a rotation angle. Extended reality application 1814 rotates the virtual object about the selected axis by the rotation angle. If the rotation angle indicates that the location inputs are moving in a clockwise direction, then extended reality application 1814 rotates the virtual object about the selected axis in a clockwise direction. Likewise, if the rotation angle indicates that the location inputs are moving in a counterclockwise direction, then extended reality application 1814 rotates the virtual object about the selected axis in a counterclockwise direction.

Once the virtual object is at the desired rotation within the XR environment, the user deselects the virtual object by removing the two location inputs. For example, the user could withdraw the two fingers from the touchscreen. When extended reality application 1814 receives an indication that the virtual object is deselected, extended reality application 1814 fixes the orientation of the virtual object at the new rotation. This process may be performed in turn for all three axes to fix the virtual object to any desired orientation.

In the third technique, extended reality application 1814 facilitates the scaling of a virtual object. More specifically, extended reality application 1814 receives plane detection information to establish a location and orientation for each virtual object present in the XR environment. Then, extended reality application 1814 receives two location inputs. The location inputs of the virtual object may be detected via any technically feasible approach, including, without limitation, touch inputs received via a touchscreen, a gesture received via a data glove, or an input received via a hardware controller device. In one example, extended reality application 1814 could receive touch inputs indicating that a user has touched a touchscreen at two particular locations. Extended reality application 1814 selects a virtual object in the XR environment based on the two location inputs. For example, extended reality application 1814 could select the virtual object that is at or nearest to the midpoint between the two location inputs.

Extended reality application 1814 receives orientation information to determine a rotation angle of the camera 1820. Extended reality application 1814 tracks the rotation of the camera 1820 via any technically feasible approach, including, without limitation, accelerometer tracking, gyroscope tracking, and image analysis. Extended reality application 1814 determines one or more scaling axes. More specifically, extended reality application 1814 computes a pinch angle based on the two location inputs, where the pinch angle is the angle of an imaginary line that passes through the center of the two location inputs. Extended reality application 1814 then computes a difference angle by subtracting the rotation angle of the camera 1820 from the pinch angle.

Extended reality application 1814 then compares the difference angle against various angular ranges. If the difference angle is within an angular range that defines a vertical direction, then extended reality application 1814 sets the scaling axis as the y-axis. Likewise, if the difference angle is within an angular range that defines a horizontal direction, then extended reality application 1814 sets the scaling axis as the x-axis. If the difference angle is within an angular range that defines a diagonal direction, then extended reality application 1814 sets multiple axes as the scaling axis as the y-axes. In one example, extended reality application 1814 could set the x-axis and the y-axis as the scaling axes to simultaneously scale in both the horizontal and vertical dimensions. Similarly, extended reality application 1814 could set the x-axis, the y-axis, and the z-axis as the scaling axes to simultaneously scale in the horizontal, vertical, and depth dimensions.

Extended reality application 1814 receives two new location inputs. Extended reality application 1814 compares the two new location inputs relative to the two original location inputs. Based on this comparison, extended reality application 1814 computes a scaling ratio. Extended reality application 1814 scales the virtual object about the scaling axis or axes by the scaling ratio. If the scaling ratio indicates that the location inputs are moving closer together, as in a pinch motion, then extended reality application 1814 scales the virtual object to a smaller size based on the pinch ratio. Likewise, if the scaling ratio indicates that the location inputs are moving farther apart, then extended reality application 1814 scales the virtual object to a larger size based on the pinch ratio.

Once the virtual object is at the desired scale within the XR environment, the user deselects the virtual object by removing the two location inputs. For example, the user could withdraw the two fingers from the touchscreen. When extended reality application 1814 receives an indication that the virtual object is deselected, extended reality application 1814 fixes the size of the virtual object at the new size. This process may be performed in turn for various scaling axes to fix the virtual object to any desired size.

Via these techniques, virtual objects within an XR environment may be located, rotated, and/or scaled with greater precision and accuracy relative to prior approaches. These techniques are now further described in conjunction with various figures to further illustrate the manner by which these techniques are performed.

Figure 19B:
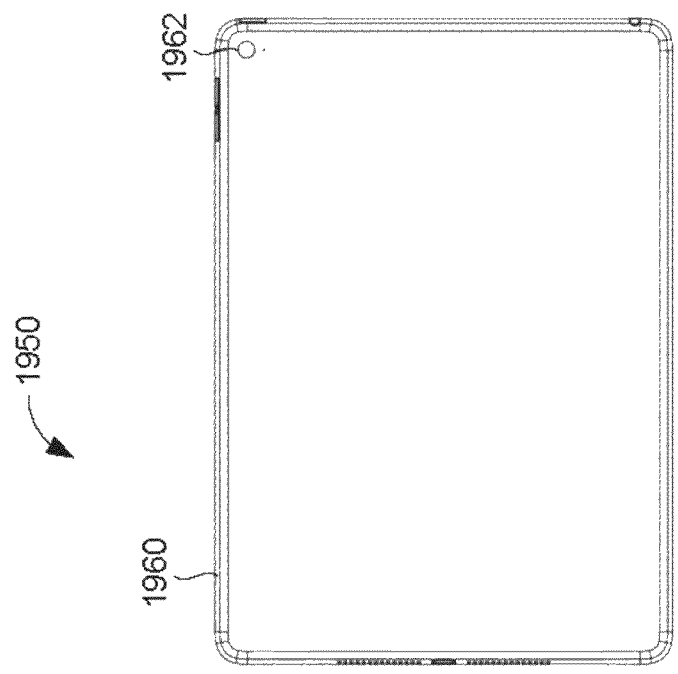
FIGS. 19A-19B illustrates an example mobile device that implements the techniques described in conjunction with the system of FIG. 18, in accordance with example embodiments.
Figure 19A:
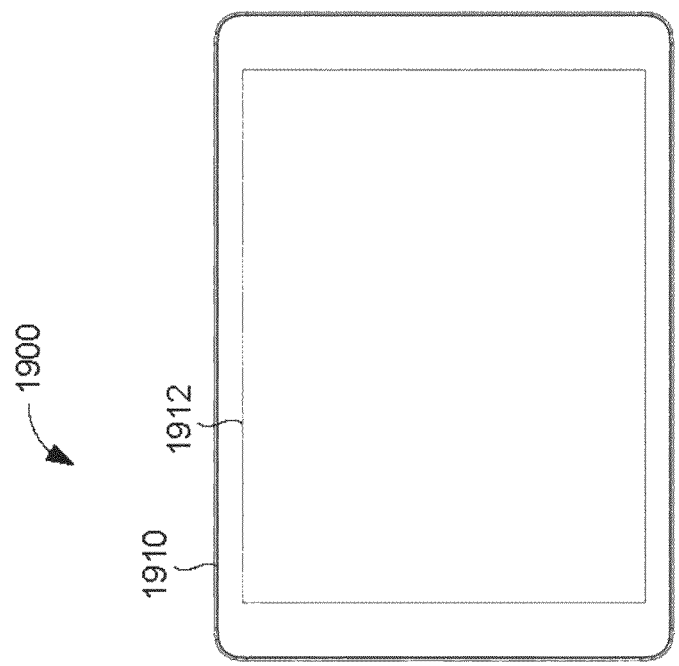

FIGS. 19A-19B illustrates an example mobile device that implements the techniques described in conjunction with the system of FIG. 18, in accordance with example embodiments. As shown in FIG. 19A, the front 1900 of the mobile device includes a front bezel 1910. Further, the front 1900 of the mobile device includes display screen 1912 within the inner boundary of the front bezel 1910. As shown in FIG. 19B, the back 1950 of the mobile device includes a back bezel 1960. Further, the back 1950 of the mobile device includes camera 1962 within the inner boundary of the back bezel 1960. In operation, the camera 1962 captures an image of the real world. A processor associated with the mobile device overlays one or more virtual objects onto the captured image. The processor displays the captured image along with the overlaid virtual objects on the display screen 1912 of the mobile device.

Figure 20A:
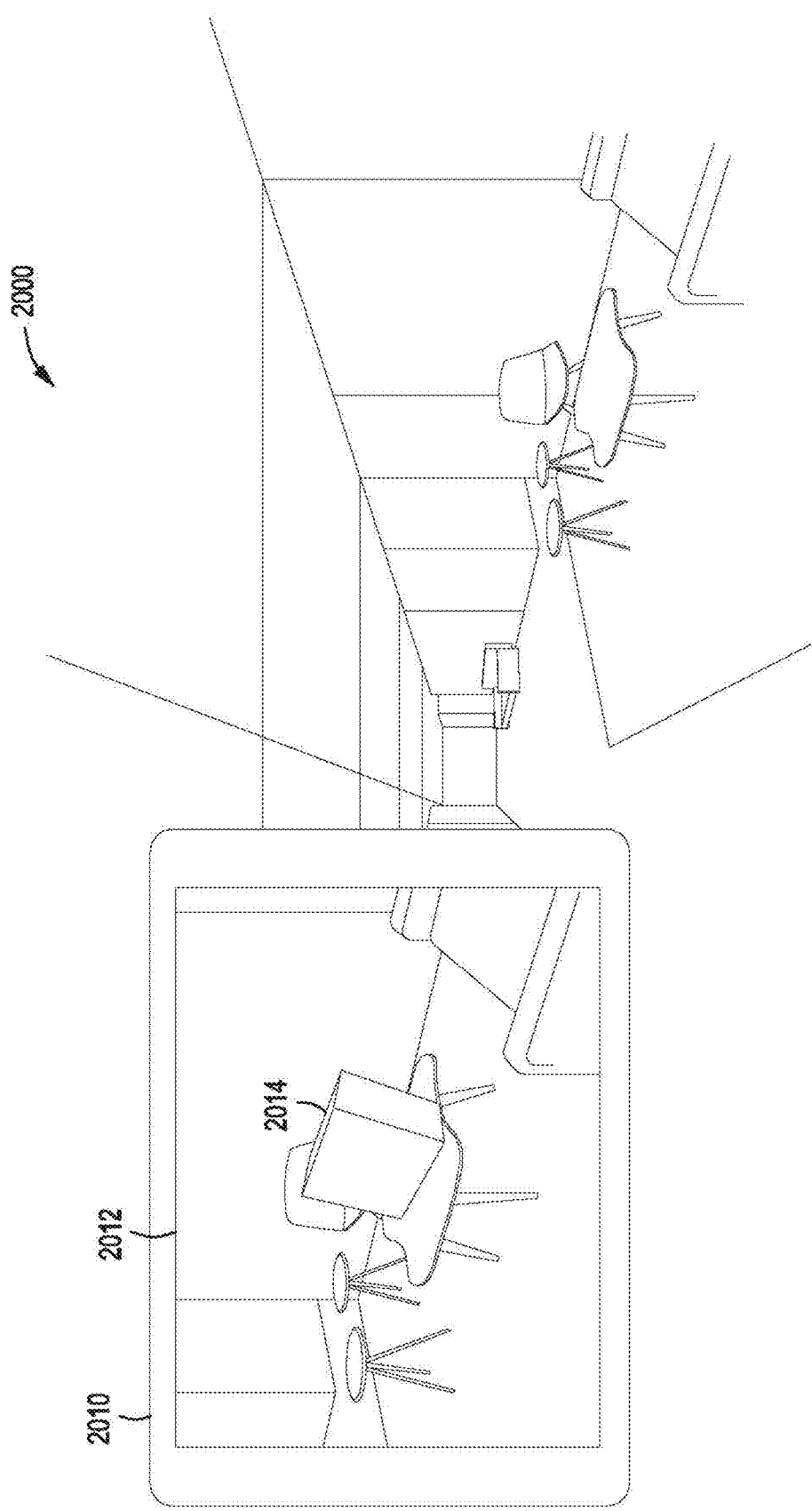
FIGS. 20A-20D illustrate how a virtual object may be moved from one location to another location within an XR environment generated by the system of FIG. 18, in accordance with example embodiments.
Figure 20B:
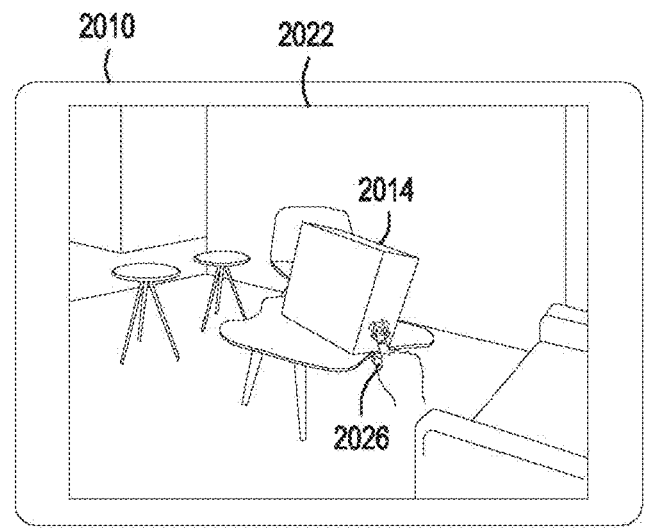

FIGS. 20A-20D illustrate how a virtual object may be moved from one location to another location within an XR environment generated by the system of FIG. 18, in accordance with example embodiments. As shown in FIG. 20A, a mobile device 2010 displays a camera view 2012 of an XR environment 2000 on a display device of mobile device 2010. The camera view 2012 includes virtual object 2014. As shown in FIG. 20B, a user selects virtual object 2014 via a touch gesture 2026. The camera view 2022 illustrates that virtual object 2014 is now selected.

Figure 20C:
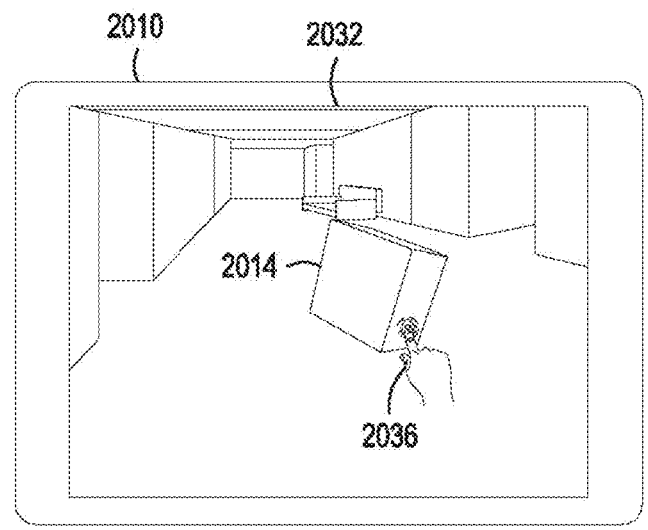
Figure 20D:
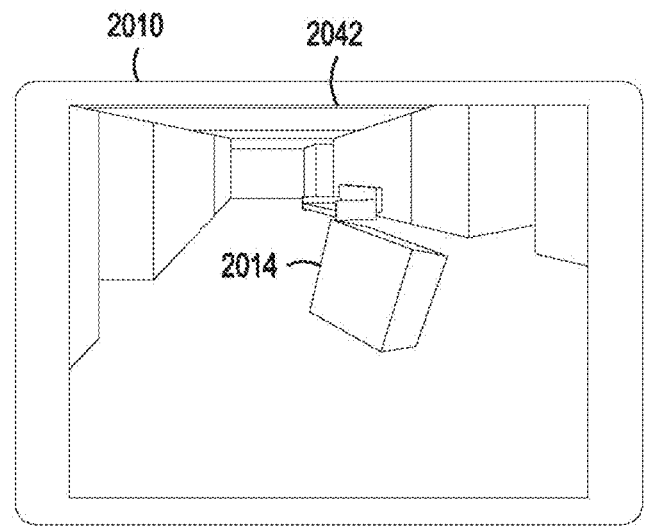

As shown in FIG. 20C, the user moves within the XR environment 2000 while maintaining touch gesture 2036, thereby changing the camera view 2032 to show that virtual object 2014 is moving within the XR environment 2000 as the orientation and location of the mobile device 2032 is changing. As shown in FIG. 20D, the user has withdrawn the touch gesture, thereby fixing the virtual object 2014 at the new location in the XR environment 2000. The new location of the virtual object 2014 is shown in camera view 2042.

By fixing the virtual object 2014 to a specific point relative to the camera view displayed in the mobile device 2010, the virtual object 2014 moves within the XR environment as the position and orientation of the mobile device 2010 changes. In this manner, a user is able to move the virtual object 2014 more precisely because the user is able to leverage fine motor and muscle control of the user's arms, legs, and body as the user moves within the XR environment. This technique provides a technical improvement over prior techniques that rely on a user's finger moving on the surface of a touchscreen to move a virtual object 2014.

As described herein, the motion of a finger on a touchscreen is generally imprecise. For example, while moving a virtual object on a touchscreen device, a user's finger(s)

typically cover multiple touch input locations on the touchscreen, making the selection of a specific location on the touchscreen difficult. In addition, due to friction between the user's finger(s) and the touchscreen, movements of the finger(s) on the touchscreen may be jerky and imprecise, preventing the user from moving virtual objects to specific locations on the touchscreen. Further, the spatial resolution of many touchscreen devices is low, relative to the physical real-world environment. These drawbacks lead to imprecision when manipulating virtual objects in an XR environment. As a result, user interactions within the XR environment may cause a virtual object to be moved to an undesired location. By contrast, the techniques described herein overcome these drawbacks and provide a technological improvement by tracking the motion of the mobile device 2010 and by moving a virtual object 2014 by a corresponding amount. As a result, the virtual object 2014 may be moved and otherwise manipulated with greater precision relative to prior techniques.

Figure 21B:
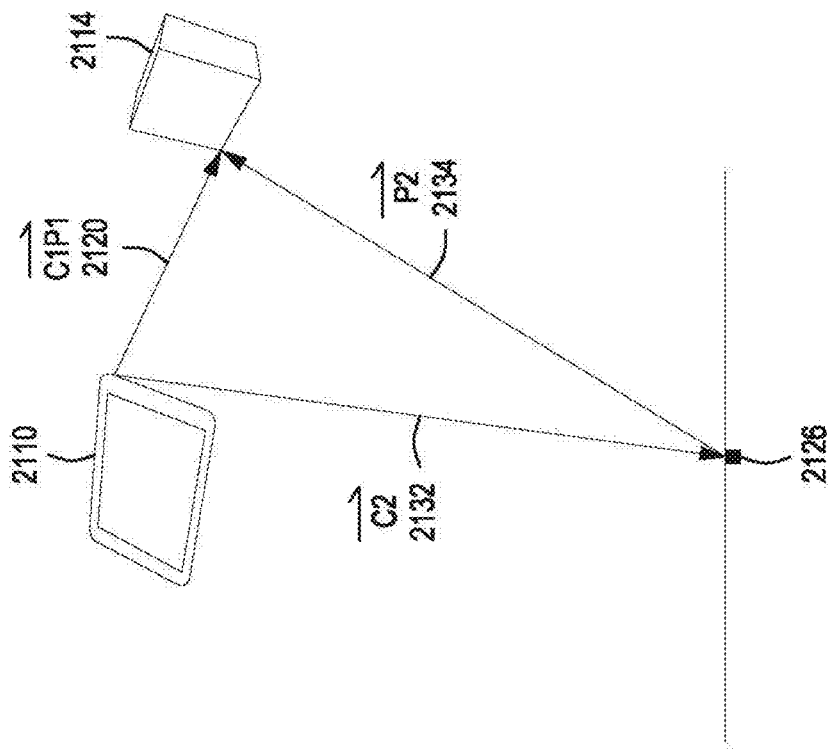
FIGS. 21A-21B illustrate how a location of a virtual object within an XR environment may be determined by the system of FIG. 18, in accordance with example embodiments.
Figure 21A:
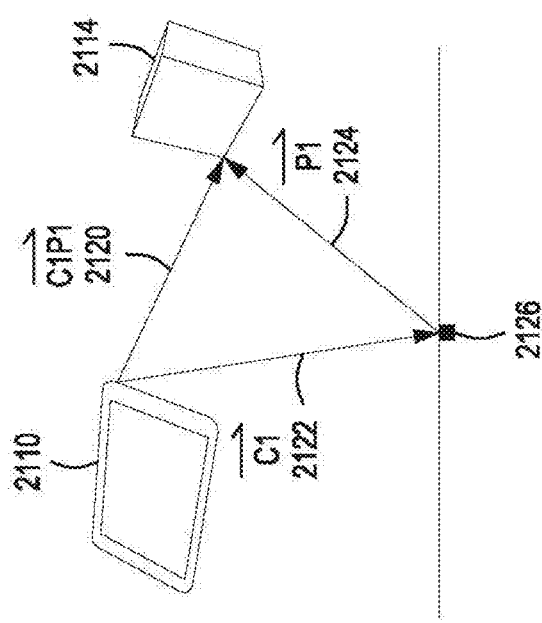

FIGS. 21A-21B illustrate how a location of a virtual object within an XR environment may be determined by the system of FIG. 18, in accordance with example embodiments. As shown in FIG. 21A, a mobile device 2210 and a virtual object 2114 are positioned relative to an anchor point 2126. The anchor point 2126 may be any technically feasible location within the XR environment, including, without limitation, a fixed point on a floor or wall within the XR environment, or a fixed point on some other object, such as a server rack or piece of furniture, within the XR environment.

In operation, extended reality application 1814 computes a vector $\vec{C1}$ 2122 that defines the location of a camera associated with the mobile device 2210 relative to the anchor point 2126. Similarly, extended reality application 1814 computes a vector $\vec{P1}$ 2124 that defines the location of the virtual object 2114 relative to the anchor point 2126. When virtual object 2114 is selected as part of a move operation, extended reality application 1814 combines vector $\vec{C1}$ 2122 and vector $\vec{P1}$ 2124 to generate vector $\vec{C1P1}$ 2120. As a result, vector $\vec{C1P1}$ 2120 defines the position of the virtual object 2114 relative to the camera associated with the mobile device 2210. Extended reality application 1814 detaches the virtual object 2114 from the anchor point 2126 via vector $\vec{P1}$ 2124 and attaches the virtual object 2114 to the camera via vector $\vec{C1P1}$ 2120. As the user changes the location of the mobile device 2110, thereby changing the location of the camera, vector $\vec{C1P1}$ 2120 remains fixed. Consequently, the virtual object 2114 moves with the camera and maintains the same position and orientation relative to the camera via vector $\vec{C1P1}$ 2120.

As shown in FIG. 21B, the virtual object 2114 has been moved to a new location. The virtual object 2114 is then deselected. Extended reality application 1814 computes the new location of the camera of the mobile device 2210 relative to the anchor point 2126, as defined by vector $\vec{C2}$ 2132. Extended reality application 1814 combines vector $\vec{C2}$ 2132 and vector $\vec{C1P1}$ 2120 to generate vector $\vec{P2}$ 2134, where vector $\vec{P2}$ 2134 is the new location of the virtual object 2114 relative to the anchor point 2126. Extended reality application 1814 attaches the virtual object 2114 to the anchor point 2126 via vector $\vec{P2}$ 2134. Extended reality application 1814 then detaches the virtual object 2114 from the camera of the mobile device 2210 by deleting vector $\vec{C1P1}$ 2120.

Figure 22A:
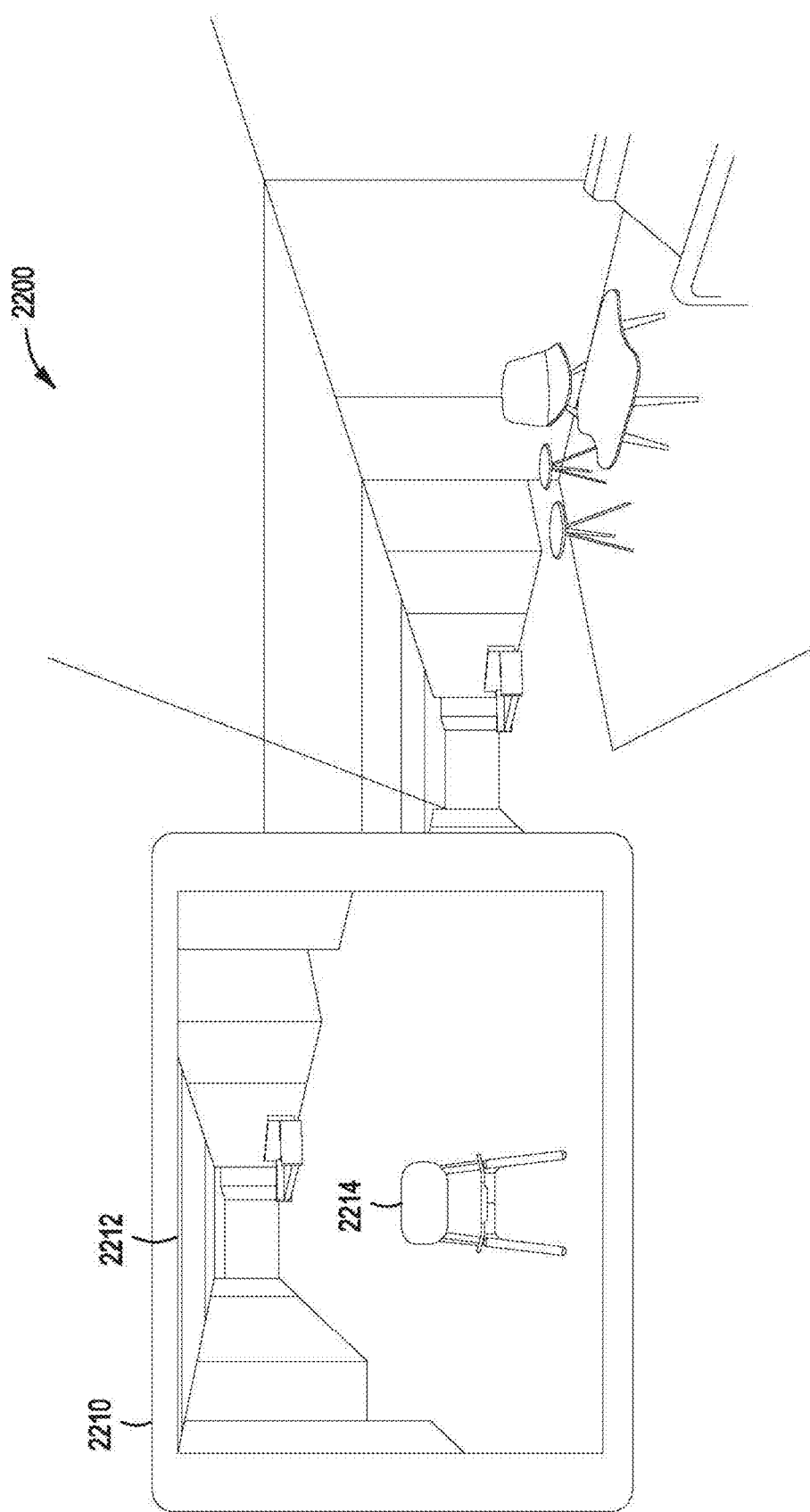
FIGS. 22A-22F illustrate how a virtual object may be rotated within an XR environment generated by the system of FIG. 18, in accordance with example embodiments.
Figure 22B:
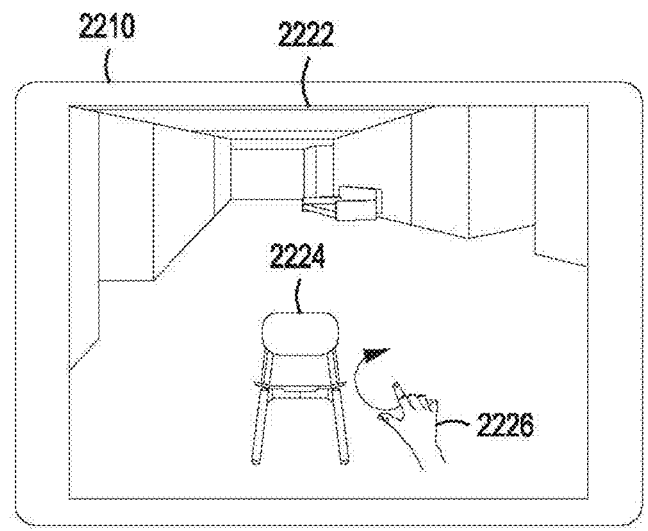
Figure 22C:
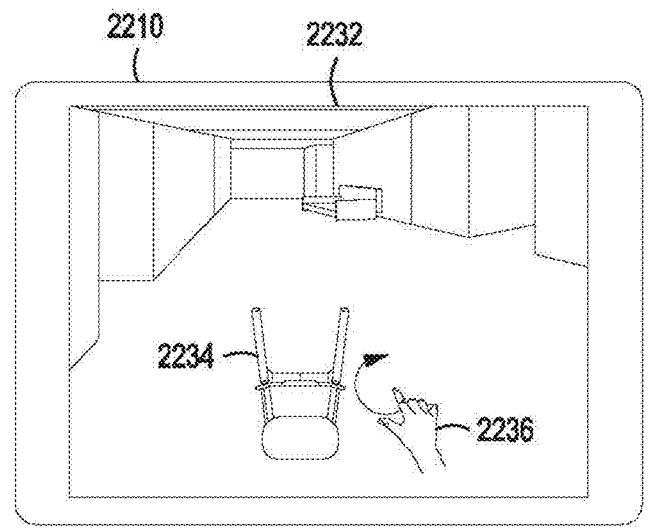

FIGS. 22A-22F illustrate how a virtual object may be rotated within an XR environment generated by the system of FIG. 18, in accordance with example embodiments. As shown in FIG. 22A, a mobile device 2210 displays a camera view 2212 of an XR environment 2200 on a display device of mobile device 2210. The camera view 2212 includes virtual object 2214. As shown in FIG. 22B, a user provides two location inputs via a touch gesture 2226. The virtual object 2214 is selected based on the two location inputs. The camera view 2222 indicates that the virtual object 2214 is now selected. As shown in FIG. 22C, the virtual object 2234 is rotated about the z-axis. After selecting the z-axis as the axis of rotation, the user rotates the two location inputs of touch gesture 2236, thereby rotating the virtual object 2234 about the z-axis. The new orientation of the virtual object 2234 is shown in camera view 2232.

Figure 22D:
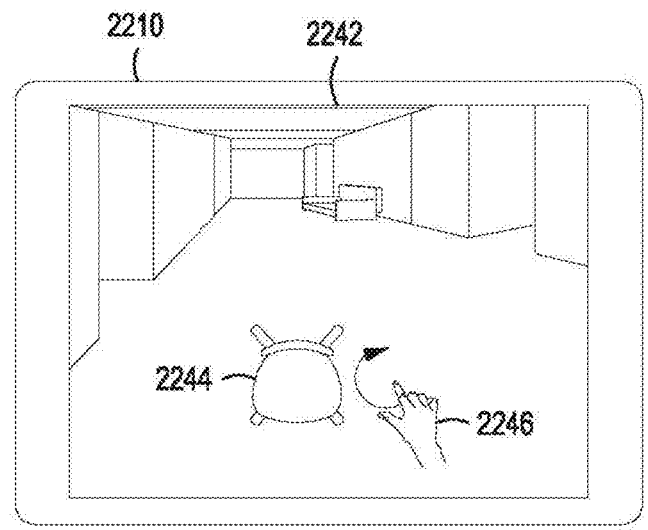
Figure 22E:
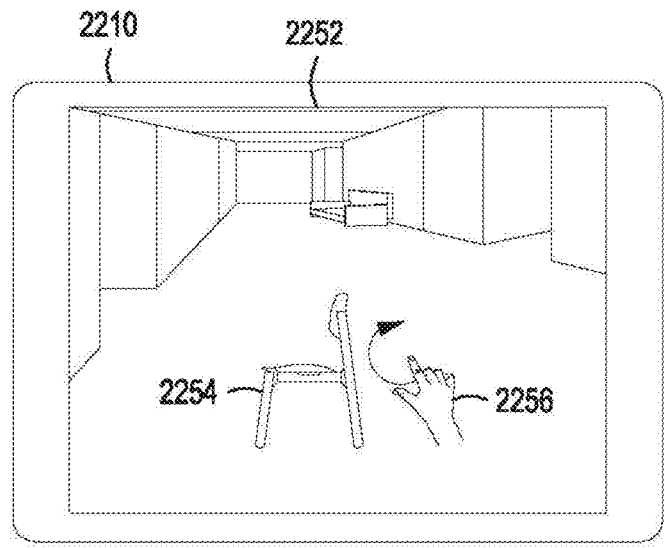
Figure 22F:
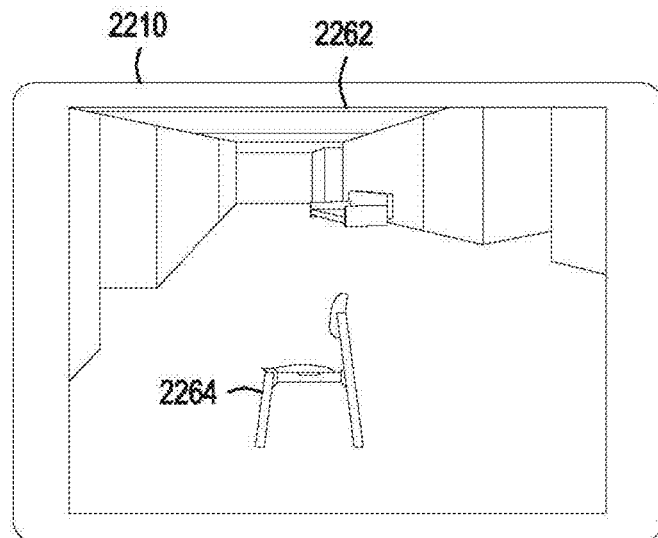

As shown in FIG. 22D, the virtual object 2244 is rotated about the x-axis. After selecting the x-axis as the axis of rotation, the user rotates the two location inputs of touch gesture 2246, thereby rotating the virtual object 2244 about the x-axis. The new orientation of the virtual object 2244 is shown in camera view 2242. As shown in FIG. 22E, the virtual object 2254 is rotated about the y-axis. After selecting the y-axis as the axis of rotation, the user rotates the two location inputs of touch gesture 2256, thereby rotating the virtual object 2254 about the y-axis. The new orientation of the virtual object 2254 is shown in camera view 2252. As shown in FIG. 22F, the user has withdrawn the touch gesture, thereby fixing the virtual object 2264 at the new orientation in the XR environment 2200. The new orientation of the virtual object 2264 is shown in camera view 2262.

Via the disclosed techniques, virtual objects are manipulated with greater precision relative to prior techniques. For example, the disclosed techniques lead to improved precision when rotating virtual objects in an XR environment. As a result, the quality of user interactions with the XR environment is improved relative to prior approaches.

Figure 23A:
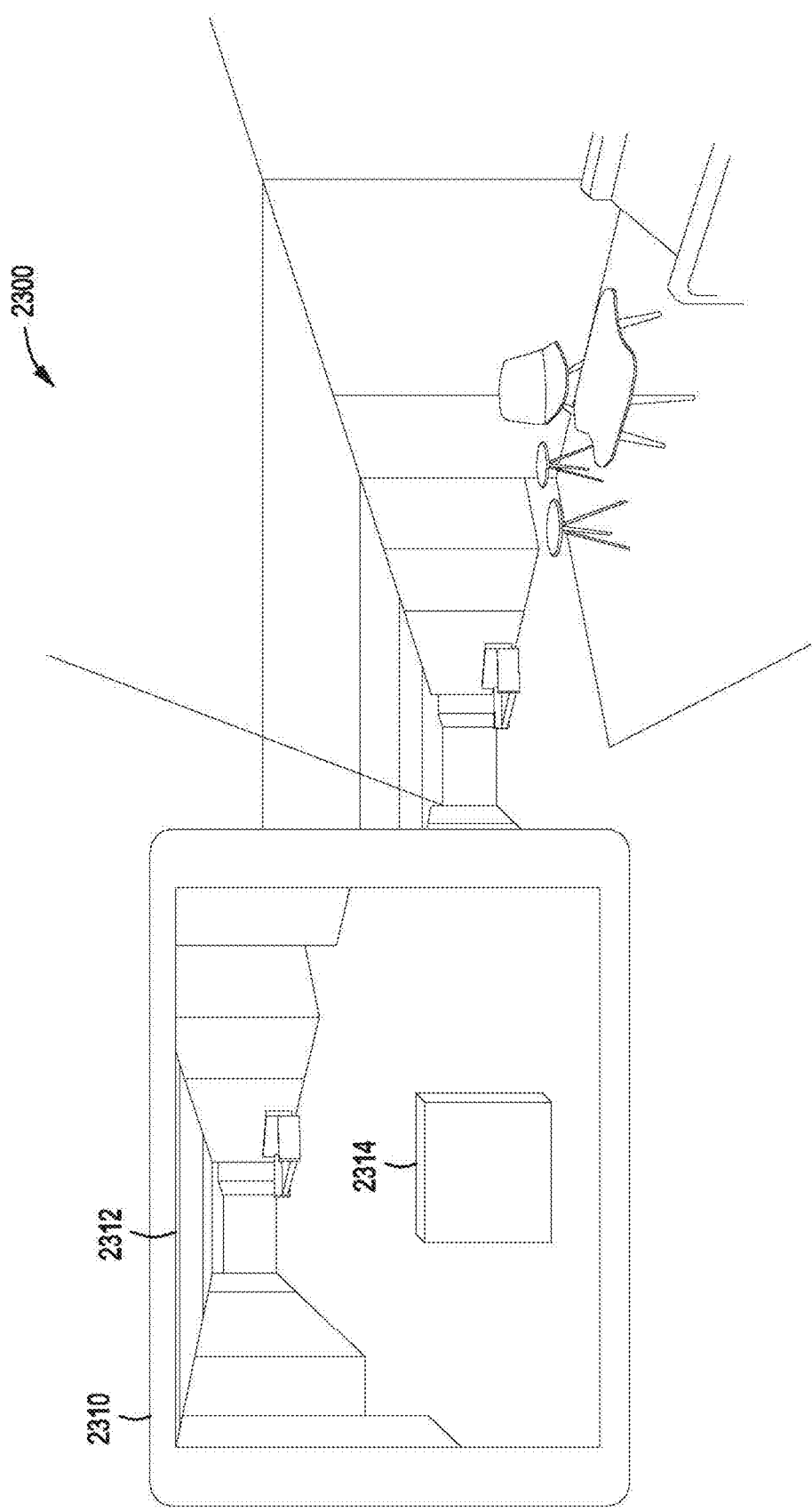
FIGS. 23A-23F illustrate how a virtual object may be scaled within an XR environment generated by the system of FIG. 18, in accordance with example embodiments.
Figure 23B:
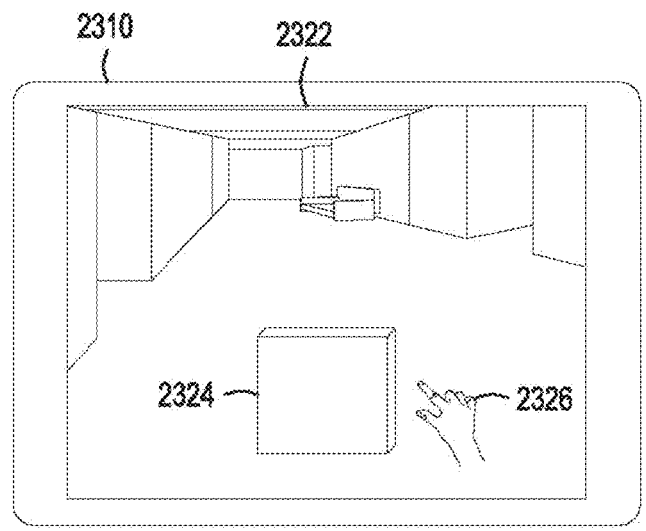
Figure 23C:
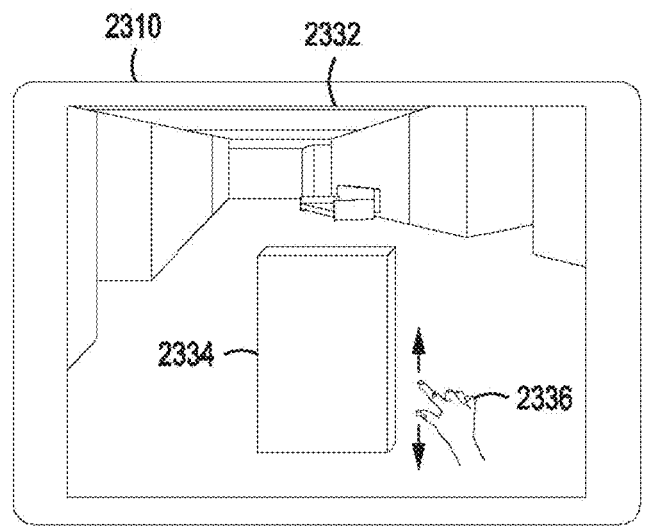

FIGS. 23A-23F illustrate how a virtual object may be scaled within an XR environment generated by the system of FIG. 18, in accordance with example embodiments. As shown in FIG. 23A, a mobile device 2310 displays a camera view 2312 of an XR environment 2300 on a display device of mobile device 2310. The camera view 2312 includes virtual object 2314. As shown in FIG. 23B, a user provides two location inputs via a touch gesture 2326. The virtual object 2314 is selected based on the two location inputs. The camera view 2322 indicates that the virtual object 2314 is now selected. As shown in FIG. 23C, the virtual object 2334 is scaled along the y-axis. The user moves the two location inputs of touch gesture 2336 farther apart, thereby increasing the size of the virtual object 2334 along the y-axis. The new size of the virtual object 2334 is shown in camera view 2332.

Figure 23D:
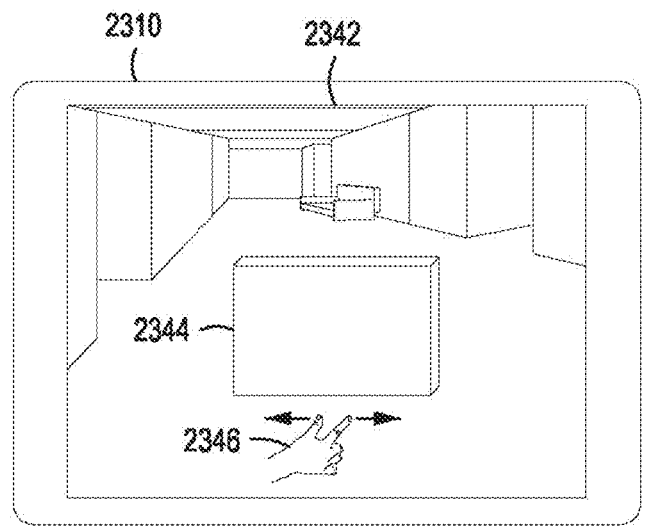
Figure 23E:
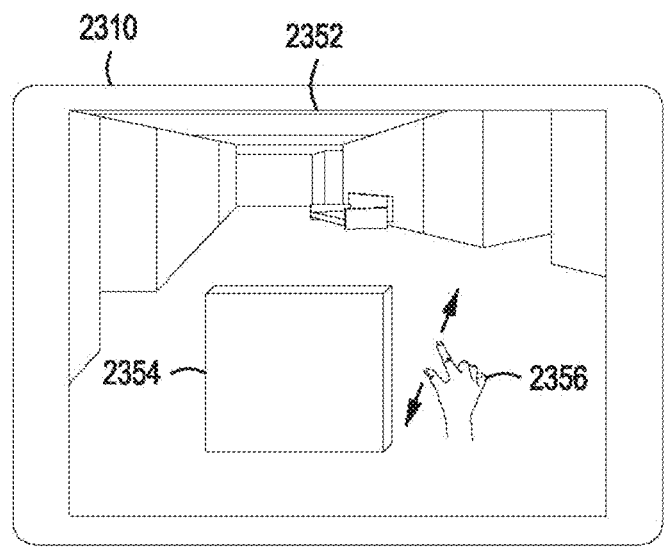
Figure 23F:
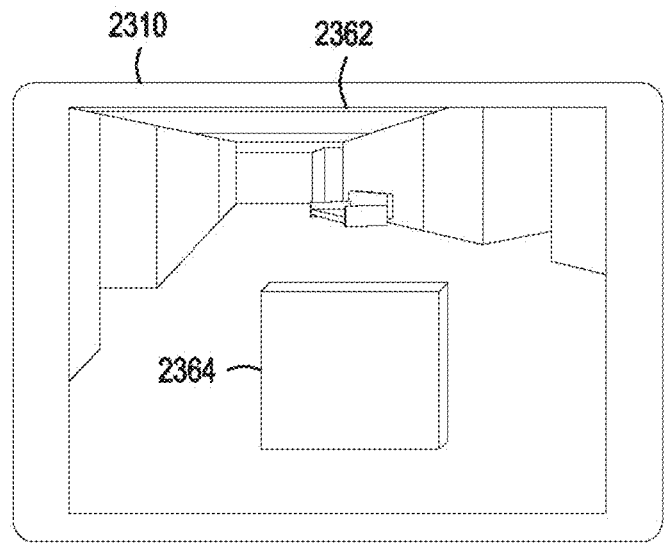

As shown in FIG. 23D, the virtual object 2344 is scaled along the x-axis. The user moves the two location inputs of touch gesture 2336 farther apart, thereby increasing the size of the virtual object 2334 along the x-axis. The new size of the virtual object 2344 is shown in camera view 2342. As shown in FIG. 23E, the virtual object 2354 is scaled along both the x-axis and the y-axis. In some embodiments, the virtual object 2354 is also scaled along the z-axis. The user moves the two location inputs of touch gesture 2336 farther apart, thereby increasing the size of the virtual object 2354 along the x-axis and the y-axis. The new size of the virtual object 2354 is shown in camera view 2352. As shown in FIG. 23F, the user has withdrawn the touch gesture, thereby fixing the virtual object 2364 at the new size in the XR environment 2300. The new size of the virtual object 2364 is shown in camera view 2362.

Via the disclosed techniques, virtual objects are manipulated with greater precision relative to prior techniques. For example, the disclosed techniques lead to improved precision when scaling virtual objects in an XR environment. As a result, the quality of user interactions with the XR environment is improved relative to prior approaches.

Figure 24C:
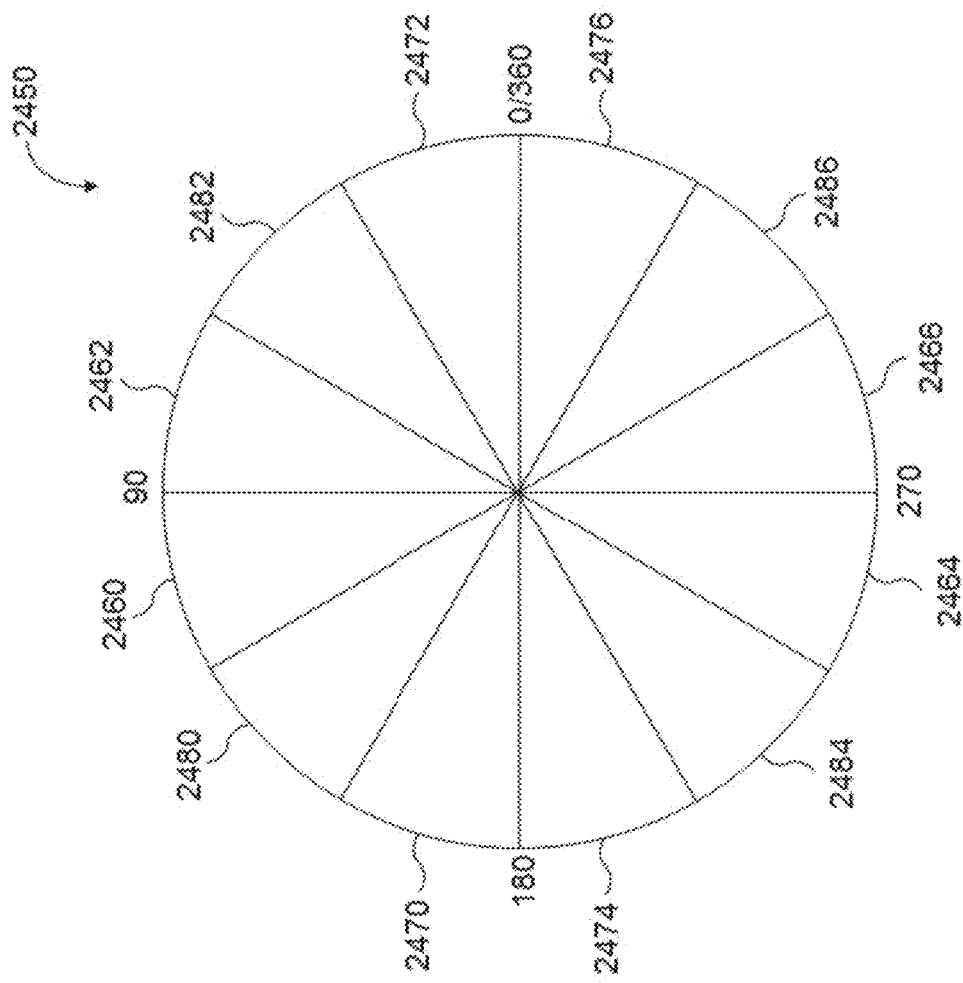
FIGS. 24A-24C illustrate how a scaling axis associated with a virtual object within an XR environment may be determined by the system of FIG. 18, in accordance with example embodiments.
Figure 24A:
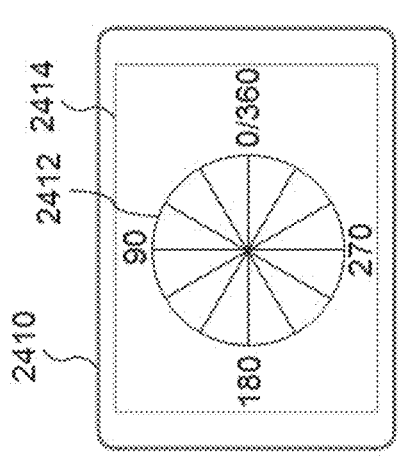
Figure 24B:
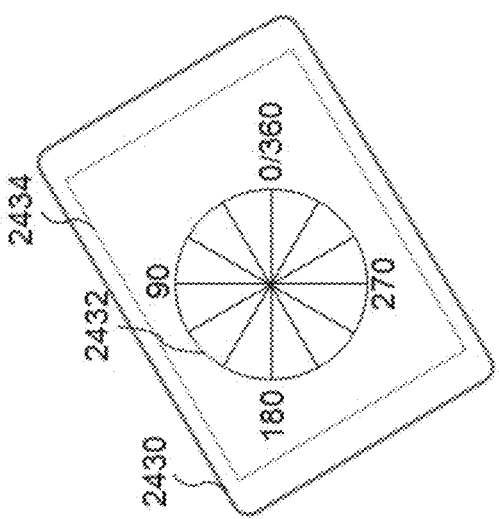

FIGS. 24A-24C illustrate how a scaling axis associated with a virtual object within an XR environment may be determined by the system of FIG. 18, in accordance with example embodiments. As shown in FIG. 24A, a display device 2414 of a mobile device 2410 is divided into a set of angular ranges 2412. Typically, the set of angular ranges 2412 is not displayed on the display device 2414. Rather, the set of angular ranges 2412 is illustrated to show how a scaling axis is selected based on location inputs. As shown, the set of angular ranges 2412 is oriented such that the 0/360 degrees point is on the right with respect to the XR environment. Similarly, the 90, 180, and 270 degrees points of the set of angular ranges 2412 are on the top, left, and bottom with respect to the XR environment, respectively.

As shown in FIG. 24B, the set of angular ranges 2432 remains at the same orientation relative to the XR environment. Consequently, as the mobile device 2430 is rotated, along with the display device 2432, the set of angular ranges 2432 is still oriented such that the 0/360 degrees point is on the right with respect to the XR environment. Similarly, the 90, 180, and 270 degrees points of the set of angular ranges 2412 are still on the top, left, and bottom with respect to the XR environment, respectively. In this manner, the scaling axis is based on the orientation of virtual objects with respect to the XR environment rather than the rotation angle of the mobile device 2410 and 2430.

As shown in FIG. 24C, the set of angular ranges 2450 may be divided into twelve angular ranges 2460, 2462, 2466, 2468, 2470, 2472, 2476, 2478, 2480, 2482, 2486, and 2488. During a scaling operation, extended reality application 1814 receives two location inputs. Extended reality application 1814 locates the center of the set of angular ranges 2450 at the midpoint between the two location inputs. Extended reality application 1814 then determines the angular ranges that correspond to the two location inputs. Based on this determination, extended reality application 1814 selects one or more scaling axes.

In a first example, one of the two location inputs could be located anywhere within angular ranges 2460 or 2462 and the other location input could be located anywhere within angular ranges 2464 or 2466. In this example, extended reality application 1814 would determine that the two location inputs are more or less vertically-oriented. As a result, extended reality application 1814 would select the vertical axis, or y-axis, as the scaling axis. The virtual object would therefore be scaled in the vertical, or y-axis, dimension. The virtual object would not be scaled in either the horizontal, or x-axis, dimension or the depth, or z-axis, dimension.

In a second example, one of the two location inputs could be located anywhere within angular ranges 2470 or 2474 and the other location input could be located anywhere within angular ranges 2472 or 2476. In this example, extended reality application 1814 would determine that the two location inputs are more or less horizontally-oriented. As a result, extended reality application 1814 would select the horizontal axis, or x-axis, as the scaling axis. The virtual object would therefore be scaled in the horizontal, or x-axis, dimension. The virtual object would not be scaled in either the vertical, or y-axis, dimension or the depth, or z-axis, dimension.

In a third example, one of the two location inputs could be located within angular range 2480 and the other location input could be located within angular range 2486. Similarly, one of the two location inputs could be located within angular range 2482 and the other location input could be located within angular range 2484. In this example, extended reality application 1814 would determine that the two location inputs are more or less diagonally-oriented. As a result, extended reality application 1814 would select multiple axes as the scaling axes. The virtual object could therefore be scaled in the horizontal, or x-axis, dimension and in the vertical, or y-axis, dimension. Alternatively, the virtual object could be scaled in the horizontal, or x-axis, dimension, in the vertical, or y-axis, dimension, and in the depth, or z-axis, dimension.

The 360 degrees encompassed by the set of angular ranges 2450 may be distributed to the twelve angular ranges 2460, 2462, 2466, 2468, 2470, 2472, 2476, 2478, 2480, 2482, 2486, and 2488 in any technically feasible manner. In one example, each of the twelve angular ranges 2460, 2462, 2466, 2468, 2470, 2472, 2476, 2478, 2480, 2482, 2486, and 2488 could be relatively equal in range. In this example, each angular range 2460, 2462, 2466, 2468, 2470, 2472, 2476, 2478, 2480, 2482, 2486, and 2488 would encompass 360/12 or 30 degrees. In another example, the twelve angular ranges 2460, 2462, 2466, 2468, 2470, 2472, 2476, 2478, 2480, 2482, 2486, and 2488 are could have ranges of different sizes, distributed in any technically feasible manner. Therefore, angular ranges 2460, 2462, 2466, 2468, 2470, 2472, 2476, and 2478 could each have a range of 15 degrees, while angular ranges 2480, 2482, 2486, and 2488 could each have a range of 60 degrees.

Figure 25:
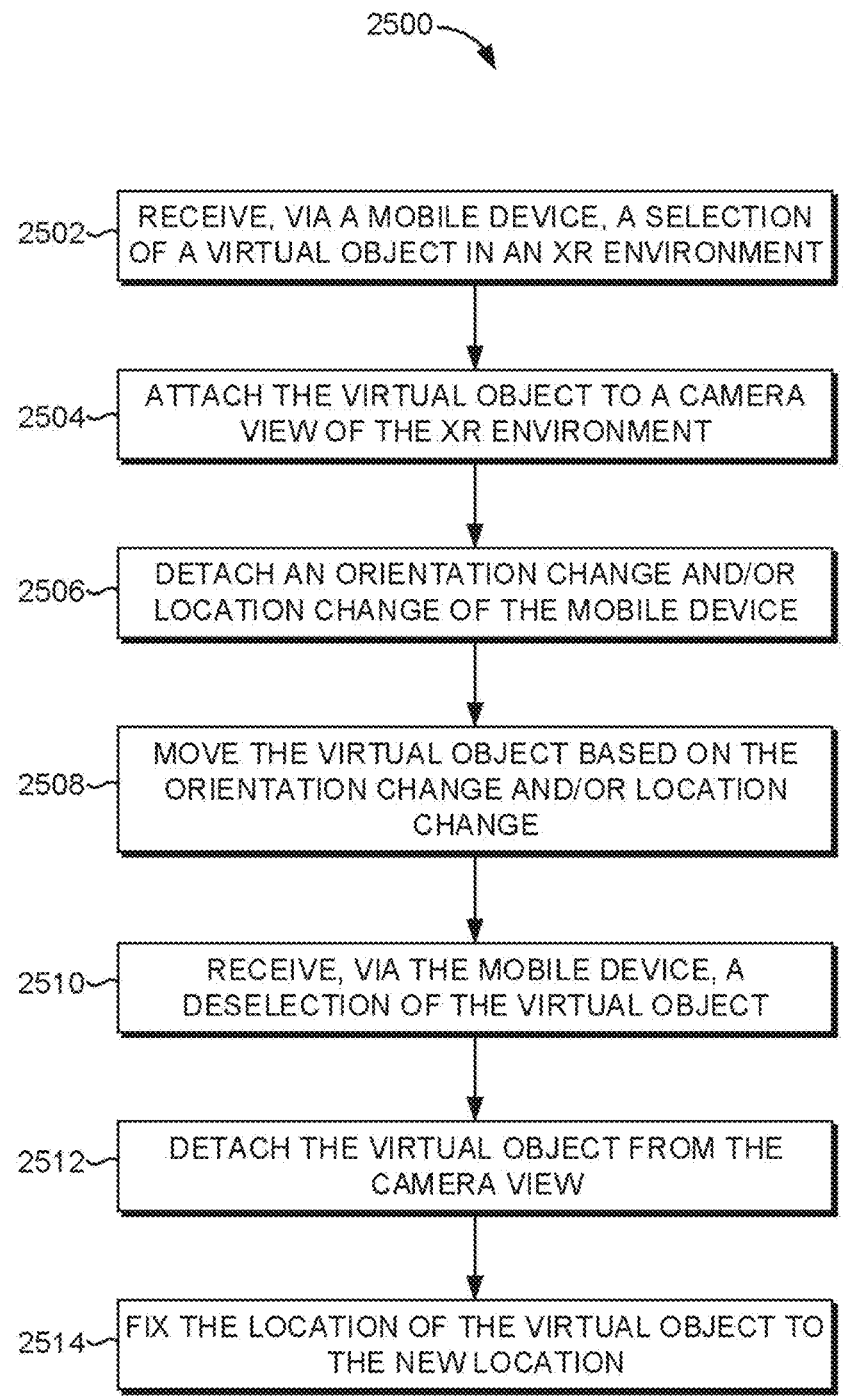
FIG. 25 is a flow diagram of method steps for moving a virtual object within an XR environment, in accordance with example embodiments.

FIG. 25 is a flow diagram of method steps for moving a virtual object within an XR environment, in accordance with example embodiments. Although the method steps are described in conjunction with the systems of FIGS. 1-24C, persons of ordinary skill in the art will understand that any system configured to perform the method steps, in any order, is within the scope of the present invention.

As shown, a method 2500 begins at block 2502, where an extended reality application 1814 executing on a mobile device 404 receives a selection of a virtual object in the XR environment. The selection of the virtual object may be detected via any technically feasible approach, including, without limitation, a touch input received via a touchscreen, a gesture received via a data glove, or an input received via a hardware controller device. In one example, extended reality application 1814 could receive a touch input indicating that a user has touched a touchscreen at a particular location associated with the virtual object. One such touch input is a "long-press gesture" where a user touches a touchscreen with a finger at a particular location and then continues to hold the finger at that location.

At block 2504, extended reality application 1814 attaches the virtual object to a location associated with a camera view of the mobile device 404. The location associated with the camera view of the mobile device 404 may be established via any technically feasible approach. In one example, the location associated with the camera view could be a fixed position located on or near the camera 1820. In another example, the location associated with the camera view could be a fixed point located anywhere on or near the mobile device 404. In yet another example, the location associated with the camera view could be a fixed location within a viewport or within a viewing frustum associated with the camera 1820. In yet another example, the location associated with the camera view could be a fixed location within a viewport or within a viewing frustum associated with a virtual camera located within the XR environment.

Extended reality application 1814 computes a relative location between the location associated with the camera view and the virtual object. During the time that the virtual object remains selected, the virtual object maintains the same position and orientation relative to the location associated with the camera view. At block 2506, extended reality application 1814 detects one or more of an orientation change and a location change of the camera 1820 of the mobile device 404. Extended reality application 1814 tracks the location and orientation of the camera 1820 via any technically feasible approach, including, without limitation, accelerometer tracking, gyroscope tracking, and image analysis. At block 2508, extended reality application 1814 moves the virtual object based on the orientation change and location change of the camera 1820. As the user moves and rotates mobile device 404 and walks within the XR environment, the virtual object moves and rotates by a corresponding amount. In particular, the virtual object remains at a fixed position and orientation relative to the location associated with the camera view. At block 2510, once the virtual object is at the desired location within the XR environment, extended reality application 1814 receives an indication that the virtual object is deselected. For example, the user could withdraw the finger from the touchscreen. At block 2512, extended reality application 1814 detaches the virtual object from the location associated with the camera view. At block 2514, extended reality application 1814 fixes the location and orientation of the virtual object at the new location. The method 2500 then terminates.

Figure 26:
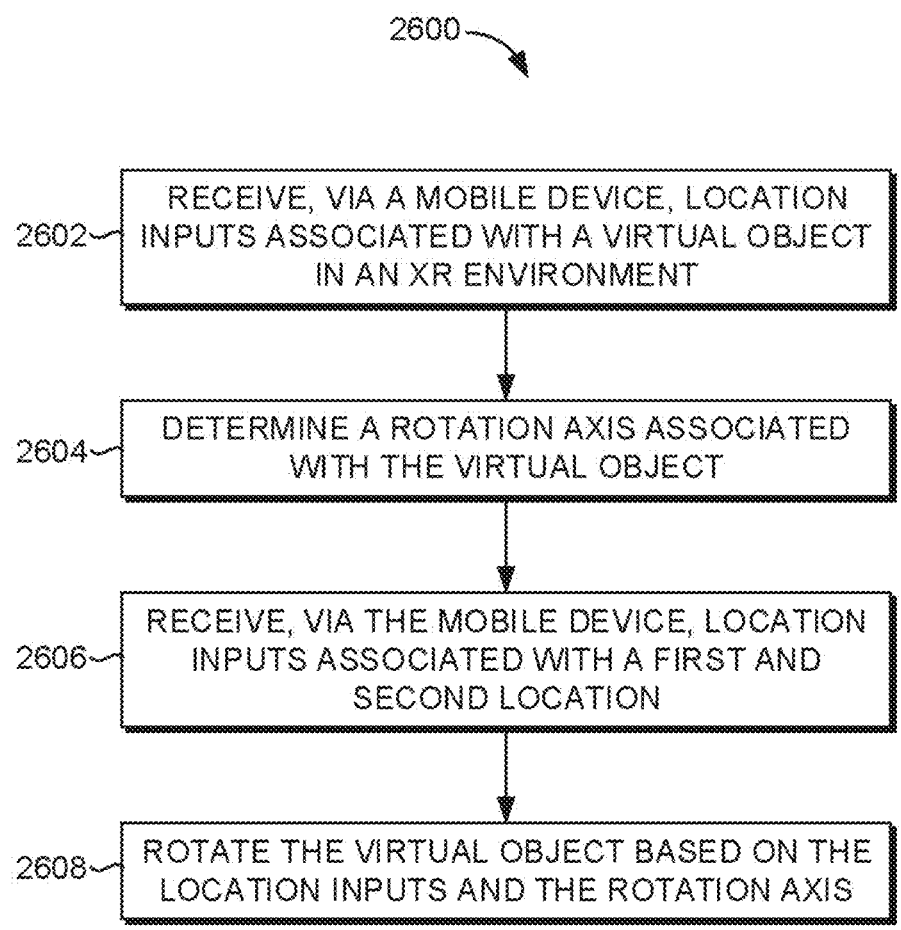
FIG. 26 is a flow diagram of method steps for rotating a virtual object within an XR environment, in accordance with other example embodiments.

FIG. 26 is a flow diagram of method steps for rotating a virtual object within an XR environment, in accordance with other example embodiments. Although the method steps are described in conjunction with the systems of FIGS. 1-24C, persons of ordinary skill in the art will understand that any system configured to perform the method steps, in any order, is within the scope of the present invention.

As shown, a method 2600 begins at block 2602, where an extended reality application 1814 executing on a mobile device 404 receives a selection of a virtual object in an XR environment. Specifically, extended reality application 1814 receives two location inputs associated with a first location and a second location. The location inputs of the virtual object may be detected via any technically feasible approach, including, without limitation, touch inputs received via a touchscreen, a gesture received via a data glove, or an input received via a hardware controller device. In one example, extended reality application 1814 could receive touch inputs indicating that a user has touched a touchscreen at two particular locations. Extended reality application 1814 selects a virtual object in the XR environment based on the two location inputs. For example, extended reality application 1814 could select the virtual object that is at or nearest to the midpoint between the two location inputs.

At block 2604, extended reality application 1814 receives a selection of an axis of rotation. In some embodiments, extended reality application 1814 may receive a selection of one of three axes, an x-axis, a y-axis, or a z-axis. The x-axis may be the axis that is parallel to the width of display device 1824 of mobile device 404. Rotating a virtual object about the x-axis may alter the pitch of the virtual object, as displayed in display device 1824. Similarly, the y-axis may be the axis that is parallel to the height of display device 1824. Rotating a virtual object about the y-axis may alter the yaw of the virtual object, as displayed in display device 1824. The z-axis may be the axis that is orthogonal the surface of display device 1824. Rotating a virtual object about the z-axis may alter the roll of the virtual object, as displayed in display device 1824.

At block 2606, extended reality application 1814 receives two new location inputs associated with a first location and a second location. At block 2608, extended reality application 1814 rotates the virtual object based on the location inputs and the rotation axis. Extended reality application 1814 compares the two new location inputs relative to the two original location inputs. Based on this comparison, extended reality application 1814 computes a rotation angle. Extended reality application 1814 rotates the virtual object about the selected axis by the rotation angle. If the rotation angle indicates that the location inputs are moving in a clockwise direction, then extended reality application 1814 rotates the virtual object about the selected axis in a clockwise direction. Likewise, if the rotation angle indicates that the location inputs are moving in a counterclockwise direction, then extended reality application 1814 rotates the virtual object about the selected axis in a counterclockwise direction. The method 2600 then terminates.

Figure 27:
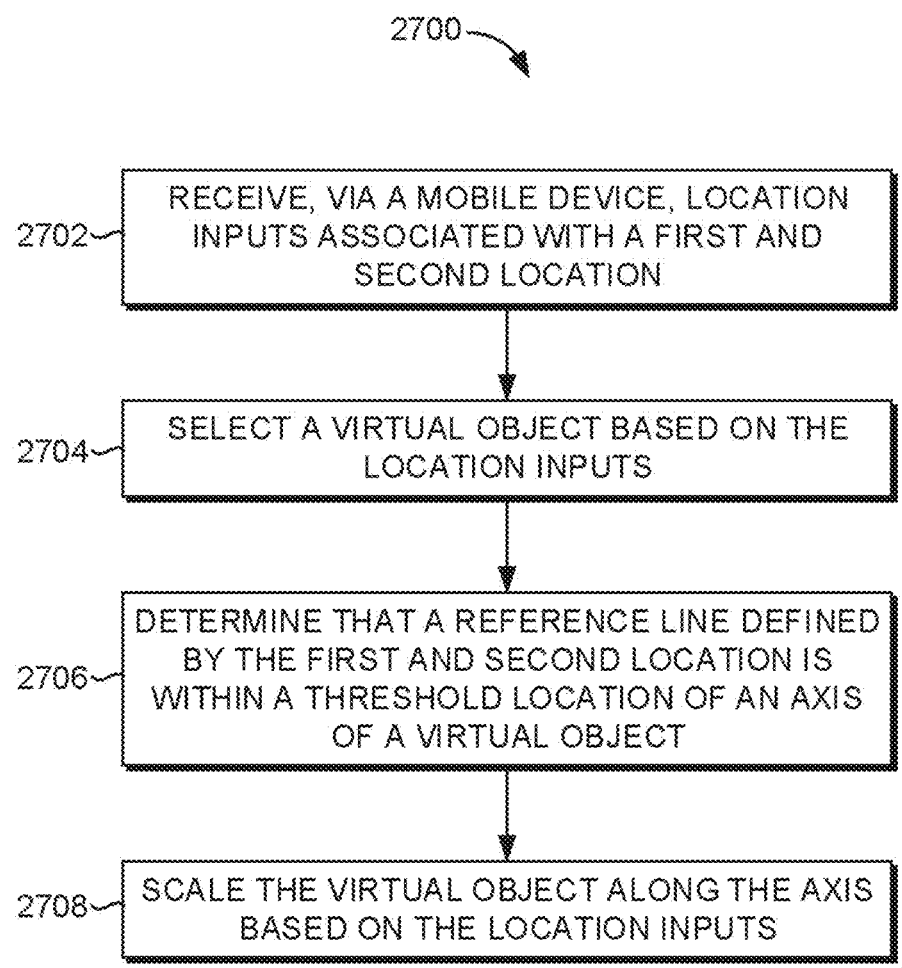
FIG. 27 is a flow diagram of method steps for scaling a virtual object within an XR environment, in accordance with other example embodiments.

FIG. 27 is a flow diagram of method steps for scaling a virtual object within an XR environment, in accordance with other example embodiments. Although the method steps are described in conjunction with the systems of FIGS. 1-24C, persons of ordinary skill in the art will understand that any system configured to perform the method steps, in any order, is within the scope of the present invention.

As shown, a method 2700 begins at block 2702, where an extended reality application 1814 executing on a mobile device 404 receives two location inputs associated with a first location and a second location. The location inputs may be detected via any technically feasible approach, including, without limitation, touch inputs received via a touchscreen, a gesture received via a data glove, or an input received via a hardware controller device. In one example, extended reality application 1814 could receive touch inputs indicating that a user has touched a touchscreen at two particular locations. At block 2704, extended reality application 1814 selects a virtual object in the XR environment based on the two location inputs. For example, extended reality application 1814 could select the virtual object that is at or nearest to the midpoint between the two location inputs.

At block 2706, extended reality application 1814 determines that a reference line defined by the first and second locations is within a threshold angle of an axis associated with the virtual object. In particular, extended reality application 1814 receives orientation information to determine a rotation angle of the camera 1820. Extended reality application 1814 tracks the rotation of the camera 1820 via any technically feasible approach, including, without limitation, accelerometer tracking, gyroscope tracking, and image analysis. Extended reality application 1814 determines one or more scaling axes. More specifically, extended reality application 1814 computes a pinch angle based on the two location inputs, where the pinch angle is the angle of an imaginary line that passes through the center of the two location inputs. Extended reality application 1814 then computes a difference angle by subtracting the rotation angle of the camera 1820 from the pinch angle.

Extended reality application 1814 then compares the difference angle against various angular ranges. If the difference angle is within an angular range that defines a vertical direction, then extended reality application 1814 sets the scaling axis as the y-axis. Likewise, if the difference angle is within an angular range that defines a horizontal direction, then extended reality application 1814 sets the scaling axis as the x-axis. If the difference angle is within an angular range that defines a diagonal direction, then extended reality application 1814 sets multiple axes as the scaling axis as the y-axes. In one example, extended reality application 1814 could set the x-axis and the y-axis as the scaling axes to simultaneously scale in both the horizontal and vertical dimensions. Similarly, extended reality application 1814 could set the x-axis, the y-axis, and the z-axis as the scaling axes to simultaneously scale in the horizontal, vertical, and depth dimensions.

At block 2708, extended reality application 1814 scales the virtual object along the scaling axis based on the location inputs. Extended reality application 1814 receives two new location inputs associated with a first location and a second location. Extended reality application 1814 compares the two new location inputs relative to the two original location inputs. Based on this comparison, extended reality application 1814 computes a scaling ratio. Extended reality application 1814 scales the virtual object about the scaling axis or axes by the scaling ratio. If the scaling ratio indicates that the location inputs are moving closer together, as in a pinch motion, then extended reality application 1814 scales the virtual object to a smaller size based on the pinch ratio. Likewise, if the scaling ratio indicates that the location inputs are moving farther apart, then extended reality application 1814 scales the virtual object to a larger size based on the pinch ratio. The method 2700 then terminates.

In sum, techniques are presented for manipulating virtual objects in an extended reality (XR) environment. In a first technique, an XR application program executing on an XR system facilitates the movement of a virtual object from a first location to a second location. The XR application program receives a selection of a virtual object via a client device operated by a user. The XR application program computes or otherwise determines the relative location of the virtual object to a location associated with the camera view associated with the client device. The XR application program tracks movement of the camera as the user moves within the XR environment. For example, in some embodiments, the XR application program tracks movement of the camera via accelerometers, gyroscopes, image analysis, and/or any other technically feasible techniques. The XR application program may continuously update the location to maintain a constant relative location of the virtual object to the location associated with the camera view. Then, when the virtual object is deselected, the XR application program detaches the virtual object from the location associated with the camera view and fixes the virtual object at the new location and orientation.

In a second technique, the XR application program facilitates the rotation of a virtual object. The XR application program receives two location inputs via a client device operated by a user. The XR application program selects a virtual object based on the two location inputs. The XR application program computes or otherwise determines an axis of rotation for the virtual object based on the two location inputs and on the relative location of the camera to the virtual object. The XR application program tracks movement of the camera as the user rotates the camera within the XR environment. For example, in some embodiments, the XR application program tracks rotational movement of the camera via accelerometers, gyroscopes, image analysis, and/or any other technically feasible techniques. The XR application program may continuously update the rotation of the virtual object based on the rotation of the camera. Upon receiving information that the two location inputs are no longer detected, the XR application program fixes the virtual object at the new rotation.

In a third technique, the XR application program facilitates the scaling of a virtual object along one or more axes. The XR application program receives two location inputs via a client device operated by a user. The XR application program selects a virtual object based on the two location inputs. The XR application program computes or otherwise determines a scaling axis for the virtual object based on the two location inputs and on the relative location of the camera to the virtual object. More specifically, the XR application program may compare an imaginary line that passes through the center of the two location inputs with a set of angular ranges between 0 degrees and 360 degrees. The XR application program fixes the scaling axis based on the angular range within which the imaginary line passes. The XR application program tracks the difference between the current location inputs and the initial location inputs. The XR application program computes or otherwise determines the size of the object based on a ratio of the distance between the current location inputs and the distance between the initial location inputs. The XR application program may continuously update the size of the virtual object based on the rotation of the camera. Upon receiving information that the two location inputs are no longer detected, the XR application program fixes the virtual object at the new size.

One advantage of the disclosed techniques is that virtual objects are manipulated with greater precision relative to prior techniques. For example, the disclosed techniques lead to improved precision when placing, rotating, and/or scaling virtual objects in an XR environment. As a result, the quality of user interactions with the XR environment is improved relative to prior approaches.

By fixing the virtual object to a specific point relative to the camera view displayed in the mobile device, the virtual object moves within the XR environment as the position and orientation of the mobile device changes. In this manner, a user is able to move the virtual object more precisely because the user is able to leverage fine motor and muscle control of the user's arms, legs, and body as the user moves within the XR environment. This technique provides a technical improvement over prior techniques that rely on a user's finger moving on the surface of a touchscreen to move a virtual object.

As described herein, the motion of a finger on a touchscreen is generally imprecise. For example, while moving a virtual object on a touchscreen device, a user's finger(s) typically cover multiple touch input locations on the touchscreen, making the selection of a specific location on the touchscreen difficult. In addition, due to friction between the user's finger(s) and the touchscreen, movements of the finger(s) on the touchscreen may be jerky and imprecise, preventing the user from moving virtual objects to specific locations on the touchscreen. Further, the spatial resolution of many touchscreen devices is low, relative to the physical real-world environment. These drawbacks lead to imprecision when manipulating virtual objects in an XR environment. As a result, user interactions within the XR environment may cause a virtual object to be moved to an undesired location. By contrast, the techniques described herein overcome these drawbacks and provide a technological improvement by tracking the motion of the mobile device and by moving a virtual object a corresponding amount. As a result, the virtual object may be moved and otherwise manipulated with greater precision relative to prior techniques.

1. In some embodiments, a computer-implemented method includes: receiving, via a client device, first user input associated with a first location and second user input associated with a second location; determining that a reference line defined between the first location and the second location is within a first threshold angle of a first axis of a virtual object; and scaling the virtual object along the first axis based on the first user input and the second user input.

2. The computer-implemented method according to clause 1, further comprising, determining an angle of the client device relative to a reference orientation of the client device, wherein determining that the reference line is within the first threshold angle is based on the angle of the client device.

3. The computer-implemented method according to clause 1 or clause 2, wherein the first user input and the second user input correspond to a pinch gesture, and scaling the virtual object along the first axis is performed based on a magnitude of the pinch gesture.

4. The computer-implemented method according to any of clauses 1-3, further comprising: receiving, via the client device, third user input associated with a third location and fourth user input associated with a fourth location; determining that an additional reference line defined between the third location and the fourth location is within an angular range that is between the first axis of the virtual object and a second axis of the virtual object; and scaling the virtual object along both the first axis and the second axis based on the third user input and the fourth user input.

5. The computer-implemented method according to any of clauses 1-4, further comprising: receiving, via the client device, third user input associated with a third location and fourth user input associated with a fourth location; determining that an additional reference line defined between the third location and the fourth location is within a second threshold angle of a second axis of a virtual object; and scaling the virtual object along only the second axis based on the third user input and the fourth user input.

6. The computer-implemented method according to any of clauses 1-5, further comprising: receiving, via the client device, third user input associated with a third location and fourth user input associated with a fourth location; determining that an additional reference line defined between the third location and the fourth location is within an angular range that is between the first axis of the virtual object and a second axis of the virtual object; and scaling the virtual object along the first axis and the second axis based on the third user input and the fourth user input.

7. The computer-implemented method according to any of clauses 1-6, further comprising: receiving, via the client device, third user input associated with a third location and fourth user input associated with a fourth location; determining that an additional reference line defined between the third location and the fourth location is within an angular range that is between the first axis of the virtual object and a second axis of the virtual object; and scaling the virtual object along the first axis, the second axis, and a third axis based on the third user input and the fourth user input.

8. The computer-implemented method according to any of clauses 1-7, wherein determining that the reference line is within the first threshold angle comprises determining that an angle of the reference line is within an angular range that includes the first threshold angle.

9. The computer-implemented method according to any of clauses 1-8, wherein determining that the reference line is within the first threshold angle comprises: computing a reference angle based on the reference line; selecting a first angular range included in a plurality of angular ranges, wherein the first angular range includes the reference angle; and determining that the first angular range includes the first threshold angle.

10. The computer-implemented method according to any of clauses 1-9, wherein scaling the virtual object along the first axis comprises: receiving, via the client device, third user input associated with a third location and fourth user input associated with a fourth location; computing a first distance between the first location and the second location; computing a second distance between the third location and the fourth location; and scaling the virtual object along the first axis based on a ratio of the second distance to the first distance.

11. The computer-implemented method according to any of clauses 1-10, further comprising: determining a midpoint location between the first location input and the second location input; and selecting the virtual object based on the midpoint location.

12. The computer-implemented method according to any of clauses 1-11, wherein the virtual object is an extended reality overlay of a real-world object.

13. The computer-implemented method according to any of clauses 1-12, wherein the virtual object is an extended reality overlay of a real-world object that is a data representation of real-time data or near-real-time data.

14. The computer-implemented method according to any of clauses 1-13, wherein the virtual object is an extended reality overlay of a real-world object that is a data representation of real-time data or near-real-time data from a data intake and query system, wherein the real-time or near-real-time data is generated by executing a query of machine data, at least part of which machine data is related to the real-world object.

15. A non-transitory computer-readable storage medium includes instructions that, when executed by a processor, cause the processor to perform the steps of: receiving, via a client device, first user input associated with a first location and second user input associated with a second location; determining that a reference line defined between the first location and the second location is within a first threshold angle of a first axis of a virtual object; and scaling the virtual object along the first axis based on the first user input and the second user input.

16. The non-transitory computer-readable storage medium according to clause 15, further comprising, determining an angle of the client device relative to a reference orientation of the client device, wherein determining that the reference line is within the first threshold angle is based on the angle of the client device.

17. The non-transitory computer-readable storage medium according to clause 15 or clause 16, wherein the first user input and the second user input correspond to a pinch gesture, and scaling the virtual object along the first axis is performed based on a magnitude of the pinch gesture.

18. The non-transitory computer-readable storage medium according to any of clauses 15-17, further comprising: receiving, via the client device, third user input associated with a third location and fourth user input associated with a fourth location; determining that an additional reference line defined between the third location and the fourth location is within an angular range that is between the first axis of the virtual object and a second axis of the virtual object; and scaling the virtual object along both the first axis and the second axis based on the third user input and the fourth user input.

19. The non-transitory computer-readable storage medium according to any of clauses 15-18, further comprising: receiving, via the client device, third user input associated with a third location and fourth user input associated with a fourth location; determining that an additional reference line defined between the third location and the fourth location is within a second threshold angle of a second axis of a virtual object; and scaling the virtual object along only the second axis based on the third user input and the fourth user input.

20. The non-transitory computer-readable storage medium according to any of clauses 15-19, further comprising: receiving, via the client device, third user input associated with a third location and fourth user input associated with a fourth location; determining that an additional reference line defined between the third location and the fourth location is within an angular range that is between the first axis of the virtual object and a second axis of the virtual object; and scaling the virtual object along the first axis and the second axis based on the third user input and the fourth user input.

21. The non-transitory computer-readable storage medium according to any of clauses 15-20, further comprising: receiving, via the client device, third user input associated with a third location and fourth user input associated with a fourth location; determining that an additional reference line defined between the third location and the fourth location is within an angular range that is between the first axis of the virtual object and a second axis of the virtual object; and scaling the virtual object along the first axis, the second axis, and a third axis based on the third user input and the fourth user input.

22. The non-transitory computer-readable storage medium according to any of clauses 15-21, wherein determining that the reference line is within the first threshold angle comprises determining that an angle of the reference line is within an angular range that includes the first threshold angle.

23. In some embodiments, a computing device includes: a memory that includes an extended reality application program; and a processor that is coupled to the memory and, when executing the extended reality application program, is configured to: receive, via a client device, first user input associated with a first location and second user input associated with a second location; determine that a reference line defined between the first location and the second location is within a first threshold angle of a first axis of a virtual object; and scale the virtual object along the first axis based on the first user input and the second user input.

24. The computing device according to clause 23, wherein, when executing the extended reality application program, the processor is further configured to determine an angle of the client device relative to a reference orientation of the client device, wherein determining that the reference line is within the first threshold angle is based on the angle of the client device.

25. The computing device according to clause 23 or clause 24, wherein the first user input and the second user input correspond to a pinch gesture, and scaling the virtual object along the first axis is performed based on a magnitude of the pinch gesture.

26. The computing device according to any of clauses 23-25, wherein, when executing the extended reality application program, the processor is further configured to: receive, via the client device, third user input associated with a third location and fourth user input associated with a fourth location; determine that an additional reference line defined between the third location and the fourth location is within an angular range that is between the first axis of the virtual object and a second axis of the virtual object; and scale the virtual object along both the first axis and the second axis based on the third user input and the fourth user input.

27. The computing device according to any of clauses 23-26, wherein, when executing the extended reality application program, the processor is further configured to: receive, via the client device, third user input associated with a third location and fourth user input associated with a fourth location; determine that an additional reference line defined between the third location and the fourth location is within a second threshold angle of a second axis of a virtual object; and scale the virtual object along only the second axis based on the third user input and the fourth user input.

28. The computing device according to any of clauses 23-27, wherein, when executing the extended reality application program, the processor is further configured to: receive, via the client device, third user input associated with a third location and fourth user input associated with a fourth location; determine that an additional reference line defined between the third location and the fourth location is within an angular range that is between the first axis of the virtual object and a second axis of the virtual object; and scale the virtual object along the first axis and the second axis based on the third user input and the fourth user input.

29. The computing device according to any of clauses 23-28, wherein, when executing the extended reality application program, the processor is further configured to: receive, via the client device, third user input associated with a third location and fourth user input associated with a fourth location; determine that an additional reference line defined between the third location and the fourth location is within an angular range that is between the first axis of the virtual object and a second axis of the virtual object; and scale the virtual object along the first axis, the second axis, and a third axis based on the third user input and the fourth user input.

30. The computing device according to any of clauses 23-29, wherein determining that the reference line is within the first threshold angle comprises determining that an angle of the reference line is within an angular range that includes the first threshold angle.

Any and all combinations of any of the claim elements recited in any of the claims and/or any elements described in this application, in any fashion, fall within the contemplated scope of the present invention and protection.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments.

Aspects of the present embodiments may be embodied as a system, method or computer program product. Accordingly, aspects of the present disclosure may take the form of an entirely hardware embodiment, an entirely software embodiment (including firmware, resident software, microcode, etc.) or an embodiment combining software and hardware aspects that may all generally be referred to herein as a "module" or "system." In addition, any hardware and/or software technique, process, function, component, engine, module, or system described in the present disclosure may be implemented as a circuit or set of circuits. Furthermore, aspects of the present disclosure may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

Aspects of the present disclosure are described above with reference to flowchart illustrations and/or block diagrams of methods, apparatus (systems) and computer program products according to embodiments of the disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, enable the implementation of the functions/acts specified in the flowchart and/or block diagram block or blocks. Such processors may be, without limitation, general purpose processors, special-purpose processors, application-specific processors, or field-programmable gate arrays.

The flowchart and block diagrams in the figures illustrate the architecture, functionality, and operation of possible implementations of systems, methods and computer program products according to various embodiments of the present disclosure. In this regard, each block in the flowchart or block diagrams may represent one or more modules, segments, or portions of code, which each comprise one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

While the preceding is directed to embodiments of the present disclosure, other and further embodiments of the disclosure may be devised without departing from the basic scope thereof, and the scope thereof is determined by the claims that follow.

What is claimed is:

1. A computer-implemented method, comprising:
   identifying a plurality of reference axes of a virtual object based on an orientation of a virtual camera associated with the virtual object;
   receiving, via a client device, first user input associated with a first location and second user input associated with a second location;
   selecting, for scaling the virtual object, a first reference axis of the virtual object from among the plurality of reference axes of the virtual object based on the first location and the second location; and
   scaling the virtual object along the first reference axis based on the first user input and the second user input without scaling the virtual object along at least one other reference axis included in the plurality of reference axes.

2. The computer-implemented method of claim 1, wherein selecting the first reference axis comprises determining that a first line connecting the first location and the second location is within a first threshold angle of the first reference axis included in the plurality of reference axes of the virtual object.

3. The computer-implemented method of claim 1, further comprising:
   selecting, for scaling the virtual object, one or more additional reference axes of the virtual object from among the plurality of reference axes of the virtual object based on additional user input; and
   scaling the virtual object along the one or more additional reference axes based on the additional user input.

4. The computer-implemented method of claim 1, further comprising, determining an angle of the client device relative to a reference orientation of the client device, wherein selecting the first reference axis is further based on the angle of the client device.

5. The computer-implemented method of claim 1, wherein the first user input and the second user input correspond to a pinch gesture, and scaling the virtual object along the first reference axis is performed based on a magnitude of the pinch gesture.

6. The computer-implemented method of claim 1, wherein scaling the virtual object comprises:
   computing a scaling ratio based on the first location and the second location; and
   modifying a size of the virtual object along the first reference axis based on the scaling ratio.

7. The computer-implemented method of claim 1, further comprising:
   receiving, via the client device, third user input associated with a third location and fourth user input associated with a fourth location;
   determining that a line defined between the third location and the fourth location is within an angular range that is between the first reference axis of the virtual object and a second reference axis of the virtual object; and
   scaling the virtual object along both the first reference axis and the second reference axis based on the third user input and the fourth user input.

8. The computer-implemented method of claim 1, further comprising:
   receiving, via the client device, third user input associated with a third location and fourth user input associated with a fourth location;

determining that a line defined between the third location and the fourth location is within a second threshold angle of a second reference axis of the virtual object; and scaling the virtual object along only the second reference axis based on the third user input and the fourth user input.

9. The computer-implemented method of claim 1, further comprising:

receiving, via the client device, third user input associated with a third location and fourth user input associated with a fourth location;

determining that a line defined between the third location and the fourth location is within an angular range that is between the first reference axis of the virtual object and a second reference axis of the virtual object; and scaling the virtual object along the first reference axis based on the first user input and the second user input, and scaling the virtual object along the second reference axis based on the third user input and the fourth user input.

10. The computer-implemented method of claim 1, wherein scaling the virtual object along the first reference axis comprises:

receiving, via the client device, third user input associated with a third location and fourth user input associated with a fourth location;

computing a first distance between the first location and the second location;

computing a second distance between the third location and the fourth location; and scaling the virtual object along the first reference axis based on a ratio of the second distance to the first distance.

11. The computer-implemented method of claim 1, further comprising:

determining a midpoint location between the first location input and the second location input; and selecting the virtual object based on the midpoint location.

12. The computer-implemented method of claim 1, wherein the virtual object is an extended reality overlay of a real-world object.

13. The computer-implemented method of claim 1, wherein the virtual object is an extended reality overlay of a real-world object that is a data representation of real-time data or near-real-time data.

14. The computer-implemented method of claim 1, wherein the virtual object is an extended reality overlay of a real-world object that is a data representation of real-time data or near-real-time data from a data intake and query system, wherein the real-time or near-real-time data is generated by executing a query of machine data, at least part of which machine data is related to the real-world object.

15. One or more non-transitory computer-readable storage media including instructions that, when executed by one or more processors, cause the one or more processors to perform the steps of:

identifying a plurality of reference axes of a virtual object based on an orientation of a virtual camera associated with the virtual object;

receiving, via a client device, first user input associated with a first location and second user input associated with a second location;

selecting, for scaling the virtual object, a first reference axis of the virtual object from among the plurality of reference axes of the virtual object based on the first location and the second location; and scaling the virtual object along the first reference axis based on the first user input and the second user input without scaling the virtual object along at least one other reference axis included in the plurality of reference axes.

16. The one or more non-transitory computer-readable storage media of claim 15, wherein selecting the first reference axis comprises determining that a first line connecting the first location and the second location is within a first threshold angle of the first reference axis included in the plurality of reference axes of the virtual object.

17. The one or more non-transitory computer-readable storage media of claim 15, further comprising:

selecting, for scaling the virtual object, one or more additional reference axes of the virtual object from among the plurality of reference axes of the virtual object based on additional user input;

scaling the virtual object along the one or more additional reference axes based on the additional user input.

18. The one or more non-transitory computer-readable storage media of claim 15, further comprising, determining an angle of the client device relative to a reference orientation of the client device, wherein selecting the first reference axis is further based on the angle of the client device.

19. The one or more non-transitory computer-readable storage media of claim 15, wherein scaling the virtual object comprises:

computing a scaling ratio based on the first location and the second location; and modifying a size of the virtual object along the first reference axis based on the scaling ratio.

20. A computing device, comprising:

one or more memories that include an extended reality application program; and one or more processors that are coupled to the one or more memories and, when executing the extended reality application program, are configured to:

identify a plurality of reference axes of a virtual object based on an orientation of a virtual camera associated with the virtual object;

receive, via a client device, first user input associated with a first location and second user input associated with a second location;

select, for scaling the virtual object, a first reference axis of the virtual object from among the plurality of reference axes of the virtual object based on the first location and the second location; and scale the virtual object along the first reference axis based on the first user input and the second user input without scaling the virtual object along at least one other reference axis included in the plurality of reference axes.

* * * * *